(12) United States Patent
Park et al.

(10) Patent No.: US 10,379,694 B2
(45) Date of Patent: Aug. 13, 2019

(54) TOUCH PANEL AND COORDINATE MEASURING SYSTEM HAVING THE SAME

(71) Applicant: Samsung Electronics Co., Ltd., Suwon-si, Gyeonggi-do (KR)

(72) Inventors: Sung-soo Park, Suwon-si (KR);
Byung-hoon Kang, Suwon-si (KR);
Ju-wan Park, Seongnam-si (KR);
Gwan-hyung Kim, Suwon-si (KR);
Sung-wan Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 798 days.

(21) Appl. No.: 14/833,629

(22) Filed: Aug. 24, 2015

(65) Prior Publication Data

US 2016/0062519 A1    Mar. 3, 2016

Related U.S. Application Data

(60) Provisional application No. 62/113,697, filed on Feb. 9, 2015.

(30) Foreign Application Priority Data

Aug. 27, 2014   (KR) ........................ 10-2014-0112467
Jun. 5, 2015   (KR) ........................ 10-2015-0080201
Jul. 3, 2015   (KR) ........................ 10-2015-0095482

(51) Int. Cl.
    *G06F 3/044*      (2006.01)
    *G06F 3/047*      (2006.01)
    (Continued)

(52) U.S. Cl.
    CPC .......... *G06F 3/047* (2013.01); *G06F 3/03545* (2013.01); *G06F 3/044* (2013.01);
    (Continued)

(58) Field of Classification Search
None
See application file for complete search history.

(56) References Cited

U.S. PATENT DOCUMENTS 6,142,821 A    11/2000   Hwang
6,750,852 B2    6/2004   Gillespie et al.
(Continued)

FOREIGN PATENT DOCUMENTS

CN      103389805 A     11/2013
CN      103635870 A     3/2014
(Continued)

OTHER PUBLICATIONS

Taiwanese Office Action dated Jan. 16, 2019, issued in Taiwanese Patent Application No. 106109668.

*Primary Examiner* — Carl Adams
(74) *Attorney, Agent, or Firm* — Jefferson IP Law, LLP

(57) ABSTRACT

A touch panel is provided. The touch panel includes a channel electrode unit configured to include a plurality of first electrodes disposed in a first direction and a plurality of second electrodes disposed in a second direction intersecting with the first direction, and a controlling unit configured to apply a driving signal to the electrodes in the channel electrode unit in a unit of a plurality of electrodes, transmit the driving signal to a resonance circuit of a stylus pen approaching the touch panel through a capacitive coupling, and receive response signals generated from the resonance circuit of the stylus pen from each of the plurality of electrodes to determine a location of the stylus pen including the resonance circuit.

21 Claims, 46 Drawing Sheets

(51) Int. Cl.
  *G06F 3/041* (2006.01)
  *G06F 3/0354* (2013.01)
  *G09G 5/00* (2006.01)
(52) U.S. Cl.
  CPC ........... *G06F 3/0416* (2013.01); *G09G 5/003* (2013.01); *G09G 2300/0426* (2013.01)

(56) References Cited

U.S. PATENT DOCUMENTS

| | | | |
|---|---|---|---|
| 7,292,229 | B2 | 11/2007 | Morag et al. |
| 8,942,937 | B2 | 1/2015 | Miyamoto et al. |
| 9,454,271 | B2 | 9/2016 | Miyamoto et al. |
| 9,495,045 | B2 | 11/2016 | Kim |
| 9,898,136 | B2 | 2/2018 | Miyamoto et al. |
| 2006/0267953 | A1 | 11/2006 | Peterson, Jr. et al. |
| 2007/0268272 | A1 | 11/2007 | Perski et al. |
| 2008/0158178 | A1* | 7/2008 | Hotelling ................ G06F 3/044 345/173 |
| 2008/0170046 | A1 | 7/2008 | Rimon et al. |
| 2010/0259489 | A1 | 10/2010 | Chen et al. |
| 2011/0012864 | A1 | 1/2011 | Lin |
| 2012/0182254 | A1 | 7/2012 | Jang et al. |
| 2012/0182259 | A1 | 7/2012 | Han |
| 2012/0262407 | A1 | 10/2012 | Hinckley et al. |
| 2012/0327041 | A1 | 12/2012 | Harley et al. |
| 2013/0300708 | A1 | 11/2013 | Kim |
| 2013/0300712 | A1 | 11/2013 | Kim |
| 2014/0043283 | A1 | 2/2014 | Kim |
| 2014/0062965 | A1 | 3/2014 | Lee |
| 2014/0078101 | A1 | 3/2014 | Katsurahira |
| 2014/0078105 | A1 | 3/2014 | Son |
| 2014/0085257 | A1 | 3/2014 | Wright et al. |
| 2014/0104224 | A1* | 4/2014 | Ih ............................ G06F 3/044 345/174 |
| 2014/0132529 | A1 | 5/2014 | Jeong |
| 2014/0139483 | A1 | 5/2014 | Miyamoto et al. |
| 2014/0149059 | A1 | 5/2014 | Miyamoto et al. |
| 2014/0198075 | A1 | 7/2014 | Yeh |
| 2014/0320451 | A1* | 10/2014 | Lee ....................... G06F 3/0418 345/174 |
| 2015/0084899 | A1* | 3/2015 | Park .................... G06F 3/03545 345/173 |
| 2016/0349923 | A1 | 12/2016 | Miyamoto et al. |
| 2017/0038901 | A1 | 2/2017 | Kim |
| 2017/0115824 | A1 | 4/2017 | Katsurahira |

FOREIGN PATENT DOCUMENTS

| | | |
|---|---|---|
| CN | 103677336 A | 3/2014 |
| CN | 103677480 A | 3/2014 |
| EP | 2 662 759 A2 | 11/2013 |
| EP | 2 703 978 A1 | 3/2014 |
| EP | 2 711 815 A2 | 3/2014 |
| TW | M366123 U1 | 10/2009 |
| TW | 201104547 A1 | 2/2011 |
| TW | M433596 U1 | 7/2012 |
| TW | 201337659 A | 9/2013 |
| WO | 2011/021825 A2 | 2/2011 |
| WO | 2013/001888 A1 | 1/2013 |

* cited by examiner

FIG. 15A
FIG. 15B
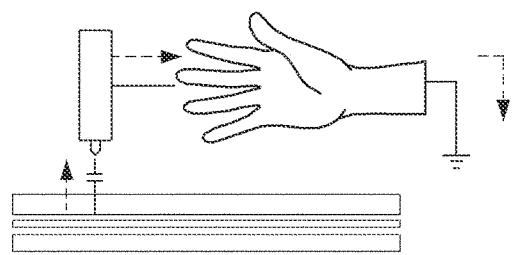
Ideal case
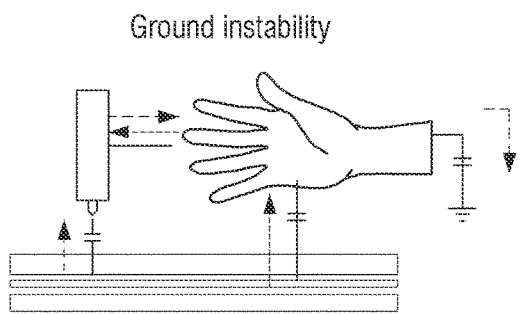
Real case

TOUCH PANEL AND COORDINATE MEASURING SYSTEM HAVING THE SAME

CROSS-REFERENCE TO RELATED APPLICATION(S)

This application claims the benefit under 35 U.S.C. § 119(e) of a U.S. Provisional application filed on Feb. 9, 2015 in the U.S. Patent and Trademark Office and assigned Ser. No. 62/113,697, and under 35 U.S.C. § 119(a) of a Korean patent application filed on Aug. 27, 2014 in the Korean Intellectual Property Office and assigned Serial number 10-2014-0112467, of a Korean patent application filed on Jun. 5, 2015 in the Korean Intellectual Property Office and assigned Serial number 10-2015-0080201, and of a Korean patent application filed on Jul. 3, 2015 in the Korean Intellectual Property Office and assigned Serial number 10-2015-0095482, the entire disclosure of each of which is hereby incorporated by reference.

TECHNICAL FIELD

The present disclosure relates to a touch panel and a coordinate measuring system having the same. More particularly, the present disclosure relates to a touch panel capable of measuring an input location of a stylus pen, and a coordinate measuring system having the same.

BACKGROUND

Recently, the prevalence of smartphones or tablet personal computers (PCs) has actively been conducted, and the development of a technology for a touch location determining apparatus which is embedded has also been actively conducted. The smartphones or the tablet PCs include a touch screen, and a user may designate a specific coordinate of the touch screen using a finger or a stylus pen. The user may input a specific signal to the smartphone by designating the specific coordinate of the touch screen.

The touch screen may be operated based on an electric scheme, an infrared scheme, and an ultrasonic wave scheme, and an example of the electric operation scheme may include a resistive (R) type touch screen or a capacitive (C) type touch screen.

According to the related art, the R type touch screen capable of simultaneously recognizing the finger of the user and the stylus pen has been widely used. However, the R type touch screen has a problem caused by a reflection by an air layer between indium tin oxide (ITO) layers.

Thus, the C type touch screen has recently been widely used. Here, the C type touch screen refers to a touch screen which is operated by a method of sensing a difference of capacitance of a transparent electrode, which is generated by a touch of an object. However, in the case of the C type touch screen, since it is difficult to physically distinguish a hand and a pen from each other, the C type touch screen had a disadvantage in that operational error by an unintended touch of the hand at the time of using the pen may be generated.

According to the related art for addressing the above-mentioned disadvantage, the hand and the pen are distinguished by using a method of performing a process using only software that distinguishes the hand and the pen depending on a touch area, and a method of including a separate location determining apparatus such as an electro magnetic resonance (EMR) scheme, in addition to the C type touch screen.

However, the software scheme may not perfectly mitigate error caused by an unintended touch of the hand, and since the EMR scheme includes the separate location determining apparatus, it has problems of a mounting space, weight, and an increase in costs.

Thus, the development of a technology capable of distinguishing the hand and the pen without adding the separate location determining apparatus has been requested.

Meanwhile, in the case of the stylus pen, an improvement of stylus sensitivity capable of securing a signal to sense the stylus pen without an internal power source has also been requested in that the stylus pen is preferably operated in a passive scheme by reason of inconvenience of a battery exchange, cost, and weight.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a touch panel capable of improving signal sensitivity for detecting a location of a stylus pen, and a coordinate measuring system having the same.

In accordance with an aspect of the present disclosure, a touch panel is provided. The touch panel includes a channel electrode unit configured to include electrodes, the electrodes including a plurality of first electrodes disposed in a first direction and a plurality of second electrodes disposed in a second direction intersecting with the first direction, and a controlling unit configured to apply a driving signal to the electrodes in the channel electrode unit in a unit of a plurality of electrodes, transmit the driving signal to a resonance circuit of a stylus pen approaching the touch panel through a capacitive coupling, and receive response signals generated from the resonance circuit of the stylus pen from each of the plurality of electrodes to determine a location of the stylus pen including the resonance circuit.

The channel electrode unit may detect capacitances between the plurality of first electrodes and the plurality of second electrodes during an approach of a touch object, and the controlling unit may calculate variation of the capacitances between respective electrodes at a plurality of electrodes intersecting points formed between the plurality of first electrodes and the plurality of second electrodes, and determines a location of the touch object based on the calculated variation of capacitances.

The controlling unit may determine a location of the stylus pen including the resonance circuit based on a ratio between the response signals received from the first plurality of electrodes and a ratio between the response signals received from the second plurality of electrodes.

The controlling unit may apply a same driving signal to all of the plurality of first electrodes.

The plurality of first electrodes may be classified into a plurality of sub-groups in a unit of a plurality of electrodes which are continuously disposed, and the controlling unit may simultaneously apply a same driving signal to all of the first electrodes in one sub-group.

The controlling unit may simultaneously apply the driving signal to an electrode receiving a largest response signal among the plurality of first electrodes and an electrode within a preset distance from the electrode receiving the largest response signal.

The controlling unit may simultaneously apply the driving signal to at least one first electrode of the plurality of first electrodes and at least one second electrode of the plurality of second electrodes.

The touch panel may further include a driving unit configured to apply the driving signal to at least two electrodes of the plurality of first electrodes, and a receiving unit configured to receive the response signals of each of the plurality of first electrodes and the plurality of second electrodes in a section in which the driving signal is not applied, wherein the controlling unit determines the location of the stylus pen including the resonance circuit based on the response signals received from the receiving unit.

The receiving unit may sequentially receive the response signals of each of the plurality of first electrodes and the plurality of second electrodes.

The controlling unit may control the driving unit and the receiving unit so that the application of a same driving signal to the plurality of first electrodes and the reception of the response signals for each of the plurality of first electrodes and the plurality of second electrodes are alternately performed.

The receiving unit may include an amplifying unit configured to amplify the received response signal and output the amplified response signals, an analog-to-digital converting (ADC) unit configured to convert the amplified response signals into a digital signal, and a signal processing unit configured to extract a preset frequency component from the response signals converted into the digital signal.

The receiving unit may receive in parallel the response signals of each of the plurality of first electrodes and the plurality of second electrodes in a unit of a plurality of channels.

The receiving unit may simultaneously receive the response signals from at least one first electrode of the plurality of first electrodes and at least one second electrode of the plurality of second electrodes.

The receiving unit may include a parallel amplifying unit configured to amplify each of the response signals received from the plurality of first electrodes and the plurality of second electrodes, an ADC unit configured to convert each of the plurality of amplified response signals into a digital signal, and a signal processing unit configured to extract a preset frequency component from a difference between the plurality of response signals converted into the digital signal.

The receiving unit may include a differential amplifying unit configured to differentially amplify a difference between response signals of two electrodes of the plurality of first electrodes and the plurality of second electrodes and output the differentially amplified response signal.

The receiving unit may include a differential amplifying unit configured to differentially amplify a difference between response signals of two electrodes of the plurality of first electrodes and the plurality of second electrodes and output the differentially amplified response signal, an ADC unit configured to convert the differentially amplified response signal into a digital signal, and a signal processing unit configured to extract a preset frequency component from the response signal converted into the digital signal.

The controlling unit may control the channel electrode unit so that at least one of the plurality of first electrodes and the plurality of second electrodes is grounded in a section in which the response signals are received.

The controlling unit may control the channel electrode unit so that at least one electrode other than the electrodes to which the driving signal is applied is grounded in a section in which the driving signal is applied.

The controlling unit may apply the same first driving signal to the plurality of first electrodes which are continuously disposed, and apply a second driving signal having a phase difference of 180° with the first driving signal to at least one of the first electrodes of the plurality of first electrodes except for the first electrodes to which the first driving signal is applied.

The controlling unit may sequentially classify electrodes into a first sub-group, a second sub-group, and a third sub-group based on an electrode receiving the largest response signal, apply a same first driving signal to electrodes in the first sub-group, ground or float electrodes in the second sub-group, and apply a second driving signal having a phase opposite to that of the first driving signal to electrodes in the third sub-group.

The controlling unit may determine a location of the stylus pen and a location of the touch object, apply a same first driving signal to a plurality of electrodes corresponding to the location of the stylus pen, and apply a second driving signal having a phase difference of 180° with the first driving signal to a plurality of electrodes corresponding to the location of the touch object.

The controlling unit may simultaneously apply driving signals having different phases to at least one of the plurality of first electrodes and at least one of the plurality of second electrodes.

The controlling unit may determine a phase difference between a first driving signal applied to the first electrodes and a second driving signal applied to the second electrodes, depending on locations of the first electrodes and the second electrodes to which the first driving signal and second driving signal are applied.

The touch panel may further include a first driving unit configured to simultaneously apply the driving signal to at least two electrodes of the, when the stylus pen is sensed, a second driving unit configured to apply the driving signal to the plurality of first electrodes when the touch object is sensed, a first receiving unit configured to receive the response signals from each of the electrodes in a section in which the driving signal is not applied when the stylus pen is sensed, and a second receiving unit configured to receive the response signals from the plurality of second electrodes in a section in which the driving signal is applied when the touch object is sensed.

In accordance with another aspect of the present disclosure, a coordinate measurement system is provided. The coordinate measurement system includes a touch panel configured to collectively apply a driving signal in a unit of a plurality of electrodes, and a stylus pen configured to form capacitance with at least one of the plurality of electrodes and receive energy for a resonance through the formed capacitance, wherein the touch panel receives response signals generated from the stylus pen approaching the touch panel from each of the plurality of electrodes to determine a location of the stylus pen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 15A and 15B are diagrams illustrating schemes in which a plurality of driving signals are applied in an ideal case and a real case according to various embodiments of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first", "second", etc. may be used to describe diverse components, but the components are not limited by the terms. The terms are only used to distinguish one component from the others.

In the present disclosure, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

In various embodiments of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

Figure 1:
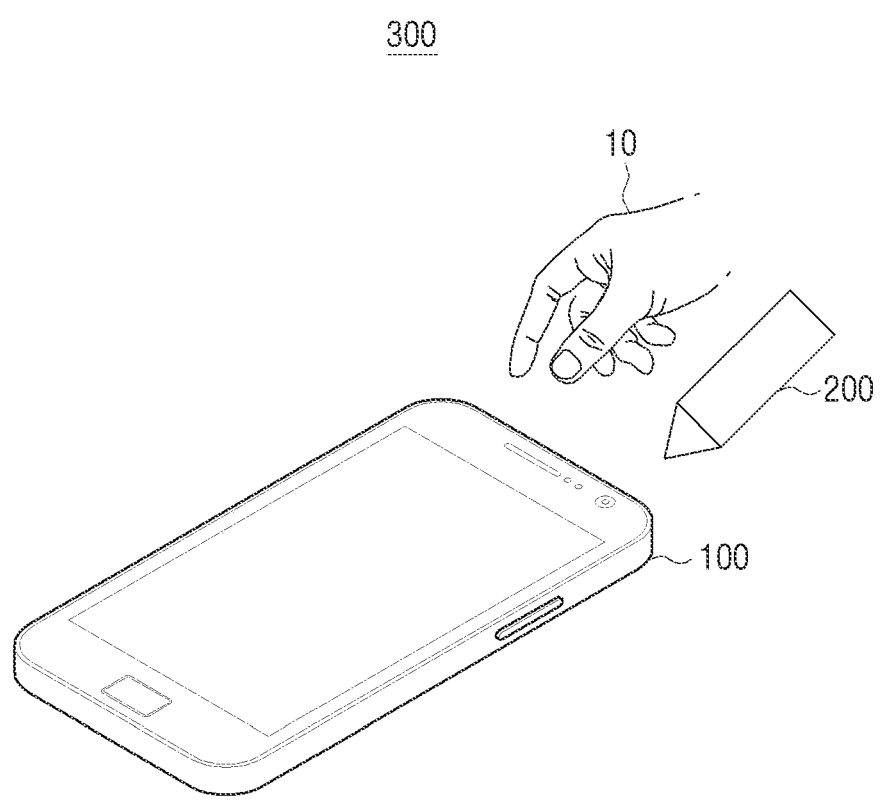
FIG. 1 is a block diagram illustrating a configuration of a coordinate measuring system according to an embodiment of the present disclosure.

FIG. 1 is a block diagram illustrating a configuration of a coordinate measuring system according to an embodiment of the present disclosure.

Referring to FIG. 1, a coordinate measuring system 300 includes a touch panel 100 and a stylus pen 200.

The touch panel 100 may determine whether a touched object is the stylus pen 200 having a resonance circuit or a touch object such as a hand (or more specifically, a finger). In addition, the touch panel 100 may determine a driving scheme of a driving signal and a processing scheme of a response signal with a location determining scheme corresponding to a kind of determined objects, to thereby perform a suitable location determination corresponding to each object. Here, in the case in which the touch object and the stylus pen are simultaneously touched, the touch panel 100 may ignore the touch of the touch object and may determine only the location of the stylus pen.

The touch panel 100 may determine the location of the object with the scheme corresponding to the determined object. Specifically, in the case in which it is determined that the touched object is the stylus pen, the touch panel 100 may determine the location of the stylus pen 200 with a scheme different from a scheme of recognizing the touch object. Specifically, the touch panel 100 includes a plurality of electrodes and applies the driving signal to the electrodes, thereby making it possible to transmit the driving signal to the resonance circuit of the stylus pen approaching the touch panel 100 through a capacitive coupling. Here, the touch panel 100 may simultaneously apply the driving signal to the plurality of electrodes. In this case, the touch panel 100 may apply a driving signal having the same phase to the plurality of electrodes, or may also apply driving signals having different phases to each electrode by taking into account the location of the stylus pen 200.

In addition, the touch panel 100 may receive the response signal caused from the resonance circuit of the stylus pen 200 from each of the plurality of electrodes to determine the location of the stylus pen 200 including the resonance circuit. A detailed configuration and operation of the touch panel 100 will be described below with reference to FIG. 2. Here, the touch panel 100 may be a touch pad, a touch screen, or a notebook, a mobile phone, a smartphone, portable media player (PMP), Moving Picture Experts Group phase 1 or phase 2 (MPEG-1 or MPEG-2) audio layer 3 (MP3) player, and the like including the touch pad or the touch screen.

In addition, in the case in which it is determined that the touched object is the touch object such as the hand, the touch panel 100 may determine the location of the touch object using a change of capacitance between a plurality of first and second electrodes by an approach of the touch object. An operation of determining the location of the touch object described above will be described below with reference to FIG. 6.

In addition, in the case in which it is determined that the stylus pen 200 and the hand are simultaneously touched, the touch panel 100 may ground or float an electrode in a region in which the hand is located so that a driving signal transmitted to the stylus pen 200 is not transmitted to the hand, or may apply a driving signal having a phase different from that of the corresponding driving signal to the electrode in the region in which the hand is located. An operation of the touch panel 100 described above will be described below with reference to FIGS. 10 to 19.

The stylus pen 200 may form capacitance with at least one of the plurality of electrodes in the touch panel 100 and may receive energy for resonance through the formed capacitance.

In addition, the stylus pen 200 may transmit the response signal caused from the resonance circuit to at least one electrode in the touch panel 100. The above-mentioned stylus pen 200 may be implemented in a pen shape, but is not limited thereto. A detailed configuration and operation of the stylus pen 200 will be described below with reference to FIGS. 40 to 43.

As described above, in the coordinate measuring system 300 according to the present embodiment of the present disclosure, since the touch panel 100 provides the driving signal to the stylus pen 200 through the capacitive coupling, the stylus pen 200 may be operated even though it is not self-powered.

Meanwhile, although FIG. 1 illustrates the case in which the touch panel 100 determines only the location of the stylus pen 200 including the resonance circuit, the touch panel 100 may also determine a location of the finger by sensing a change of capacitance of the electrode depending on the location of the finger or a signal magnitude change caused by the change of capacitance. An operation of determining the location of the finger described above will be described below with reference to FIG. 6.

Meanwhile, although FIG. 1 illustrates the case in which one stylus pen 200 is connected to the touch panel 100, at the time of implementing the coordinate measuring system, one touch panel 100 may be connected to a plurality of stylus pens. In this case, the touch panel 100 may sense a location of each of the plurality of stylus pens.

Figure 2:
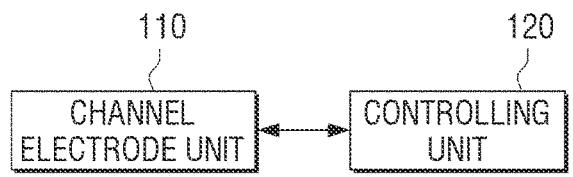
FIG. 2 is a block diagram illustrating a detailed configuration of a touch panel of FIG. 1.

FIG. 2 is a block diagram illustrating a detailed configuration of the touch panel of FIG. 1.

Referring to FIG. 2, the touch panel 100 may be configured to include a channel electrode unit 110 and a controlling unit 120.

The channel electrode unit 110 may include a plurality of electrodes. Specifically, the channel electrode unit 110 may include the plurality of electrodes which are disposed in a matrix form. For example, the channel electrode unit 110 may include a plurality of first electrodes disposed in a first direction and a plurality of second electrodes disposed in a second direction which is perpendicular to the first direction. A form and operation of the plurality of electrodes included in the channel electrode unit 110 will be described below with reference to FIG. 3.

The controlling unit 120 may determine whether the touch object is the touch object such as the hand or the stylus pen such as the pen, depending on the received response signal in the channel electrode unit 110. Specifically, in the case in which a response signal of a specific frequency is received in a section in which the driving signal is not applied, immediately after the application of the driving signal is completed, the controlling unit 120 may determine that the touched object is the stylus pen such as the pen.

On the contrary, in the case in which the response signal of the specific frequency is not received immediately after the application of the driving signal is completed, the controlling unit 120 may determine that the touched object is the touch object such as the hand. The determination of the touch object described above may be performed periodically as well as when an initial response signal is received.

For example, the controlling unit 120 may determine whether or not a touch of a user is present during a process of sensing the location of the stylus pen, and may generate the driving signal with a method for sensing the touch object such as the hand in the case in which the touch of the stylus pen is no longer sensed. On the contrary, the controlling unit may determine whether or not the touch (or hover) of the stylus pen is present during the process of sensing the location of the hand of the user, and may also generate the driving signal for sensing the location of the stylus pen in the case in which the location of the hand is no longer sensed.

In addition, the controlling unit 120 may perform a location determination of the object depending on a kind of determined object. Hereinafter, an operation of determining the location of the stylus pen will be first described.

First, the controlling unit 120 applies the driving signal to the electrodes in the channel electrode unit 110, thereby making it possible to transmit the driving signal to the resonance circuit of the object approaching the touch panel 100 through a capacitive coupling. In this case, the controlling unit 120 may apply the same driving signal to the electrodes in the channel electrode unit 110 in a unit of a plurality of electrodes.

For example, the controlling unit 120 may collectively apply the same driving signal to all of the plurality of electrodes in a preset period unit, may collectively apply the same driving signal to all of the plurality of electrodes disposed in the same direction, may collectively apply the same driving signal to only a few electrodes which are adjacent to each other among the plurality of electrodes disposed in the same direction, or may collectively apply the same driving signal to two electrodes which are intersected with each other. The application scheme described above is merely one example, and the controlling unit 120 may also apply the driving signal with schemes other than the above-mentioned illustration as long as it collectively and simultaneously applies the driving signal to two or more electrodes.

In addition, at the time of the implementation, the application scheme of the driving signal may also be determined based on magnitude of the received response signal. For example, in the case in which it is determined that the stylus pen 200 touches the touch panel 100 because the magnitude of the response signal is large, the controlling unit 120 may apply the driving signal to only the two electrodes, and in the case in which it is determined that the stylus pen 200 is in a hover state in which it hovers over the touch panel 100 because the magnitude of the response signal is small, the controlling unit 120 may simultaneously apply the driving signal to six electrodes. An operation described above will be described below with reference to FIGS. 9A, 9B, 9C, and 9D.

Meanwhile, in the case in which the controlling unit 120 senses the touch object such as the hand other than the stylus pen 200, the controlling unit 120 may apply a first driving signal as described above to electrodes on which it is expected that the stylus pen 200 is located, and may apply a second driving signal having a phase difference of 180° with the first driving signal to electrodes on which it is expected that the touch object such as the hand is located. Here, the first driving signal and the second driving signal are driving signals having the same frequency and have opposite phases (i.e., the phase difference of 180°). An operation described above will be described below with reference to FIGS. 11 to 19.

In addition, the controlling unit 120 may allow electrodes on which it is expected that the stylus pen 200 is not located at a receiving timing of the response signal (i.e., in a section in which the driving signal is not applied) to be grounded, and may receive the response signal only from ungrounded electrodes. An operation described above will be described below with reference to FIGS. 39A and 39B.

In addition, the controlling unit 120 may receive the response signal caused from the resonance circuit of the stylus pen 200 from each of the plurality of electrodes to determine the location of the stylus pen. Specifically, the controlling unit 120 may receive the response signal from each of the plurality of electrodes in the section in which the driving signal is not applied, and may determine the location of the stylus pen 200 based on a ratio between the response signals received from each of the plurality of electrodes.

For example, in the case in which the plurality of electrodes are configured in the matrix form, such that the plurality of first electrodes are disposed in the first direction and the plurality of second electrodes are disposed in the second direction which is perpendicular to the first direction, the controlling unit 120 may determine the location of the stylus pen 200 based on a ratio between response signals received from the first electrodes and a ratio between response signals received from the second electrodes.

In this case, the controlling unit 120 may improve sensitivity of the response signals by performing various signal processes for the received response signals. Specifically, the controlling unit 120 may improve sensitivity of the response signals by performing an operation of amplifying each of the plurality of received response signals, differentially amplifying a difference between the plurality of response signals, or extracting only a specific frequency component. A detailed signal processing scheme of the controlling unit 120 will be described below with reference to FIGS. 22 to 36.

In addition, the controlling unit 120 may sense touch pressure of the stylus pen 200 based on a change of a resonance frequency of the received response signal or may sense an operation mode of the stylus pen 200 based on the change of the resonance frequency of the received response signal. An operation described above will be described below with reference to FIGS. 41 and 42.

Meanwhile, in the case in which it is determined that the object is the touch object such as the hand, the controlling unit 120 may calculate capacitance between the respective electrodes at intersecting points of the plurality of electrodes formed between the first electrodes and the second electrodes, and may determine the location of the touch object based on the calculated capacitance. An operation described above will be described below with reference to FIG. 6.

Specifically, in order to sense the location of the touch object such as the hand which does not include the resonance circuit, the controlling unit 120 may apply the driving signal to at least one of the plurality of first electrodes and may calculate capacitance between the respective electrodes at the intersecting points of the plurality of electrodes formed between the first electrodes and the second electrodes based on the response signals received from each of the plurality of second electrodes. Here, the driving signal may be a pulse signal having a binary value.

In addition, in order to sense the location of the touch object such as the hand which does not include the resonance circuit, the controlling unit 120 may apply signals encoded with digital codes different from each other to the plurality of first electrodes and perform decoding suitable for the applied digital codes for the response signals received from each of the plurality of second electrodes, to thereby calculate capacitance between the plurality of first electrodes and the plurality of second electrodes.

In addition, the controlling unit 120 may determine an intersecting point having the largest change of capacitance based on the calculated capacitances of the respective intersecting points as the location of the touch object.

As described above, since the touch panel 100 according to the present embodiment provides the driving signal to the stylus pen 200 through the capacitive coupling, the stylus pen 200 may be operated even though it is not self-powered. In addition, since the touch panel 100 according to the present embodiment of the present disclosure collectively provides the driving signal to the plurality of electrodes, the touch panel 100 may provide more energy to the stylus pen 200. As a result, since the stylus pen 200 generates a large response signal, reception sensitivity may be improved. In addition, since the touch panel 100 according to the present embodiment performs various signal processes for the received response signals, reception sensitivity for the response signals may be improved.

Hereinabove, although only a basic configuration of the touch panel 100 has been illustrated and described, the touch panel 100 may further include configurations other than the configurations described above. For example, in the case in which the touch panel 100 is a touch screen, a display configuration may be further included, and in the case in which the touch panel 100 is an apparatus such as a smartphone, PMP, or the like, a display, a storing unit, a communication configuration, and the like may be further included.

Figure 3:
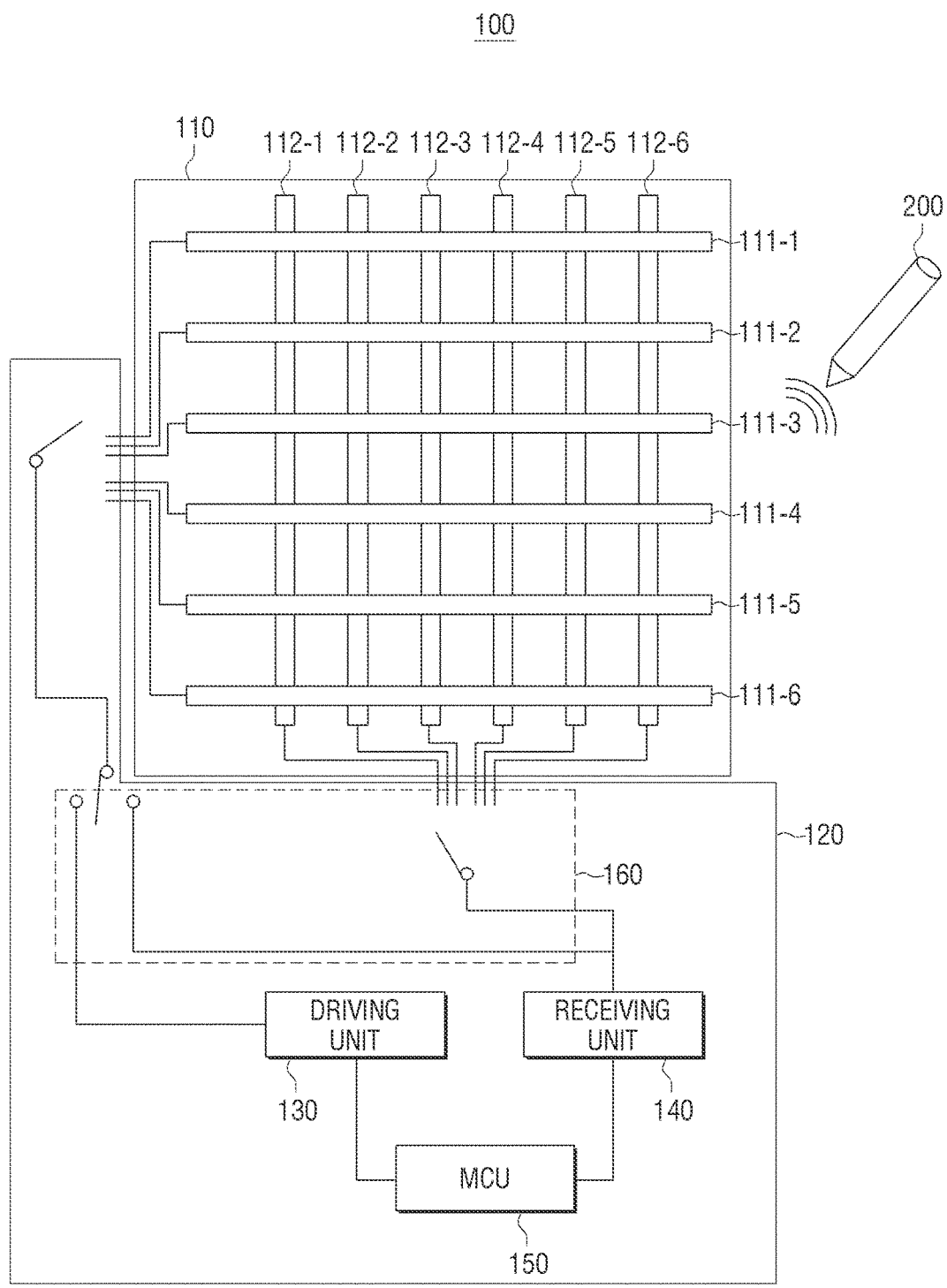
FIG. 3 is a circuit diagram of the touch panel of FIG. 1.

FIG. 3 is a circuit diagram of the touch panel of FIG. 1.

Referring to FIG. 3, the touch panel 100 may be configured to include the channel electrode unit 110 and the controlling unit 120.

The channel electrode unit 110 may include a plurality of electrodes. Specifically, as illustrated in FIG. 3, the channel electrode unit 110 may include a first electrode group 111 and a second electrode group 112 which are disposed in different directions.

The first electrode group 111 may include a plurality of first electrodes 111-1, 111-2, 111-3, 111-4, 111-5, and 111-6 which are disposed in a first direction (e.g., horizontal direction). Here, the first electrode, which is a transparent electrode, may be indium tin oxide (ITO). The plurality of first electrodes 111-1, 111-2, 111-3, 111-4, 111-5, and 111-6 in the first electrode group 111 may be transmitting electrodes transmitting a predetermined transmission signal (Tx signal), when the location of the finger is sensed.

The second electrode group 112 may include a plurality of second electrodes 112-1, 112-2, 112-3, 112-4, 112-5, and 112-6 which are disposed in a second direction (e.g., vertical direction). Here, the second electrode, which is a transparent electrode, may be ITO. The plurality of second electrodes 112-1, 112-2, 112-3, 112-4, 112-5, and 112-6 in the second electrode group 112 may be receiving electrodes receiving a reception signal (Rx signal) caused by the Tx signal input from the first electrode when the location of the finger is sensed.

Meanwhile, when the location of the stylus pen is sensed, the first electrodes and the second electrodes may be transmitting and receiving electrodes that transmit the signal in a Tx section and receive the signal in a receiving section, depending on a driving section.

Meanwhile, although the illustrated example illustrates the case in which each of the electrode groups includes only six electrodes, the electrode group may be implemented by seven or more, or five or less electrodes, at the time of the implementation. In addition, although the illustrated example illustrates the case in which a shape of the electrode in the electrode group is a simple rectangle, the shape of each electrode may also be implemented in a more complex shape at the time of the implementation.

The controlling unit 120 is configured to include a driving unit 130, a receiving unit 140, a microcontroller unit (MCU) 150, and a connecting unit 160.

The driving unit 130 applies the driving signal to the channel electrode unit 110 at a predetermined timing. The driving signal may be a sine wave signal having a predetermined resonance frequency.

The receiving unit 140 receives the response signals from the respective electrodes in the channel electrode unit 110 in a section in which the driving signal is not applied. Specifically, the receiving unit 140 may sequentially receive the response signals of the plurality of electrodes in a unit of a single electrode. Alternatively, the receiving unit 140 may simultaneously receive the response signals in a unit of the plurality of electrodes. In this case, in order to simultaneously receive a plurality of response signals, the receiving unit 140 may include a plurality of amplifying units. The example described above will be described below with reference to FIGS. 27 to 35.

In addition, the receiving unit 140 may perform various signal processes for the received response signals. For example, the receiving unit 140 may amplify each response signal using an amplifier amp. The example described above will be described below with reference to FIG. 22. In addition, the receiving unit 140 may perform a signal process differentially amplifying the response signals in a unit of two response signals. The example described above will be described below with reference to FIG. 23. In addition, the receiving unit 140 may perform a signal process extracting only information in a preset frequency region from the received response signals. The example described above will be described below with reference to FIG. 26.

The MCU 150 may control the driving unit 130, the receiving unit 140, and the connecting unit 160 so that the application of the driving signal and the reception of the response signals to the respective electrodes are alternately performed. For example, the MCU 150 may control the driving unit 130 so that the same driving signal is simultaneously applied to the plurality of first electrodes 111-1, 111-2, 111-3, 111-4, 111-5, and 111-6 in a first time section, and may control the receiving unit 140 so as to receive a response signal of at least one electrode (e.g., the electrode 111-1) in a second time section after the application of the driving signal. Thereafter, the MCU 150 may control the driving unit 130 so that the same driving signal is again applied to the plurality of first electrodes 111-1, 111-2, 111-3, 111-4, 111-5, and 111-6 in a third time section, and may control the receiving unit 140 so as to receive a response signal of another electrode (e.g., the electrode 111-2) in a fourth time section after the application of the driving signal. In addition, the MCU 150 may repeat the above-mentioned process as many as the number of times receiving the response signals for the plurality of electrodes. In the illustrated example, since the channel electrode unit 110 includes twelve electrodes, the MCU 150 may alternately perform twelve application and reception operations. An operation described above will be described in detail with reference to FIGS. 8A, 8B, 8C, 8D, 8E, 8F, 8G, 8H, 8I, 8J, 8K, and 8L.

In addition, when the response signals for the plurality of electrodes are received, the MCU 150 may determine the location of the stylus pen based on a ratio between the response signals received by the first electrodes 111-1, 111-2, 111-3, 111-4, 111-5, and 111-6, and a ratio between the response signals received by the second electrodes 112-1, 112-2, 112-3, 112-4, 112-5, and 112-6.

For example, if magnitude of the response signal of the first electrode 111-3 is larger than that of the response signals of other first electrodes 111-1, 111-2, 111-4, 111-5, and 111-6, and magnitude of the response signal of the second electrode 112-2 is larger than that of the response signals of other second electrodes 112-1, 112-3, 112-4, 112-5, and 112-6, the MCU 150 may determine a location at which the first electrode 111-3 and the second electrode 112-2 intersect with each other, as the location of the stylus pen 200.

Meanwhile, at the time of the implementation, the location of the stylus pen 200 may be more precisely determined using an interpolation method utilizing a ratio between a response signal of an electrode receiving the largest response signal and a response signal received by an electrode which is adjacent to the corresponding electrode. For example, in the case in which a distance between the first electrodes is 4 mm, when the location of the stylus pen 200 is determined by the location at which the first electrode and the second electrode intersect with each other, identification resolution is 4 mm. On the other hand, when the interpolation method is used, identification resolution of 0.1 mm may be implemented.

The connecting unit 160 may selectively connect the plurality of electrodes to the driving unit 130, or may selectively connect the plurality of electrodes to the receiving unit 140. Specifically, the connecting unit 160 may connect an electrode to which the driving signal is to be applied and the driving unit 130, according to a control of the MCU 150. In this case, the connecting unit 160 may allow electrodes to which the driving signal is not applied to be grounded or floated.

In addition, the connecting unit 160 may allow at least one electrode of the plurality of first and second electrodes to be grounded, within the section in which the driving signal is not applied, that is, within the time section receiving the response signal. An operation described above will be described below with reference to FIGS. 39A and 39B.

Meanwhile, hereinabove, although the above-mentioned description describes the case in which the MCU 150 controls the connecting unit 160, at the time of the implementation, the driving unit 130 may control the connecting unit 160 when the driving signal is applied, and the receiving unit 140 may also control the connecting unit 160 when the response signal is received.

Hereinabove, although the above-mentioned description describes the case in which the same driving signal is collectively applied to the plurality of first electrodes in the first electrode group, at the time of the implementation, the same driving signal may also be collectively applied to the plurality of second electrodes in the second electrode group, and the same driving signal may also be collectively applied to the plurality of first and second electrodes in the first electrode group and the second electrode group. In addition, the driving signal may be applied using a scheme other than the above-mentioned schemes. Hereinafter, various examples of the application of the driving signal will be described with reference to FIGS. 4 to 9.

Meanwhile, although the case in which the plurality of electrodes are disposed in the matrix form has been described in illustrating and describing FIG. 3, at the time of the implementation, the plurality of electrodes may also be disposed in a form other than the matrix form.

Meanwhile, although FIG. 3 illustrates and describes the case in which the controlling unit 120 includes only one driving unit and one receiving unit, at the time of the implementation, the controlling unit 120 may also be configured to include a plurality of driving units and receiving units. The example described above will be described below with reference to FIG. 38.

Figure 4:
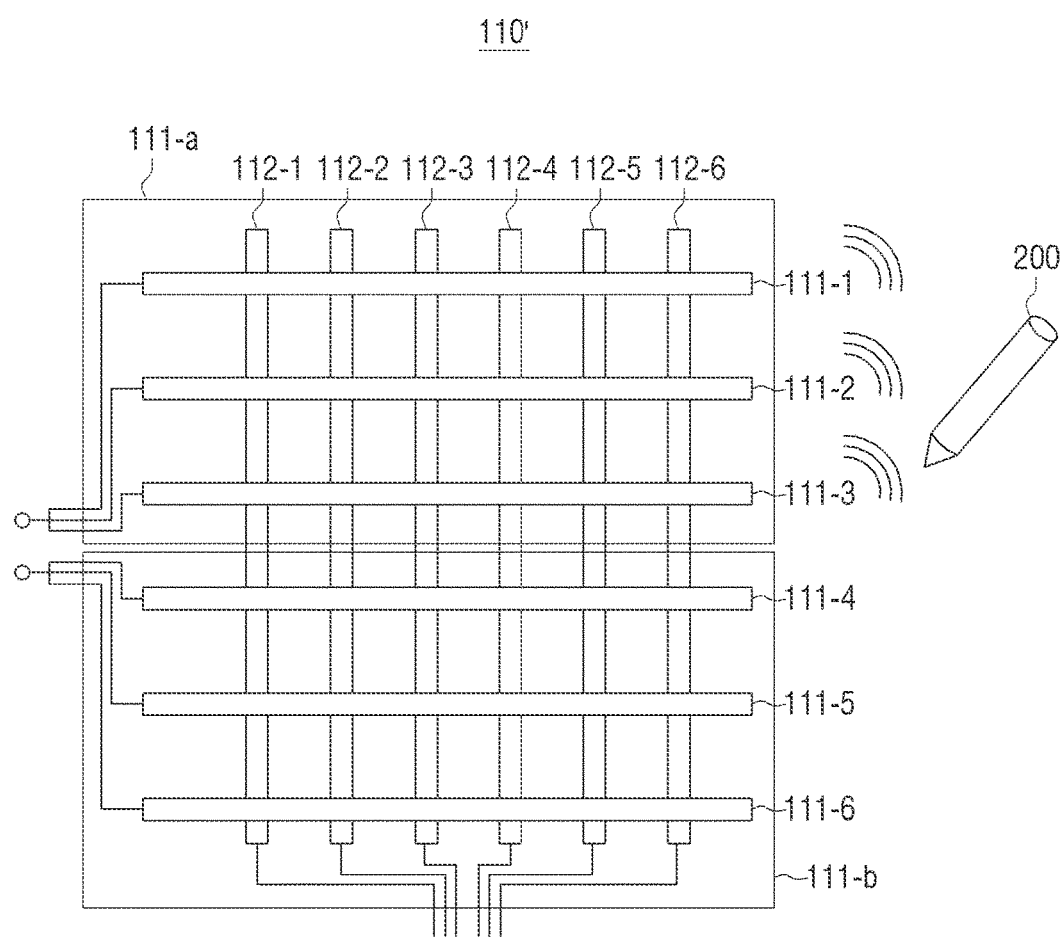
FIG. 4 is a diagram illustrating an application operation of a driving signal of a channel electrode unit according to an embodiment of the present disclosure.

FIG. 4 is a diagram illustrating an application operation of a driving signal of a channel electrode unit according to an embodiment of the present disclosure.

Referring to FIG. 4, a channel electrode unit 110' includes a plurality of electrodes 111 and 112. Specifically, as illustrated in FIG. 4, the channel electrode unit 110' may include a first electrode group 111 and a second electrode group 112 which are disposed in different directions. In this case, the first electrode group 111 is classified into a plurality of sub-groups 111-a and 111-b in a unit of a plurality of electrodes which are continuously disposed. In the illustrated example, the first electrode group 111 may be classified into a first sub-group 111-a and a second sub-group 111-b.

The controlling unit 120 may determine the sub-group to which the driving signal is to be applied, based on the location of the stylus pen 200 sensed in the previous process. In addition, the controlling unit 120 may collectively input the same driving signal to all electrodes in the determined sub-group.

For example, if the location of the stylus pen 200 sensed in the previous process is a location at which the first electrode 111-3 and the second electrode 112-2 intersect with each other, the controlling unit 120 may determine the first sub-group 111-a of the corresponding location as a sub-group to which the driving signal is to be input, and may simultaneously input the same driving signal to the electrodes 111-1, 111-2, and 111-3 in the first sub-group 111-a.

In this case, the controlling unit 120 may ground or float the electrodes 111-4, 111-5, 111-6, 112-1, 112-2, 112-3, 112-4, 112-5, and 112-6 to which the driving signal is not applied.

Meanwhile, hereinabove, although the case in which the sub-group is classified in advance has been described, at the time of the implementation, the sub-group may be dynamically varied. For example, the controlling unit 120 may determine the electrode (e.g., electrode 111-3) receiving the largest response signal in the previous sensing process, and the electrodes 111-2 and 111-4 within a preset interval from the corresponding electrode 111-3, as the sub-group to which the driving signal is to be simultaneously input. The determination of the sub-group may be performed in a unit of one time cycle taken to detect the location of the stylus pen.

In addition, hereinabove, although the case in which the sub-group is formed only within the electrode groups disposed in the same direction has been described, at the time of the implementation, at least one electrode 111-3 within the first electrode group 111 and at least one electrode 112-2 within the second electrode group 112 may be determined as the sub-group. That is, the driving signal may also be simultaneously applied to at least one first electrode within the first electrode group 111 and at least one second electrode within the second electrode group 112.

As such, according to the present embodiment, since the same driving signal is simultaneously applied to the plurality of electrodes, energy transmitted to the stylus pen may be increased. This will be described below with reference to FIG. 5.

Figure 5:
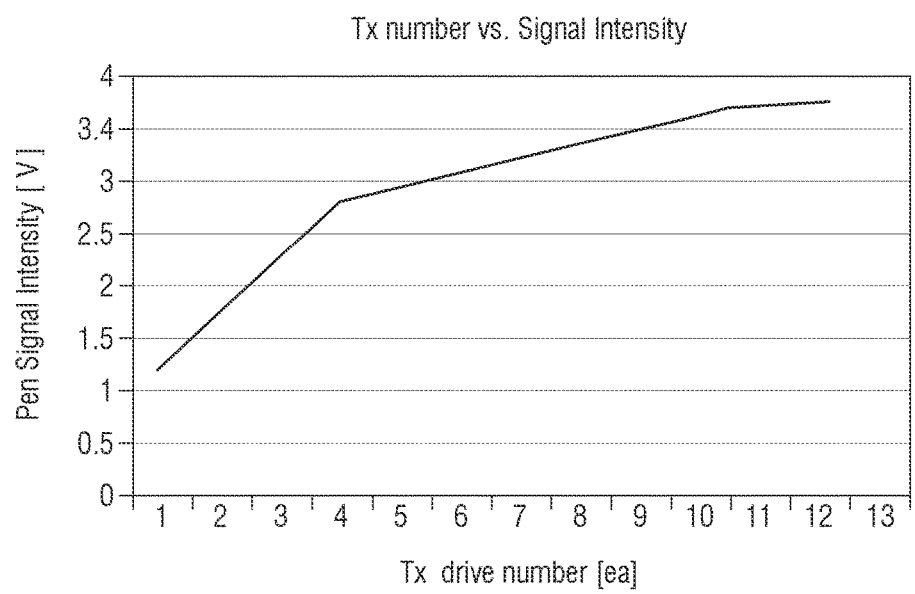
FIG. 5 is a diagram illustrating magnitude of a generated signal of a stylus pen according to the number of electrodes to which the driving signal is input according to an embodiment of the present disclosure.

FIG. 5 is a diagram illustrating magnitude of a generated signal of the stylus pen according to the number of electrodes to which the driving signal is input according to an embodiment of the present disclosure.

Referring to FIG. 5, it may be appreciated that as the number of electrodes to which the driving signal is input is increased, signal intensity generated from the stylus pen is increased.

Specifically, energy transmitted to the stylus pen 200 from the touch panel 100 is determined by a driving voltage and capacitance between the electrode and a pen tip of the stylus pen, and when the number of electrodes to which the driving signal is applied is increased, the capacitance between the electrode and the pen tip is increased, such that magnitude of the signal generated from the pen is increased in proportion to the increased capacitance.

In addition, when the magnitude of the signal generated from the stylus pen 200 is increased, the response signal caused from the touch panel 100 is also increased, thereby making it possible to improve sensitivity of the response signal.

Therefore, in the case in which the touch object is the stylus pen, the controlling unit 120 according to the present embodiment of the present disclosure may apply the driving signal in a unit of the plurality of electrodes. On the contrary, in the case in which the touched object is the object such as the hand, the controlling unit 120 may apply the driving signal in a unit of one electrode. An operation described above will be described with reference to FIG. 6.

Figure 6:
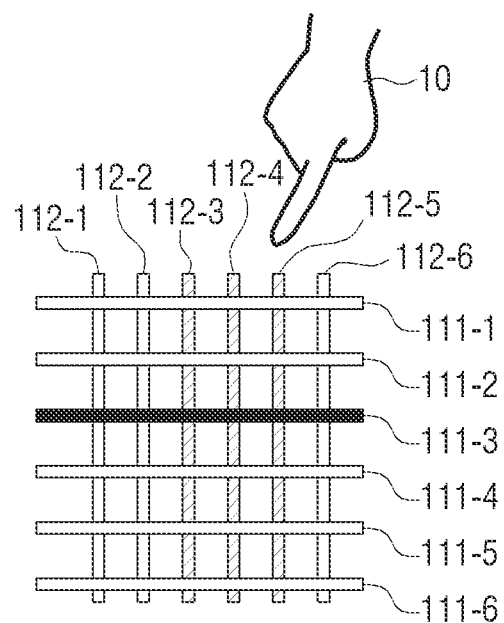
FIG. 6 is a diagram illustrating an operation of determining a location of a touch object according to an embodiment of the present disclosure.

FIG. 6 is a diagram illustrating an operation of determining the location of the touch object according to an embodiment of the present disclosure.

Referring to FIG. 6, in the case in which it is determined that the touched object is the touch object such as the hand 10, the controlling unit 120 may apply the driving signal in a unit of one electrode. Specifically, the controlling unit 120 may input an electric signal according to a preset order to only the first electrodes 111-1, 111-2, 111-3, 111-4, 111-5, and 111-6 of the plurality of electrodes.

For example, the controlling unit 120 may apply the driving signal to the first electrode 111-1 in a first time section which is preset, and may sequentially receive the response signals received from each of the plurality of second electrodes 112-1, 112-2, 112-3, 112-4, 112-5, and 112-6 during a process in which the driving signal is applied.

In addition, in the case in which the response signals are received from the plurality of second electrodes, the controlling unit 120 may apply the driving signal to the second electrode 111-2 in a second time section, and may sequentially receive the response signals received from each of the plurality of second electrodes 112-1, 112-2, 112-3, 112-4, 112-5, and 112-6 during a process in which the corresponding driving signal is applied.

In addition, the controlling unit 120 may repeat the above-mentioned process for the following first electrode. Since the illustrated example includes six first electrodes, the controlling unit 120 may perform six application operations of the driving signal, and may perform six reception operations of the response signal during each process of applying the driving signal.

Meanwhile, hereinabove, although the case in which the response signal is received in a unit of one channel, that is, a unit of one electrode, has been described, at the time of the implementation, the reception of the response signal may be performed in a unit of a plurality of channels. For example, as illustrated in FIG. 6, after the signal is applied to the first electrode 111-3, the measurement of the response signals of three second electrodes 112-3, 112-4, and 112-5 may also be simultaneously performed.

Meanwhile, at the time of the implementation, a measurement task may be more quickly performed by performing the above-mentioned process for only the first electrodes around the measured location depending on the location measured in the previous process, that is, performing only the measurement for some electrodes of all of the first electrodes.

In addition, the controlling unit 120 may detect an intensity change of the response signals based on the response signals from the second electrodes for each of the plurality of first electrodes in the previous process, and may determine the location of the touch object based on the detected intensity change.

For example, in the case in which the intensity change of the response signals received from three second electrodes for three first electrodes is as illustrated in Table 1, it may be determined that values in Table 1 correspond to a change of capacitance at the intersecting points of the first electrodes and the second electrodes. Therefore, since the change of the signal intensity at the first electrode 111-3 and the second electrode 112-3 is largest, it may be determined that the touch of the user is made at the corresponding point.

TABLE 1

| Period | Intensity of Rx signal at 112-2 | Intensity of Rx signal at 112-3 | Intensity of Rx signal at 112-4 |
|---|---|---|---|
| Application of Driving Signal at 111-2 | 2 | 8 | 3 |
| Application of Driving Signal at 111-3 | 5 | 15 | |
| Application of Driving Signal at 111-4 | 2 | 4 | 5 |

FIGS. 7A, 7B, 8A, 8B, 8C, 8D, 8E, 8F, 8G, 8H, 8I, 8J, 8K, 8L, 9A, 9B, 9C, and 9D are diagrams illustrating an operation of determining a location of an object having a resonance circuit according to various embodiments of the present disclosure.

Figure 7A:
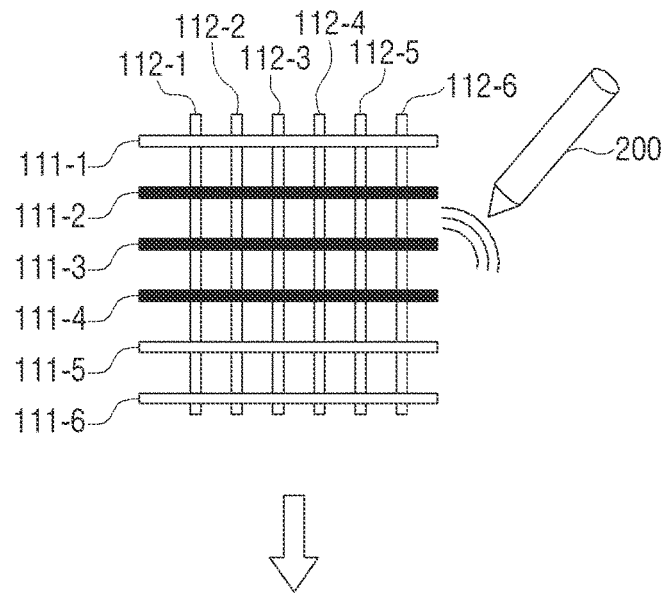
FIGS. 7A, 7B, 8A, 8B, 8C, 8D, 8E, 8F, 8G, 8H, 8I, 8J, 8K, 8L, 9A, 9B, 9C, and 9D are diagrams illustrating an operation of determining a location of an object having a resonance circuit according to various embodiments of the present disclosure.
Figure 7B:
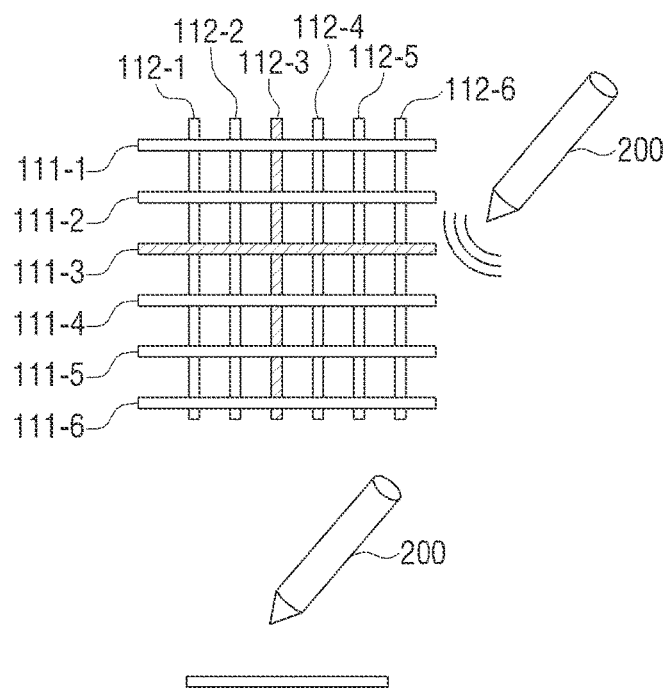

Referring to FIGS. 7A and 7B, the controlling unit 120 may determine the sub-group to which the driving signal is to be applied, based on a location of a stylus pen 200 sensed in the previous process. For example, as shown in FIG. 7A, in the case in which it has been determined in the previous process that the stylus pen 200 is located over the first electrode 111-3, the controlling unit 120 may determine three first electrodes 111-2, 111-3, and 111-4 as the sub-group to which the driving signal is to be simultaneously applied. In addition, the controlling unit 120 may collectively input the same driving signal to the electrodes (e.g., 111-2, 111-3, and 111-4) in the determined sub-group.

In the case in which the same driving signal is input to the three first electrodes not one first electrode as illustrated, the magnitude of the signal generated from the stylus pen 200 is increased as illustrated in FIG. 5. Thus, even in a state (i.e., a hover state) in which the stylus pen 200 is somewhat spaced apart from the touch panel 100 as shown in FIG. 7B, which is not in contact with the touch panel 100, the response signal of the stylus pen 200 may be transmitted to the respective electrodes. Therefore, the touch panel 100 according to the present embodiment may receive air command from the user.

In addition, the controlling unit 120 may receive the response signals from the electrodes in a unit of the preset number of electrodes. In addition, the controlling unit 120 may alternately perform the application of the driving signal and the reception of the response signal as described above. An operation described above will be described below in detail with reference to FIGS. 8A, 8B, 8C, 8D, 8E, 8F, 8G, 8H, 8I, 8J, 8K, and 8L.

Referring to FIGS. 8A, 8B, 8C, 8D, 8E, 8F, 8G, 8H, 8I, 8J, 8K, and 8L, in the illustrated drawing, lines indicated by black color are electrodes to which the driving signal is applied, and hashed lines are lines from which the response signals are measured. Based on this, referring to FIG. 8A, the controlling unit 120 may apply the driving signal to the electrodes 111-2, 111-3, and 111-4 in the predetermined first sub-group.

Figure 8A:
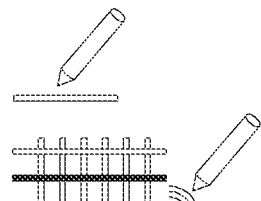
Figure 8B:
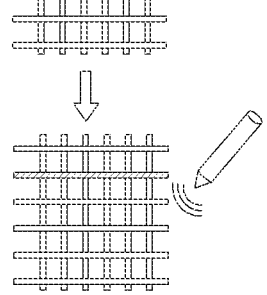
Figure 8C:
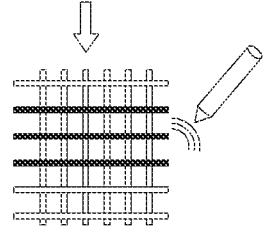
Figure 8D:
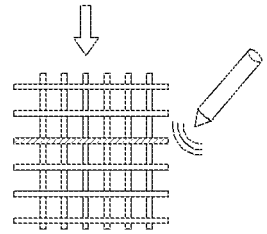
Figure 8E:
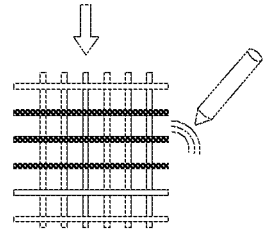
Figure 8F:
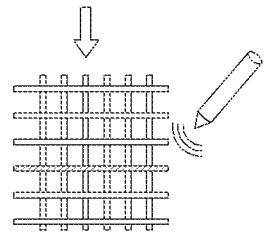
Figure 8G:
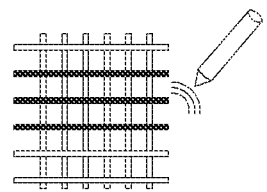
Figure 8H:
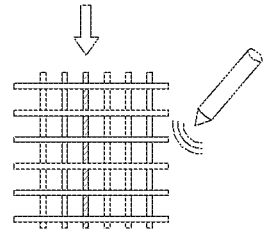
Figure 8I:
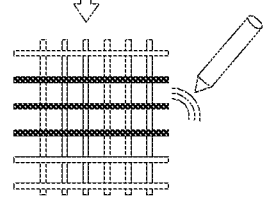
Figure 8J:
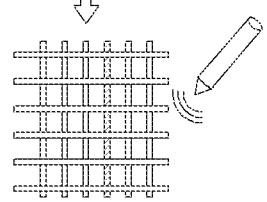
Figure 8K:
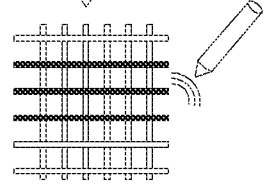
Figure 8L:
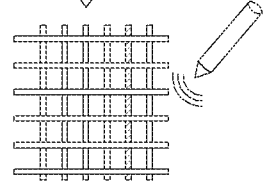

In addition, after a preset time after the driving signal is applied, the controlling unit 120 may receive the response signal from the first electrode 111-2 as illustrated in FIG. 8B. In addition, even after a preset time unit, as illustrated in FIG. 8C, the controlling unit 120 may again apply the driving signal to the electrodes 111-2, 111-3, and 111-4 in the first sub-group. In addition, the controlling unit 120 may receive the response signal of the first electrode 111-3, which is a next electrode, as illustrated in FIG. 8D.

That is, the controlling unit 120 may apply the driving signal at the timing such as a preset period unit (FIGS. 8A, 8C, 8E, 8G, 8I, and 8K). In addition, the controlling unit 120 may sequentially receive the response signals of the plurality of electrodes between sections in which each driving signal is applied (i.e., sections in which the driving signal is not applied) as illustrated in FIGS. 8B, 8D, 8F, 8H, 8J, and 8L.

In addition, the controlling unit 120 may determine the location of the stylus pen based on the response signals received from each electrode. Specifically, the controlling unit 120 may determine the location of the stylus pen 200 based on a ratio between the response signals received from the first electrodes and a ratio between the response signals received from the second electrodes.

Meanwhile, although the case in which the response signals are received from only six electrodes of twelve electrodes has been described with reference to FIGS. 8A, 8B, 8C, 8D, 8E, 8F, 8G, 8H, 8I, 8J, 8K, and 8L, this is merely an implementation example, and at the time of the implementation, the response signals may also be received from all of the twelve electrodes. In addition, at the time of the implementation, it is possible to implement a form in which the response signals are received from only five or less electrodes. In addition, the electrodes receiving the response signals are not fixed, but the number and locations of electrodes may be selected based on a coordinate of the object measured in the previous process.

In addition, although the case in which the driving signal is applied in a unit of one sub-group has been described with reference to FIGS. 8A, 8B, 8C, 8D, 8E, 8F, 8G, 8H, 8I, 8J, 8K, and 8L, the determination of the sub-group may be adaptively determined depending on the magnitude of the response signal. This will be described with reference to FIGS. 9A, 9B, 9C, and 9D.

Figure 9A:
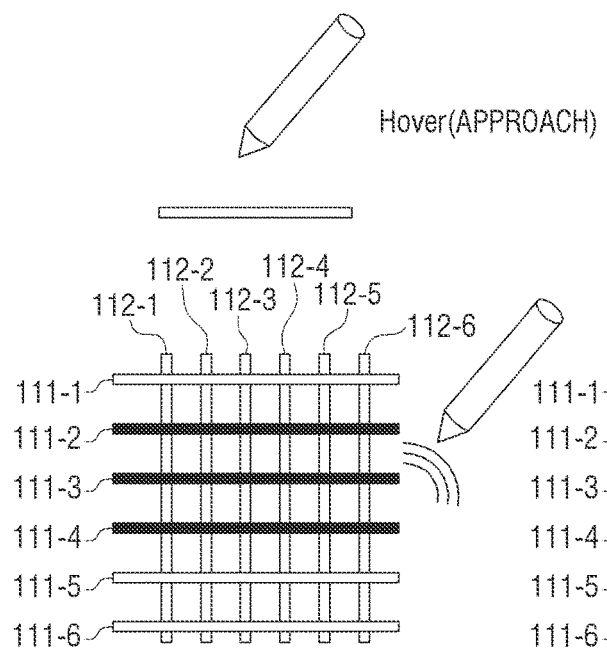
Figure 9B:
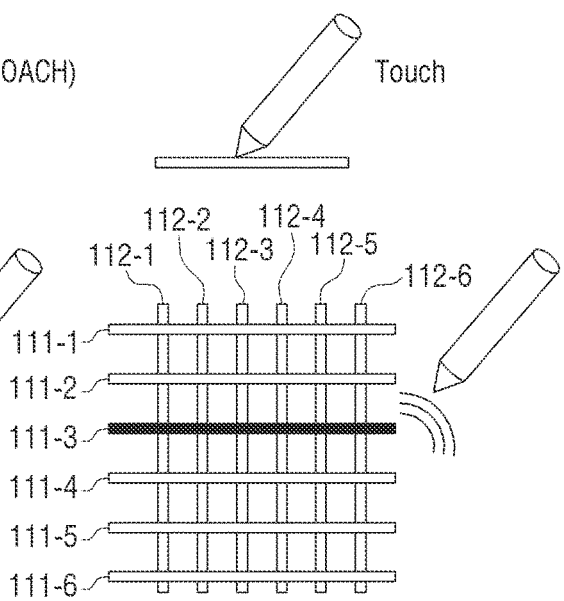

Referring to FIGS. 9A, 9B, 9C, and 9D, in a state in which the stylus pen touches the touch panel 100 as illustrated in FIG. 9B, there is no need for many channels to transmit the driving signal. Thus, the controlling unit 120 may allow only the first electrode 111-3 corresponding to the previously sensed location to transmit the driving signal.

Figures 9C, 9D:
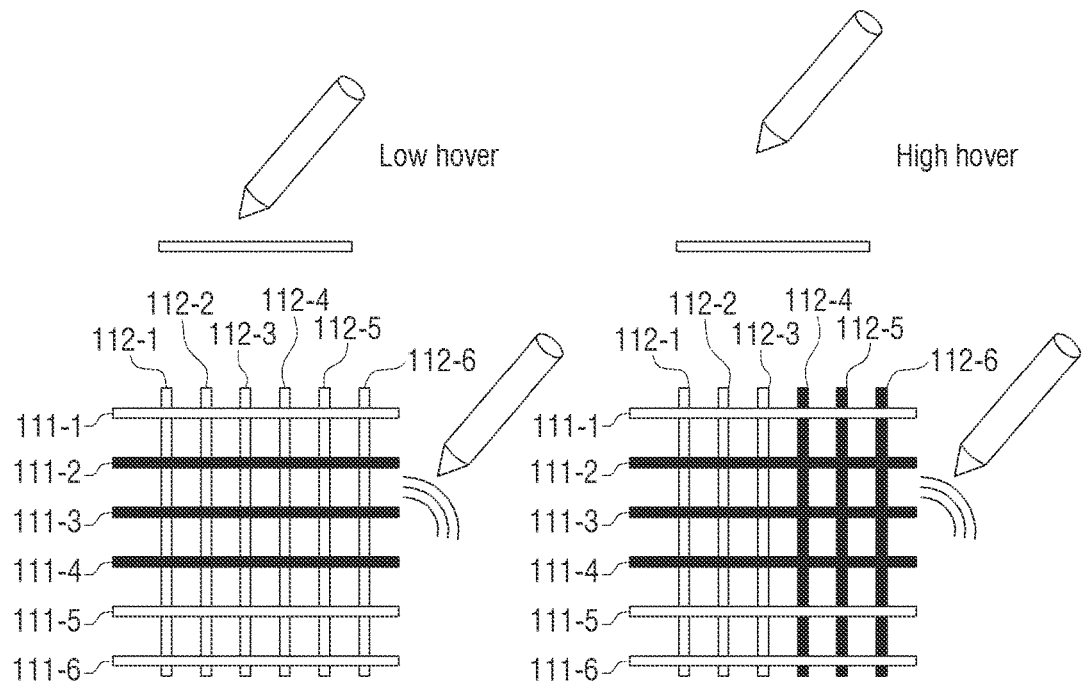

Meanwhile, in a hover state in which the stylus pen does not touch the touch panel as illustrated in FIGS. 9A, 9C, and 9D, the controlling unit 120 may allow the first electrode corresponding to the previously sensed location and the first electrode around the first electrode corresponding to the previously sensed location together to transmit the driving signal. Here, the hover means a state in which the stylus pen does not touch the touch panel and is spaced apart from the touch panel by a predetermined distance. In addition, the hover may be classified into a general hover, a low hover, and a high hover, depending on the distance, and the above-mentioned classification may be made according to the magnitude of the sensed response signal.

For example, in the case in which the magnitude of the previously sensed response signal is weak, that is, in the case in which the stylus pen is significantly spaced apart from the touch panel (in the case of the high hover as illustrated in FIG. 9D), the controlling unit 120 may allow a plurality of vertical electrodes (second electrodes) as well as a plurality of horizontal electrodes (first electrodes) to transmit the driving signal so that more resonance signals than that of the low hover as illustrated in FIG. 9C may be transmitted to the corresponding stylus pen.

That is, the controlling unit 120 may determine the number of electrodes to which the driving signal is to be transmitted, based on the largest magnitude of the response signal. For example, in the case in which the largest response signal is a first magnitude or more which is preset (i.e., it is determined that the touch is made), the controlling unit 120 may apply the driving signal to only the first electrode 111-3 from which the largest response signal is received. In addition, in the case in which the largest response signal is less than the first magnitude and is a second magnitude or more which is smaller than the first magnitude (i.e., in the case of the low hover), the controlling unit 120 may simultaneously apply the driving signal to the first electrodes 111-2 and 111-4 within a range which is preset with the first electrode 111-3 of the largest response signal among the plurality of first electrodes. In addition, in the case in which the largest response signal is less than the second magnitude (i.e., in the case of the high hover), the controlling unit 120 may simultaneously apply the driving signal to the first electrodes 111-2 and 111-4 within the range which is preset with the first electrode 111-3 of the largest response signal among the plurality of first electrodes, and to the second electrodes 112-4 and 112-7 within a range which is preset with the second electrode 112-5 of the largest response signal among the plurality of second electrodes.

Meanwhile, hereinabove, although only the case in which the number of electrodes to which the driving signal is to be simultaneously applied is varied based on the magnitude of the response signal has been described, as long as another scheme capable of measuring the distance between the stylus pen and the touch panel is provided, the number of electrodes may be varied using the corresponding scheme.

Meanwhile, hereinabove, in the case in which only the touch object such as the hand of the user touches the touch panel, or only the stylus pen touches the touch panel, the case in which the touch location of the hand of the user or the location of the tip of the stylus pen is determined has been described. However, even in the case in which the stylus pen is used, the tip of the stylus pen and the hand of the user may be simultaneously disposed on the touch panel. A change of the driving signal according to the case in which the hand is additionally disposed, and a driving scheme taking into account the change of the driving signal will be described below with reference to FIGS. 10 to 19.

Figure 10:
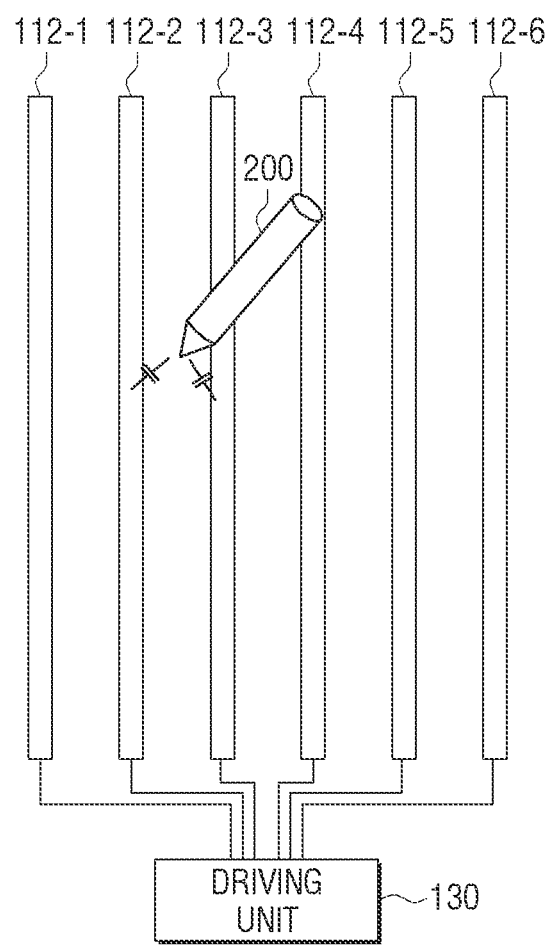
FIGS. 10 and 11 are diagrams illustrating a connected state between the touch panel and the stylus pen according to various embodiments of the present disclosure.
Figure 11:
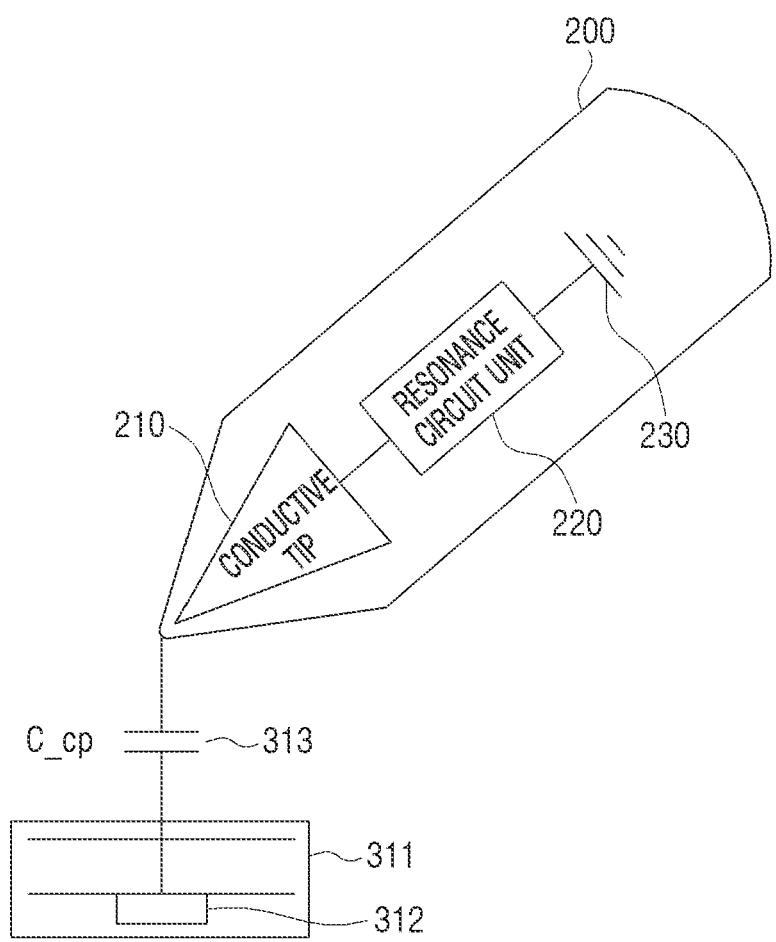

FIGS. 10 and 11 are diagrams illustrating a connected state between the touch panel and the stylus pen according to various embodiments of the present disclosure.

Referring to FIGS. 10 and 11, in the case in which the stylus pen 200 is disposed between the plurality of electrodes 112-2 and 112-3, the stylus pen 200 forms separate capacitance 313 with each of the plurality of electrodes 112-2 and 112-3, wherein the capacitance 313 is connected to a driving unit 312 of a controlling unit 311. Thus, two driving signals are transmitted to the stylus pen 200, such that more energy is transmitted to the stylus pen 200 as described in FIG. 5. Meanwhile, although the illustrated example describes the case in which the stylus pen 200 forms the capacitances with only the two electrodes, this representatively illustrates a component that largely affects the magnitude of the response signal among the capacitances formed between the stylus pen 200 and the electrodes, for convenience in explanation.

Figure 12:
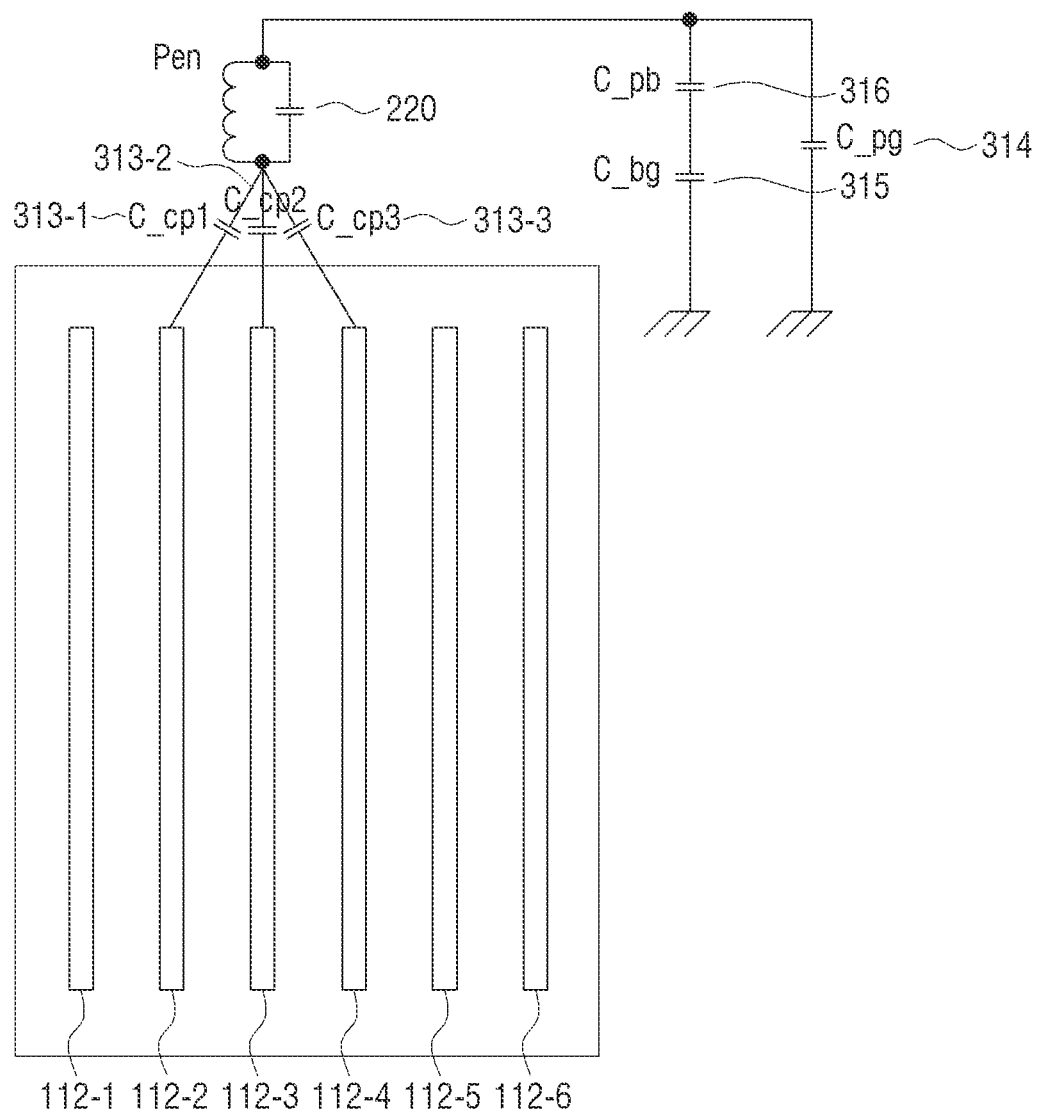
FIG. 12 is an equivalent circuit diagram of a case in which the stylus pen is disposed between a plurality of electrodes according to an embodiment of the present disclosure.

Meanwhile, the stylus pen 200 may be configured to include a conductive tip 210, a resonance circuit unit 220, and a ground unit 230 as illustrated in FIG. 11, wherein the ground unit 230 is connected to a case of the stylus pen 200 and is grounded through a body of the user in the case in which the user grabs the stylus pen 200. An equivalent circuit diagram of the above-mentioned connected state is illustrated in FIG. 12. Meanwhile, a detailed configuration and operation of the stylus pen 200 will be described below with reference to FIGS. 40 to 43.

FIG. 12 is an equivalent circuit diagram of the case in which the stylus pen 200 is disposed between the plurality of electrodes 112-2 and 112-3 according to an embodiment of the present disclosure.

Referring to FIG. 12, the touch panel 100 and the stylus pen 200 are connected to each other through a plurality of capacitors. Specifically, the electrodes of the touch panel 100 are connected to the resonance circuit of the stylus pen 200 through first capacitors 313-1, 313-2, and 313-3 formed between the respective electrodes and the conductive tip of the stylus pen.

Here, the first capacitors 313-1, 313-2, and 313-3 are formed of capacitances C_cp-1, C_cp-2, and C_cp-3 between the conductive tip 210 of the stylus pen 200 and the respective electrodes of the touch panel 100. As described above, since the stylus pen 200 is disposed between the electrode 112-2 and the electrode 112-3, large capacitance is formed between the electrode in the vicinity of the stylus pen and the pen tip as compared to the electrodes which are far apart.

One end of the resonance circuit unit 220 is connected to the first capacitors 313-1, 313-2, and 313-3, and the other end of the resonance circuit unit 220 is commonly connected to a second capacitor 314 and a third capacitor 316. Here, the capacitors and inductors forming the resonance circuit in the stylus pen 200 have capacitance and inductance values for generating the preset response signal.

The second capacitor 314 is capacitance C_pg between the case (i.e., the ground unit) of the stylus pen 200 and the ground of the touch panel 100.

The third capacitor 316 is capacitance C_pb between the case (i.e., the ground unit) of the stylus pen 200 and the hand of the user. In addition, the third capacitor 316 is connected to the ground of the touch panel 100 through a fourth capacitor 315. Here, the fourth capacitor 315 is capacitance C_bg between the hand of the user and the ground of the touch panel 100.

Figure 13:
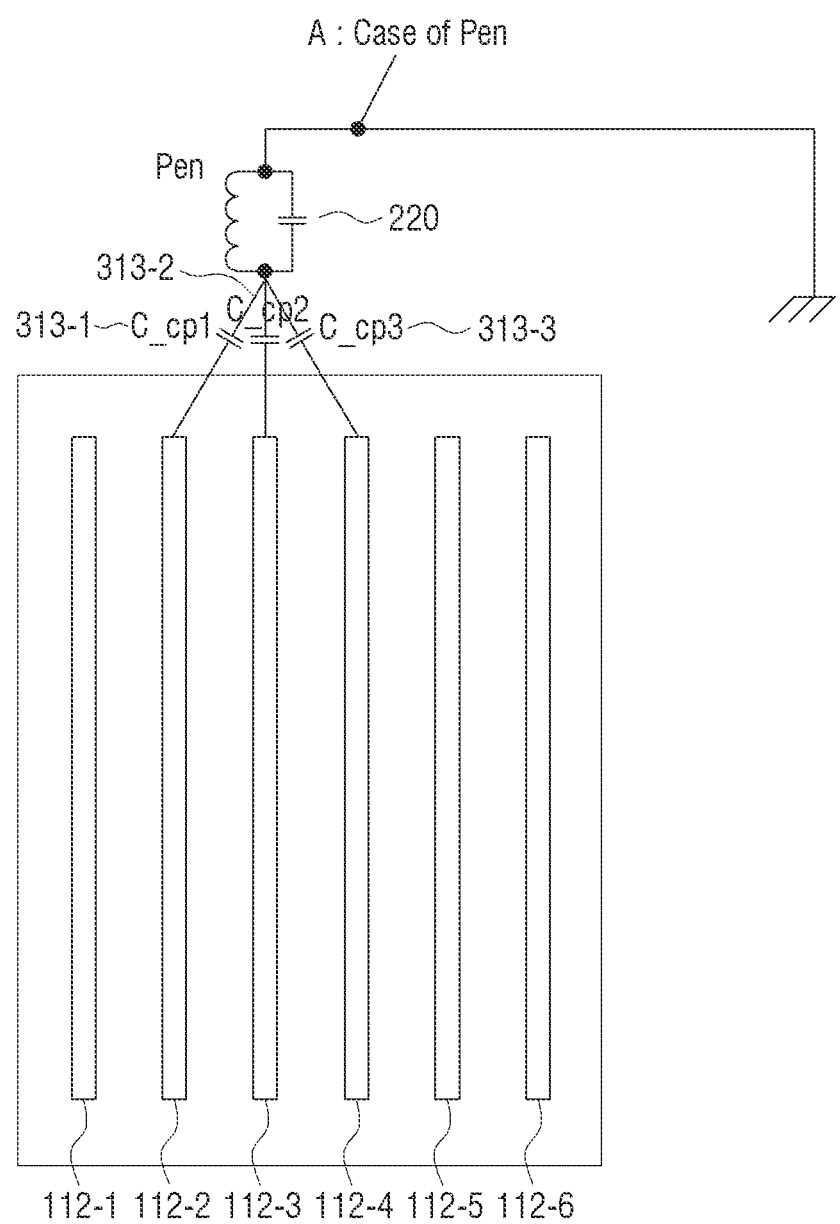
FIG. 13 is a simplified equivalent circuit diagram of a case in which capacitance values are sufficiently large in the equivalent circuit diagram of FIG. 12.
Figure 14:
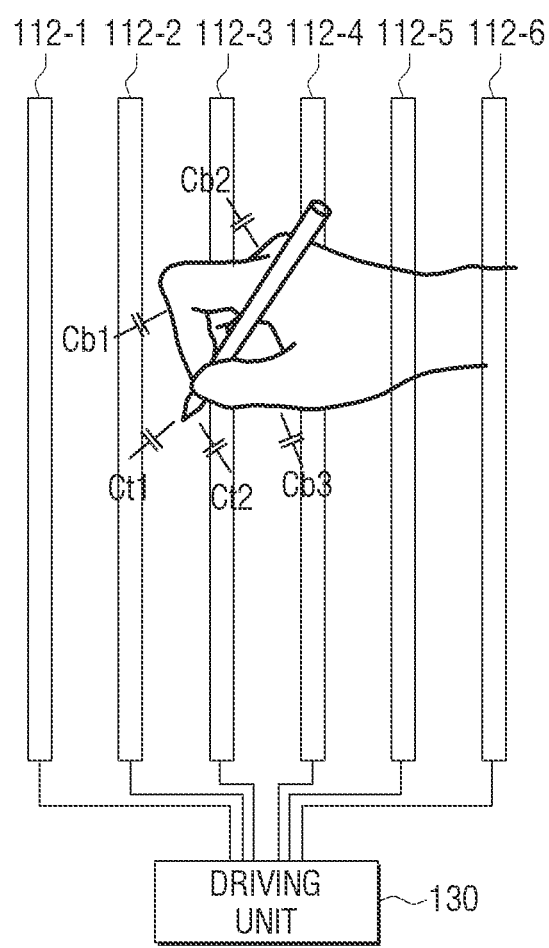
FIG. 14 is a diagram illustrating a connected state between the touch panel, a hand, and the stylus pen according to an embodiment of the present disclosure.

FIG. 13 is a simplified equivalent circuit diagram of a case in which capacitance values are sufficiently large in the equivalent circuit diagram of FIG. 12, FIG. 14 is a diagram illustrating a connected state between the touch panel, a hand, and the stylus pen according to an embodiment of the present disclosure, and FIGS. 15A and 15B are diagrams illustrating schemes in which a plurality of driving signals are applied in an ideal case and a real case according to various embodiments of the present disclosure.

Here, in the case in which the capacitance values of the second capacitor 314, the third capacitor 316, and the fourth capacitor 315 are sufficiently large, since impedance at the resonance frequency of the pen becomes very small, the equivalent circuit of FIG. 12 is simplified as illustrated in FIG. 13. That is, as illustrated in FIG. 15A, the driving signal is transmitted to a driving circuit unit through only the capacitances formed between the conductive tip of the stylus pen and the electrodes.

However, if it is assumed that the user writes while taking the pen in hand as illustrated in FIG. 14, in addition to capacitances ct1 and ct2 formed between the electrodes and the conductive tip, capacitances cb1, cb2, and cb3 formed between the hand of the user and the electrodes are also present.

In this connected state, when the same driving signal is applied to the plurality of electrodes 112-2, 112-3, and 112-4 similarly to the previous driving scheme, the driving signal is simultaneously transmitted to the capacitances cb1, cb2, and cb3 formed between the hand of the user and the electrodes as well as the capacitances ct1 and ct2 formed between the electrodes and the conductive tip of the stylus pen, as illustrated in FIG. 15B. Since the hand of the user is connected to the ground unit of the stylus pen 200, the driving signal is transmitted to the ground of the resonance circuit unit.

Meanwhile, the resonance circuit unit generates a resonance using a voltage difference between the signal transmitted through the conductive tip 210 and the ground unit of the stylus pen, that is, the case of the pen in the present embodiment, but when the same driving signal is applied to the ground unit of the stylus pen through the hand, the voltage difference between the conductive tip and the ground of the stylus pen is decreased, such that magnitude of the resonance signal is decreased. An operation described above will be described below in detail with reference to FIG. 16.

Figure 16:
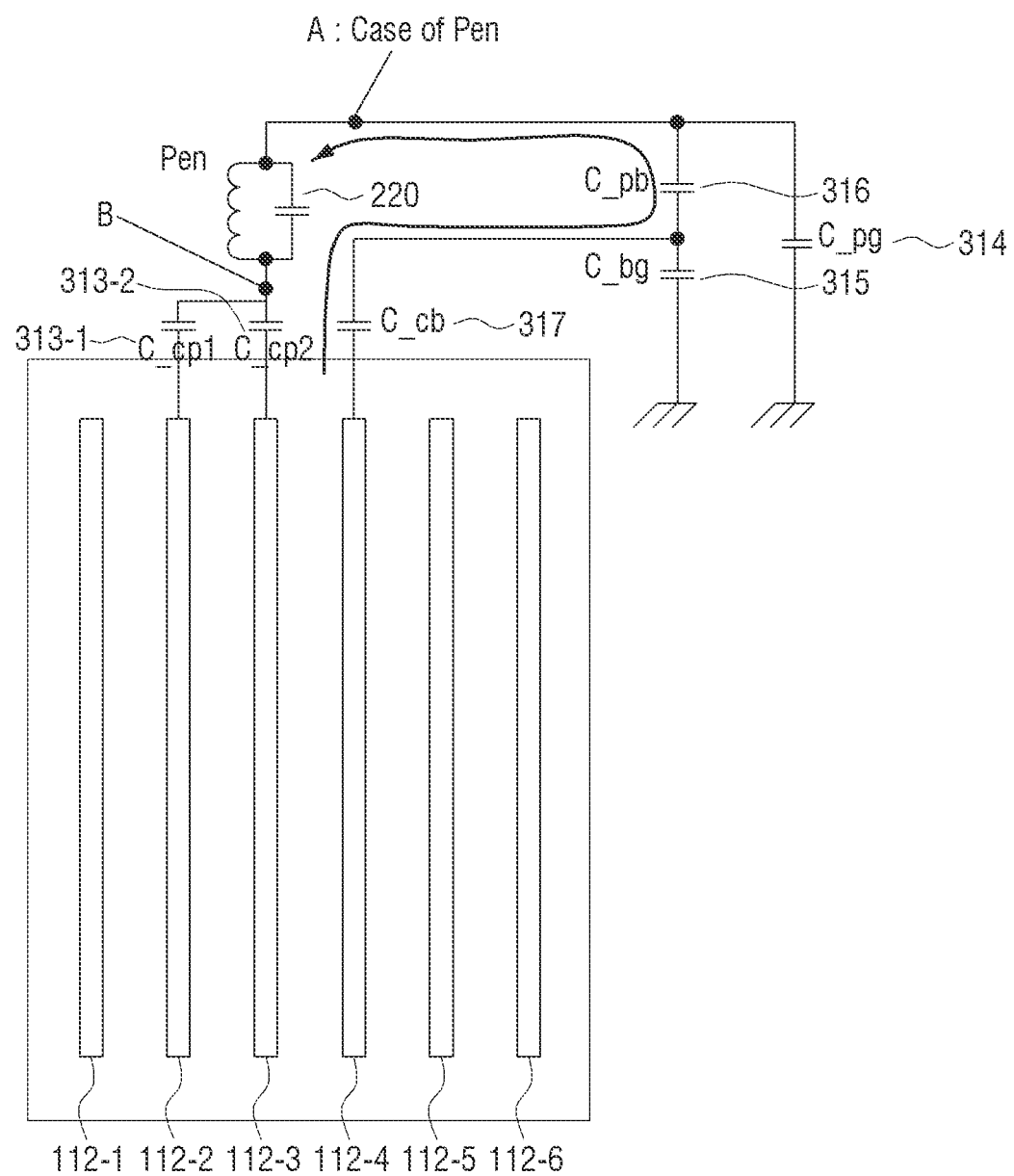
FIG. 16 is a diagram illustrating an influence of a response signal transmitted to the hand according to an embodiment of the present disclosure.

FIG. 16 is a diagram illustrating an influence of a response signal transmitted to the hand according to an embodiment of the present disclosure.

Referring to FIG. 16, the touch panel 100 and the stylus pen 200 are connected to each other through a plurality of capacitors. Specifically, the electrodes of the touch panel 100 are connected to one end of the resonance circuit unit 220 of the stylus pen 200 through first capacitors 313-1 and 313-2, and are also connected to the other end of the resonance circuit unit 220 through a fifth capacitor 317 and a third capacitor 316.

Here, the fifth capacitor 317 is capacitance C_cb between the electrode and the hand of the user.

Thus, the driving signal generated from the channel electrode is transmitted to a case A of the pen through the capacitance C_cb between the electrode and the hand of the user and capacitance C_pb between the hand of the user and the ground unit of the stylus pen.

As such, as the driving signal is applied to the ground unit, the ground of the stylus pen 200 does not have an ideally stable ground state, and a voltage level is changed depending on the driving signal. Meanwhile, the driving circuit unit 220 accumulates necessary energy by a voltage difference between a point A and a point B, but if potential of the point A (i.e., the ground unit) is moved according to the driving signal, the voltage difference between the point A and the point B is decreased, thereby decreasing the magnitude of the resonance signal.

In order to address the above-mentioned problem, according to the present embodiment, in the case in which the touch object such as the hand of the user and the stylus pen simultaneously touch the touch panel 100, the driving signal is not applied to a point at which it is expected that the hand of the user is disposed, or the driving signal having a phase difference of 180° is applied thereto, such that the magnitude of the resonance signal caused in the stylus pen is not decreased. An operation described above will be described below with reference to FIG. 17.

Figure 17:
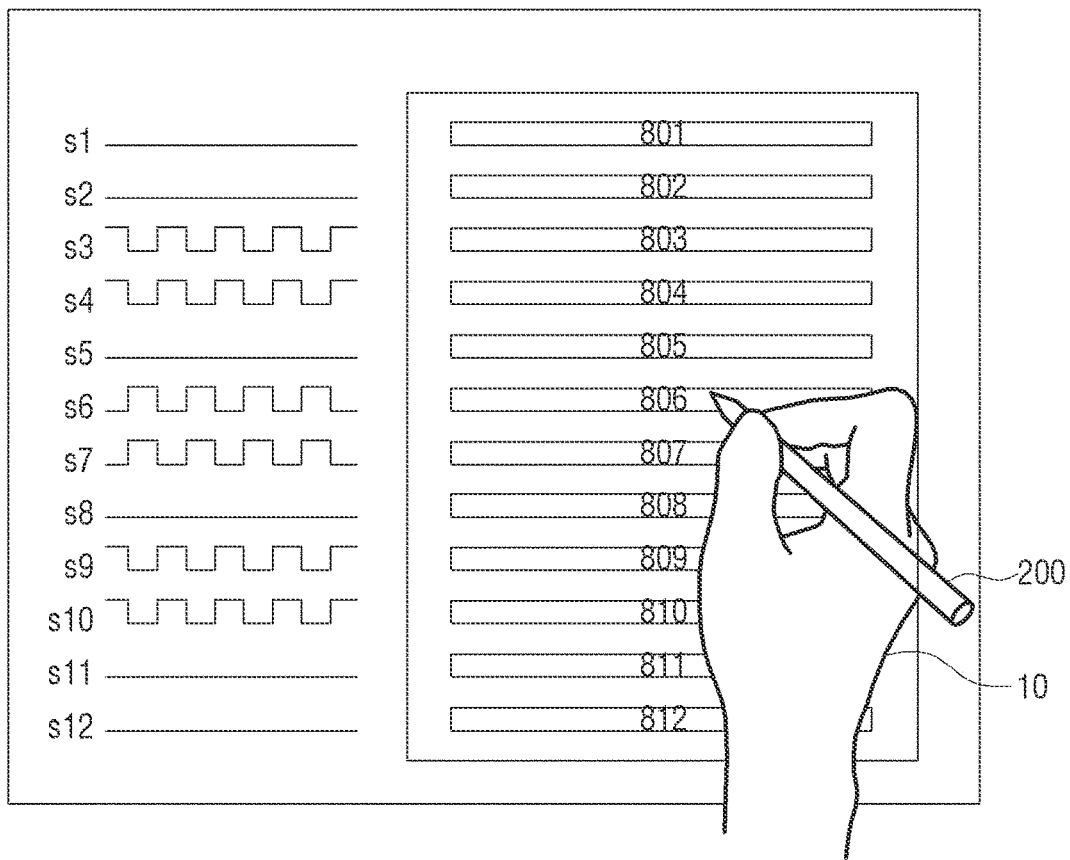
FIG. 17 is a diagram illustrating an application operation of a driving signal of a case in which the hand is touched according to an embodiment of the present disclosure.

FIG. 17 is a diagram illustrating the application operation of the driving signal of a case in which the hand is touched according to an embodiment of the present disclosure.

Referring to FIG. 17, the hand 10 of the user grabs the stylus pen 200 and is located over the touch panel 100. Hereinafter, it is assumed that the conductive tip of the stylus pen 200 is located over electrodes 806 and 807, and the hand 10 of the user is located over electrodes 806 to 811.

In this case, the controlling unit 120 may apply the same first driving signal to the electrodes 806 and 807 over which the stylus pen 200 is located, and may apply a second driving signal having a phase difference of 180° with the first driving signal to the electrodes 803, 804, 809, and 810 which are disposed adjacent to the electrodes to which the first driving signal is applied.

In this case, the controlling unit 120 may allow electrodes 801, 802, 805, 808, 811, and 812 to which the first driving signal and the second driving signal are not applied to be grounded. Meanwhile, although the illustrated example illustrates the case in which the grounded electrodes 805 and 808 are disposed between the electrodes to which the first driving signal and the second driving signal are applied, at the time of the implementation, the electrode to which the first driving signal is applied and the electrode to which the second driving signal is applied may be continuously disposed. In addition, the controlling unit 120 may also allow the corresponding electrodes 801, 802, 805, 808, 811, and 812 to have a floating state instead of grounding the corresponding electrodes 801, 802, 805, 808, 811, and 812. Here, the floating state means that the corresponding specific electrode is opened without being grounded or connected to other circuit configurations.

An effect according to the driving scheme described above will be described below with reference to FIGS. 18A, 18B, and 18C.

Figure 18A:
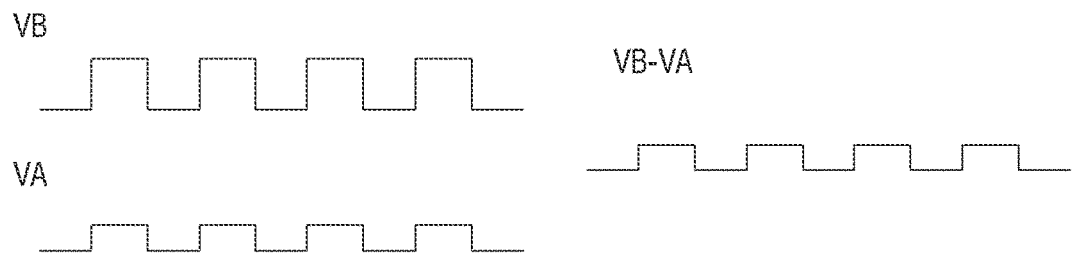
FIGS. 18A to 18C are diagrams illustrating effects of the application operation as illustrated in FIG. 17.
Figure 18B:
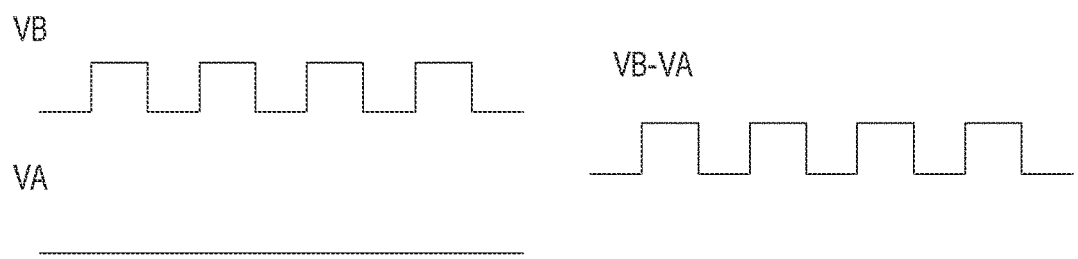
Figure 18C:
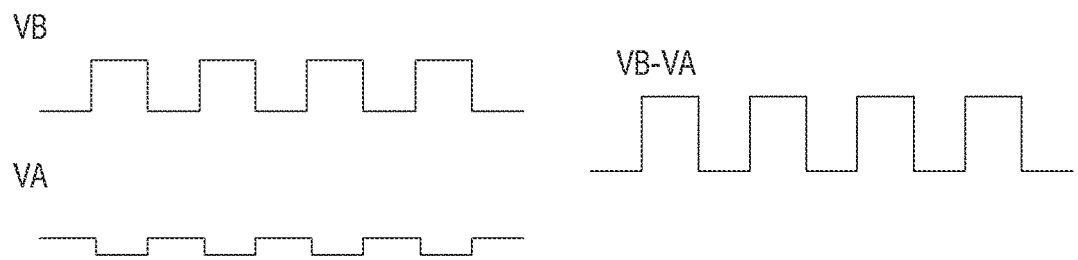

FIGS. 18A, 18B, and 18C are diagrams illustrating effects of the application operation as illustrated in FIG. 17. Specifically, FIG. 18A illustrates a voltage across the resonance circuit (specifically, a voltage between the point B of FIG. 16 and the point A thereof) in the case in which the driving signal is transmitted to the ground unit of the stylus pen 200 through the hand, FIG. 18B illustrates the voltage across the resonance circuit (specifically, the voltage between the point B of FIG. 16 and the point A thereof) in the case in which an ideal ground is provided to the ground unit of the stylus pen, FIG. 18C illustrates the voltage across the resonance circuit (specifically, the voltage between the point B of FIG. 16 and the point A thereof) in the case in which the second driving signal having the phase difference of 180° is driven in the electrodes over which the hand is disposed according to the present embodiment and is transmitted to the ground unit of the stylus pen.

Referring to FIGS. 18A, 18B, and 18C, in the case in which all electrodes are driven by the driving signal having the same phase as illustrated in FIG. 16 (i.e., in the case of FIG. 18A), the driving signal having the same phase as the pen tip is also transmitted to the ground unit of the stylus pen through the capacitance C_cb between the electrode and the hand, and the capacitance C_pb between the hand and the stylus pen. Thus, a voltage difference (VB-VA) driving the resonance circuit is significantly decreased as compared to the case in which there is no driving signal introduced into the hand. That is, in the case in which the driving signal is transmitted to the ground unit of the stylus pen 200 through the hand, the voltage difference across the resonance circuit unit 220 is decreased, and consequently, energy which may be used for the resonance is reduced.

Referring to FIG. 18B, since the ground unit of the stylus pen has the ideal ground, a voltage Vb applied to the pen tip may be all used for the resonance. Specifically, since the driving signal is transmitted to only one end of the resonance circuit of the stylus pen, the driving signal VB may be used to generate the response signal of the resonance circuit as it is.

Referring to FIG. 18C, since the driving signal having the phase difference of 180° is provided to the ground of the stylus pen, the voltage difference across the resonance circuit is increased as compared to the case of the ideal ground. Thus, energy which may be used for the resonance may be increased, and consequently, the stylus pen may generate the resonance signal having larger magnitude. That is, according to the present disclosure, in order to generate the effect as described in FIG. 18C, the controlling unit 120 provides the driving signal having a phase different from that of a region over which the stylus pen is located to a region over which the hand of the user is located (or a region over which it is expected that the hand of the user is to be located).

Figure 19:
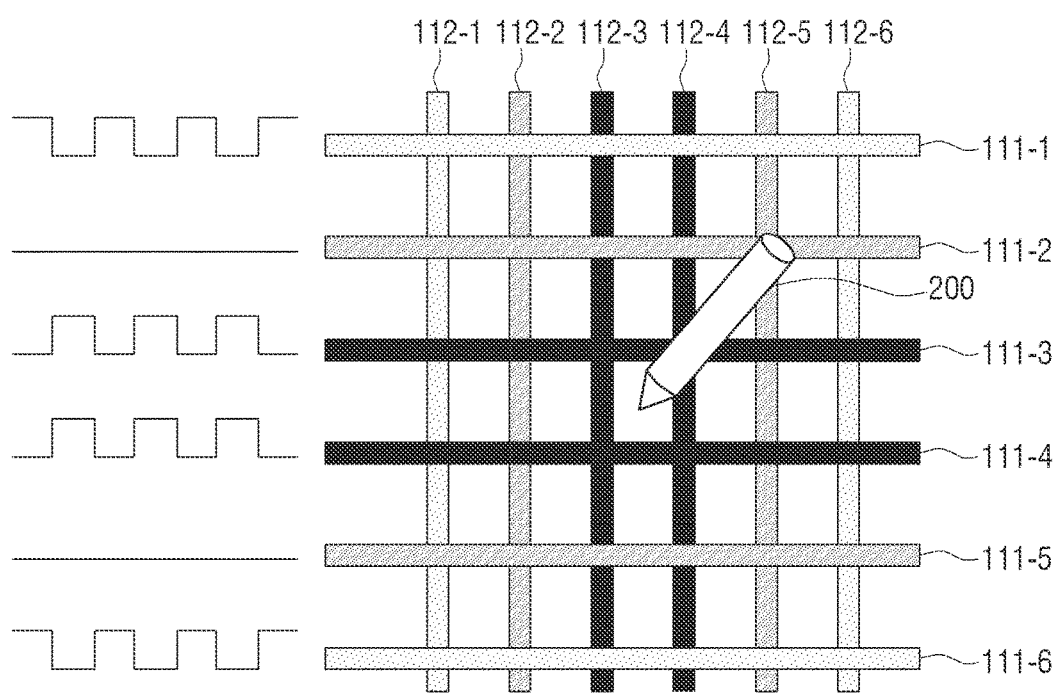
FIG. 19 is a diagram illustrating the application operation of the driving signal from the channel electrode unit having a form as illustrated in FIG. 3.

Meanwhile, hereinabove, although the case in which the operation as described above is performed for only the second electrodes has been described, at the time of the implementation, the driving signal may also be equally applied to the electrodes disposed in the matrix form as illustrated in FIG. 19.

FIG. 19 is a diagram illustrating the application operation of the driving signal from the channel electrode unit having a form as illustrated in FIG. 3.

Referring to FIG. 19, the channel electrode unit is continuously classified into a first sub-group 111-3, 111-4, 112-3, and 112-4, a second sub-group 111-2, 111-5, 112-2, and 112-5, and a third sub-group 111-1, 111-6, 112-1, and 112-6, on the basis of the electrode receiving the largest response signal. In addition, the controlling unit 120 may simultaneously apply a general first driving signal to the first sub-group 111-3, 111-4, 112-3, and 112-4. In this case, the controlling unit 120 may ground or float the second sub-group 111-2, 111-5, 112-2, and 112-5, and may apply a second driving signal having a phase difference of 180° with the first driving signal to the third sub-group 111-1, 111-6, 112-1, and 112-6.

The driving signals described above may be simultaneously transmitted to the first electrodes and the second electrodes, wherein the driving signal transmitted from the first electrodes and the driving signal transmitted from the second electrodes have the phase difference depending on the location of the stylus pen. This will be described below with reference to FIGS. 20 to 21B.

Figure 20:
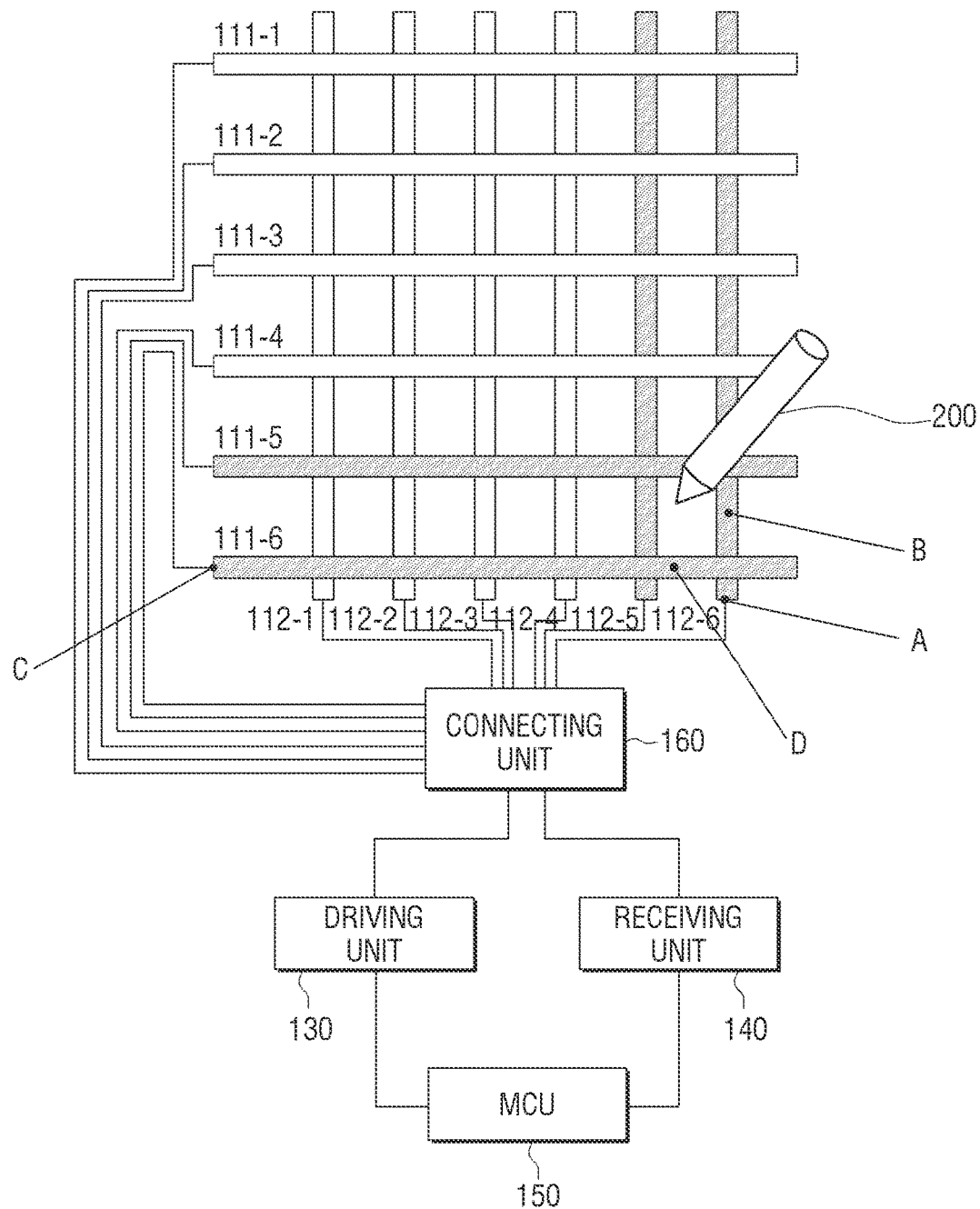
FIG. 20 is a diagram illustrating an influence of a delay of a driving signal transmission from the electrode according to an embodiment of the present disclosure.

FIG. 20 is a diagram illustrating an influence of a delay of a driving signal transmission from the electrode according to an embodiment of the present disclosure.

Referring to FIG. 20, it is assumed that the stylus pen 200 is located in vicinity of the first electrodes 111-5 and 111-6 and the second electrodes 112-5 and 112-6. In this case, the controlling unit 120 may simultaneously apply the same driving signal to the first electrodes 111-5 and 111-6 and the second electrodes 112-5 and 112-6.

Thus, the driving signal generated from the driving unit 130 is transmitted to the stylus pen through a point A and a point B, and is also transmitted to the stylus pen through a point C and a point D.

Meanwhile, as the electrode of the touch screen, the transparent electrode may be used, wherein a resistance value from a start portion of the channel of the transparent electrode to an end portion thereof is several tens of kΩ. In addition, since the channel electrode has parasitic capacitance formed with peripheral conductors, the signal passing through the channel electrode has a delay, due to high resistance of the channel electrode and the parasitic capacitance between the peripheral conductor and the channel electrode. That is, as a distance from a start point of the channel electrode to a point at which the pen is located is increased, the delay of the driving signal is increased.

Thus, if the same driving signal is applied to the first electrode 111-6 and the second electrode 112-6 as illustrated in FIG. 20, the driving signal is first transmitted to the stylus pen 200 through the second electrode 112-6 and the driving signal is transmitted to the stylus pen 200 through the first electrode 111-6 after a predetermined delay time. Thus, two driving signals transmitted to the stylus pen 200 do not have the same phase, and have a predetermined phase difference.

Figure 21A:
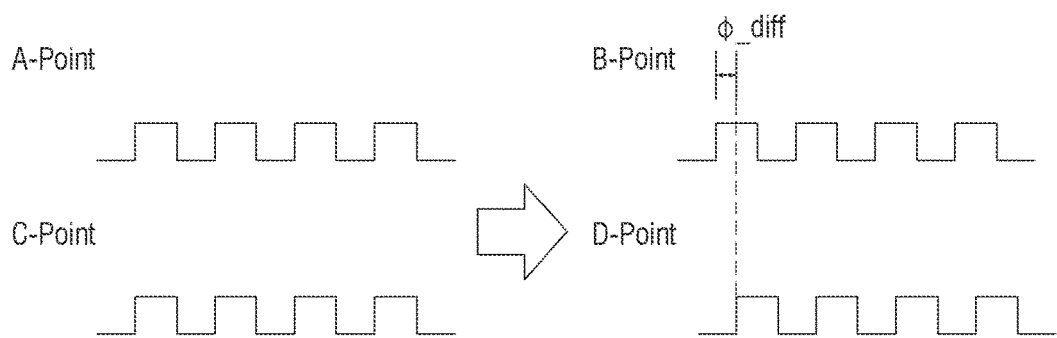
FIGS. 21A and 21B are diagrams illustrating effects of the application operation as illustrated in FIG. 20.
Figure 21B:
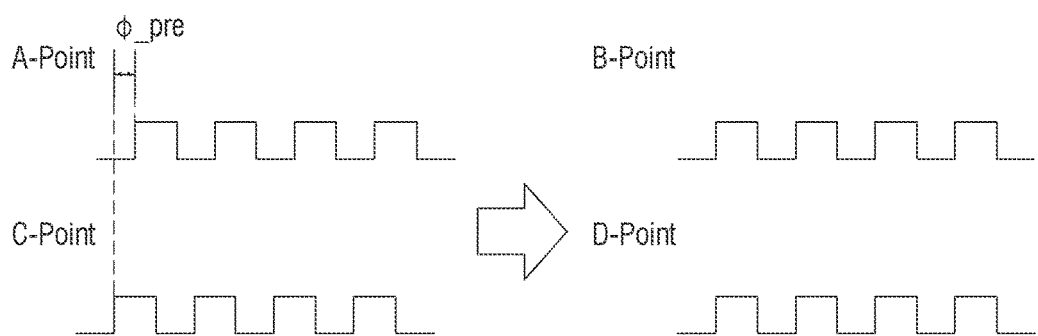

FIGS. 21A and 21B are diagrams illustrating effects of the application operation as illustrated in FIG. 20.

Specifically, in the case in which the signals having the same phase are applied to the points A and C as illustrated in FIG. 21A, since the driving signal transmitted to the point B through the point A and the driving signal transmitted to the point D through the point C have different passed path length, the two driving signals are subjected to different resistances and parasitic capacitances, thereby having different phases not the same phase as each other. As such, in the case in which the two driving signals transmitted to the stylus pen 200 have the phase difference, a relatively smaller signal than the case in which the driving signals having the same phase are transmitted is transmitted to the pen tip. In order to address a resonance signal attenuation phenomenon due to the phase difference between the signals through different paths as described above, as illustrated in FIG. 21B, the phase difference between the driving signal applied to the point A and the driving signal applied to the point C may be artificially formed. In this case, when the artificial phase difference which is formed in advance is adjusted to be offset with a natural phase difference generated while the signals pass through the electrodes having different lengths, at the point B and the point D which are closest to a real point at which the stylus pen is located, the phase difference between the signals transmitted to the pen tip of the stylus pen 200 may be minimized.

Thus, the controlling unit 120 according to the preset embodiment may perform a control so that the first driving signal applied to the first electrode and the second driving signal applied to the second electrode have different phase differences depending on the location from which the stylus pen is sensed. For example, as illustrated in FIG. 21B, the driving signal applied to the point A is applied to be delayed as much as a predetermined time, such that phases of the driving signals transmitted to the pen tip from the points B and D may be the same.

Meanwhile, at the time of the implementation, information on a delay time for each location of an intersecting point of the first electrode and the second electrode over which the pen tip is located is stored in a lookup table, and the controlling unit 120 may delay and apply the driving signal applied to the specific electrode as much as a time value of a lookup table value, depending on the location of the stylus pen sensed in the previous process.

Figure 22:
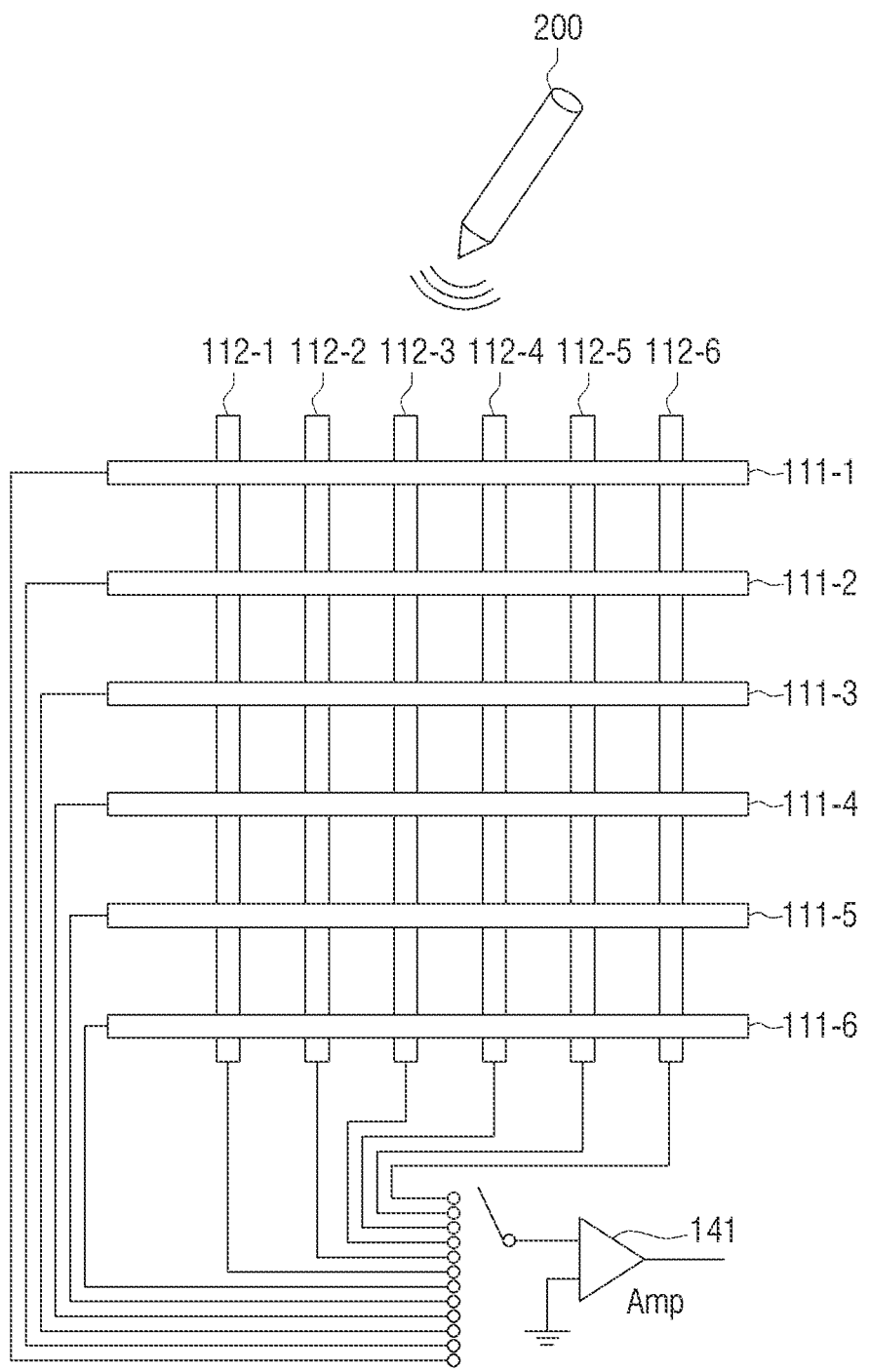
FIG. 22 is a diagram illustrating a configuration of a receiving unit according to a first embodiment of the present disclosure.

FIG. 22 is a diagram illustrating a configuration of a receiving unit according to a first embodiment of the present disclosure. Specifically, the receiving unit 140 according to the first embodiment is an embodiment of the present disclosure in which the response signals are amplified, thereby improving sensitivity.

Referring to FIG. 22, the receiving unit 140 may include an amplifying unit 141.

The amplifying unit 141 amplifies the response signals transmitted from the respective electrodes and outputs the amplified signals. Specifically, the amplifying unit 141 may be implemented by an amplifier amp of which one input terminal of two input terminals is grounded and the other input terminal receives the response signals.

As such, the receiving unit 140 amplifies the signals by using the amplifying unit 141 and uses the amplified signals, thereby improving reception sensitivity of the response signals.

Figure 27:
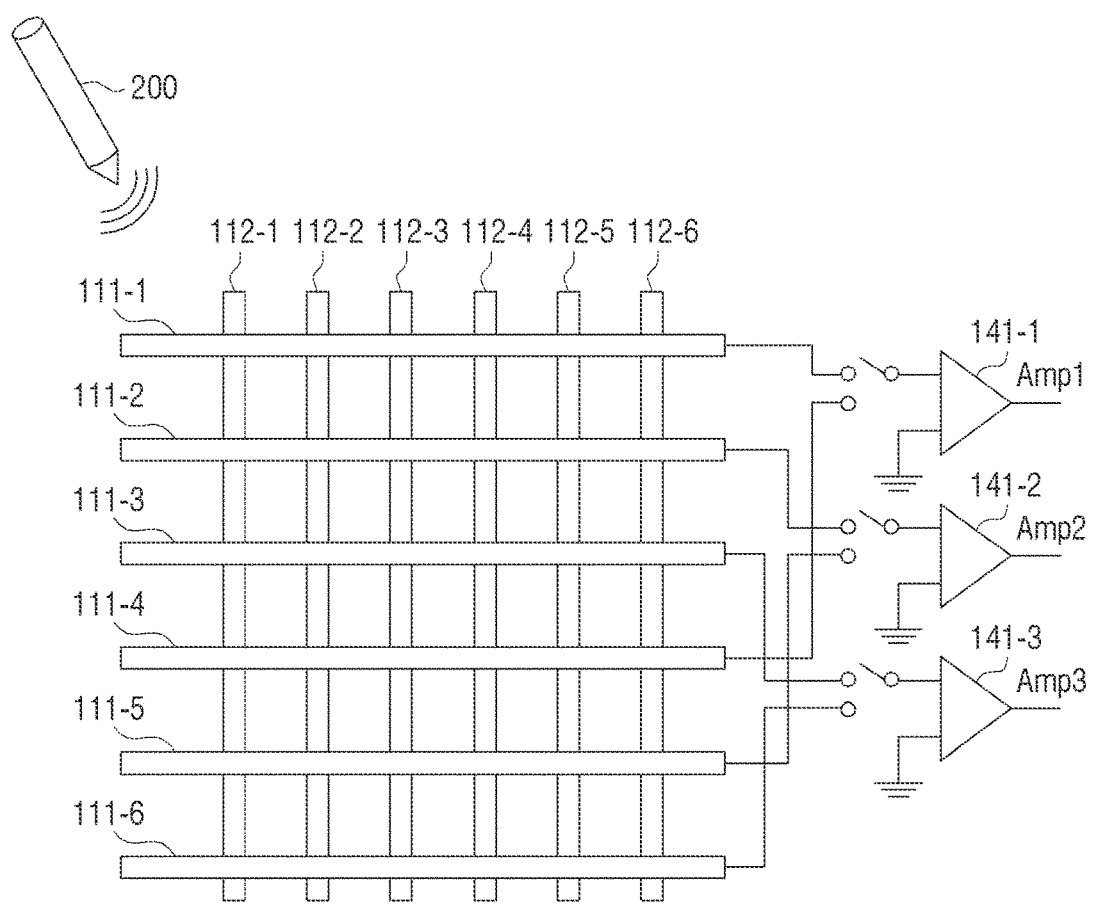
FIG. 27 is a diagram illustrating a configuration of a receiving unit according to a fourth embodiment of the present disclosure.

Meanwhile, in the illustrated example, since the receiving unit 140 includes only one amplifying unit 141, repeat signal processes as many as the number of the plurality of electrodes need to be performed in order to process the response signals of the plurality of electrodes. Thus, at the time of the implementation, a processing time may be reduced by using a plurality of amplifying units as illustrated in FIG. 27.

Figure 23:
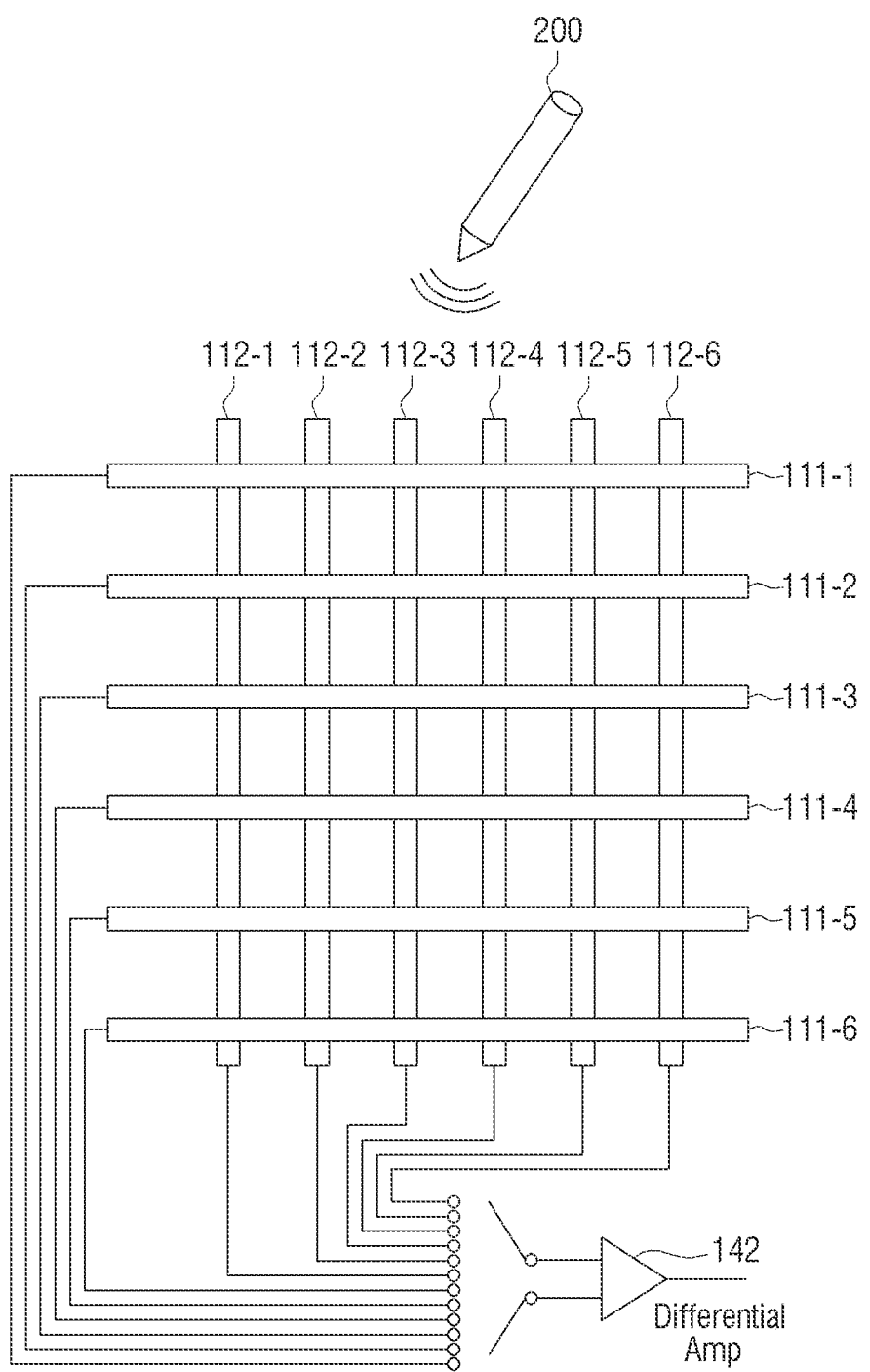
FIG. 23 is a diagram illustrating a configuration of a receiving unit according to a second embodiment of the present disclosure.

FIG. 23 is a diagram illustrating a configuration of a receiving unit according to a second embodiment of the present disclosure. Specifically, the receiving unit 140' according to the second embodiment is an embodiment of the present disclosure in which the response signals are differentially amplified to remove noise, thereby improving sensitivity.

Referring to FIG. 23, the receiving unit 140' may include a differential amplifying unit 142.

The differential amplifying unit 142 differentially amplifies a plurality of response signals transmitted from a plurality of electrodes and outputs the amplified signals. Specifically, the differential amplifying unit 142 may be implemented by an amplifier amp of which one input terminal of two input terminals receives one response signal and the other input terminal receives the response signals. This amplifier may be the same amplifier as that of FIG. 22, and may also be a differential amplifier. An operation principle of the differential amplifying unit 142 will be described below with reference to FIGS. 24 and 25.

Figure 24:
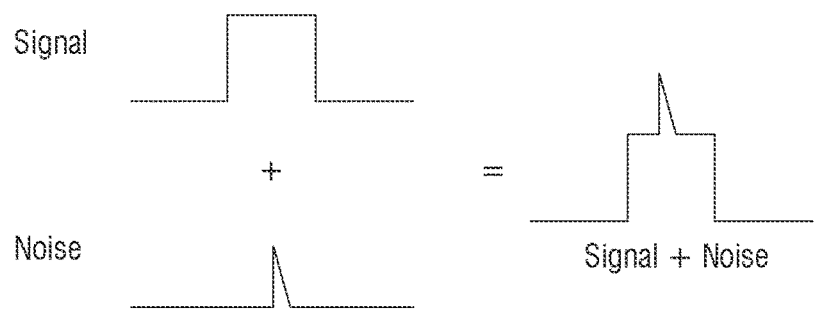
FIGS. 24 and 25 are diagrams illustrating an operation of a differential amplifier of FIG. 23.
Figure 25:
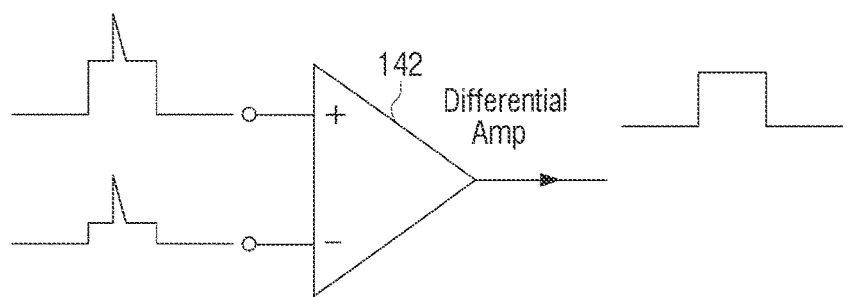

FIGS. 24 and 25 are diagrams illustrating an operation of the differential amplifier of FIG. 23.

Referring to FIG. 24, the signal which is generally received from the electrode includes noise as well as a desired signal. This noise deteriorates quality of the signal, thereby decreasing sensitivity of a system. In the case of display noise generated from a display, noise is introduced into all channels while having a similar level.

Thus, in the case in which a difference between two response signals is amplified as illustrated in FIG. 25, noise components are offset with each other and only the difference between the signals is amplified, thereby making it possible to obtain good quality of a signal.

Thus, the receiving unit 140' according to the second embodiment of the present disclosure amplifies the two response signals received from the two electrodes, thereby making it possible to remove noises included in the two response signals.

Meanwhile, one of the two response signals received by the differential amplifying unit 142 may be continuously changed, but the other may be fixed to any one of the two response signals or may be changed. For example, the differential amplifying unit 142 may differential amplify the response signals of the two electrodes which are continuously adjacent to each other (a first scheme) (e.g., after the first electrodes 111-1 and 111-2 are differentially amplified, the first electrodes 111-2 and 111-3 are differentially amplified), may differentially amplify the response signals of the two electrodes so as not to be overlapped with each other (a second scheme) (e.g., after the first electrodes 111-1 and 111-2 are differentially amplified, the first electrodes 111-3 and 111-4 are differentially amplified), or may differentially amplify the response signal of one electrode and the response signals of other electrodes (a third scheme) (e.g., after the first electrodes 111-1 (default) and 111-2 are differentially amplified, the first electrodes 111-1 and 111-3 are differentially amplified). In the case of the third scheme, the electrode used as the default may be a separate electrode for removing noise, not the channel electrode unit 110 used to measure the location.

As such, the receiving unit 140' according to the second embodiment of the present disclosure may remove noise using the differential amplifying unit 142, thereby making it possible to improve reception sensitivity.

Figure 28:
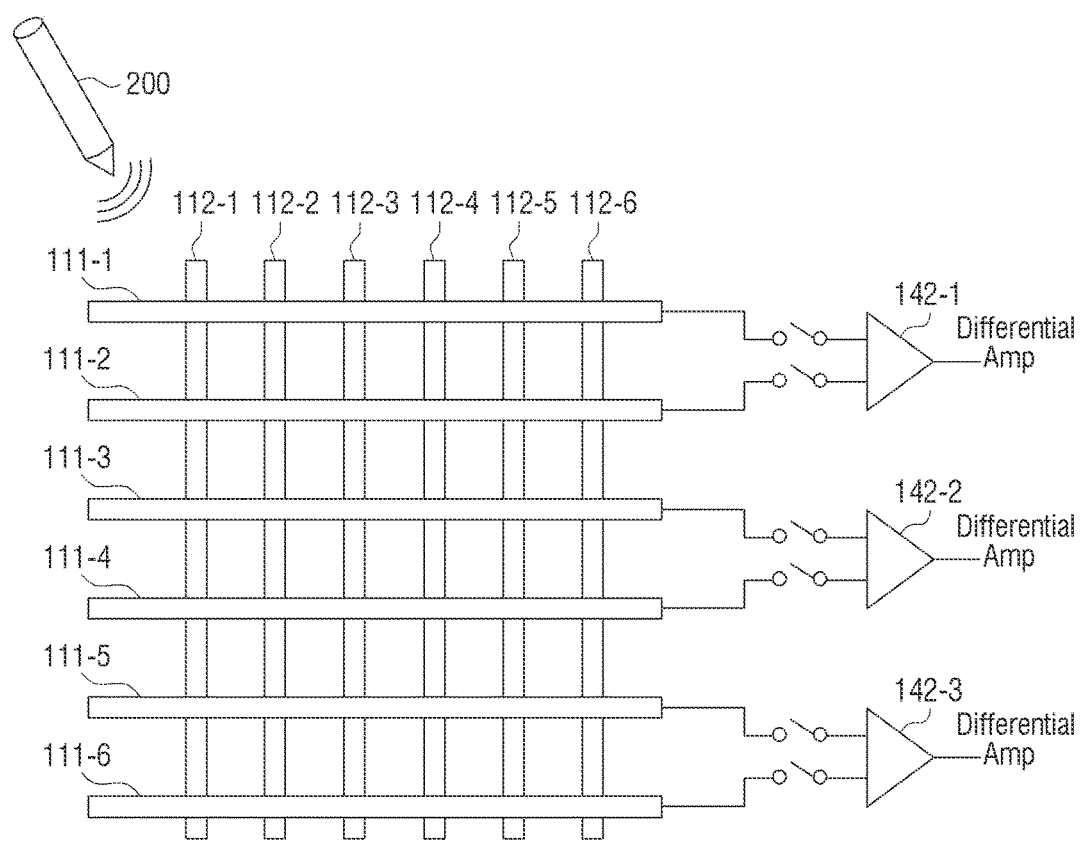
FIG. 28 is a diagram illustrating a configuration of a receiving unit according to a fifth embodiment of the present disclosure.

Meanwhile, in the illustrated example, since the receiving unit 140' includes only one amplifying unit 142, repeat signal processes as many as the number of the plurality of electrodes need to be performed in order to process the response signals of the plurality of electrodes. Thus, at the time of the implementation, a processing time may be reduced by using a plurality of differential amplifying units as illustrated in FIG. 28.

Figure 26:
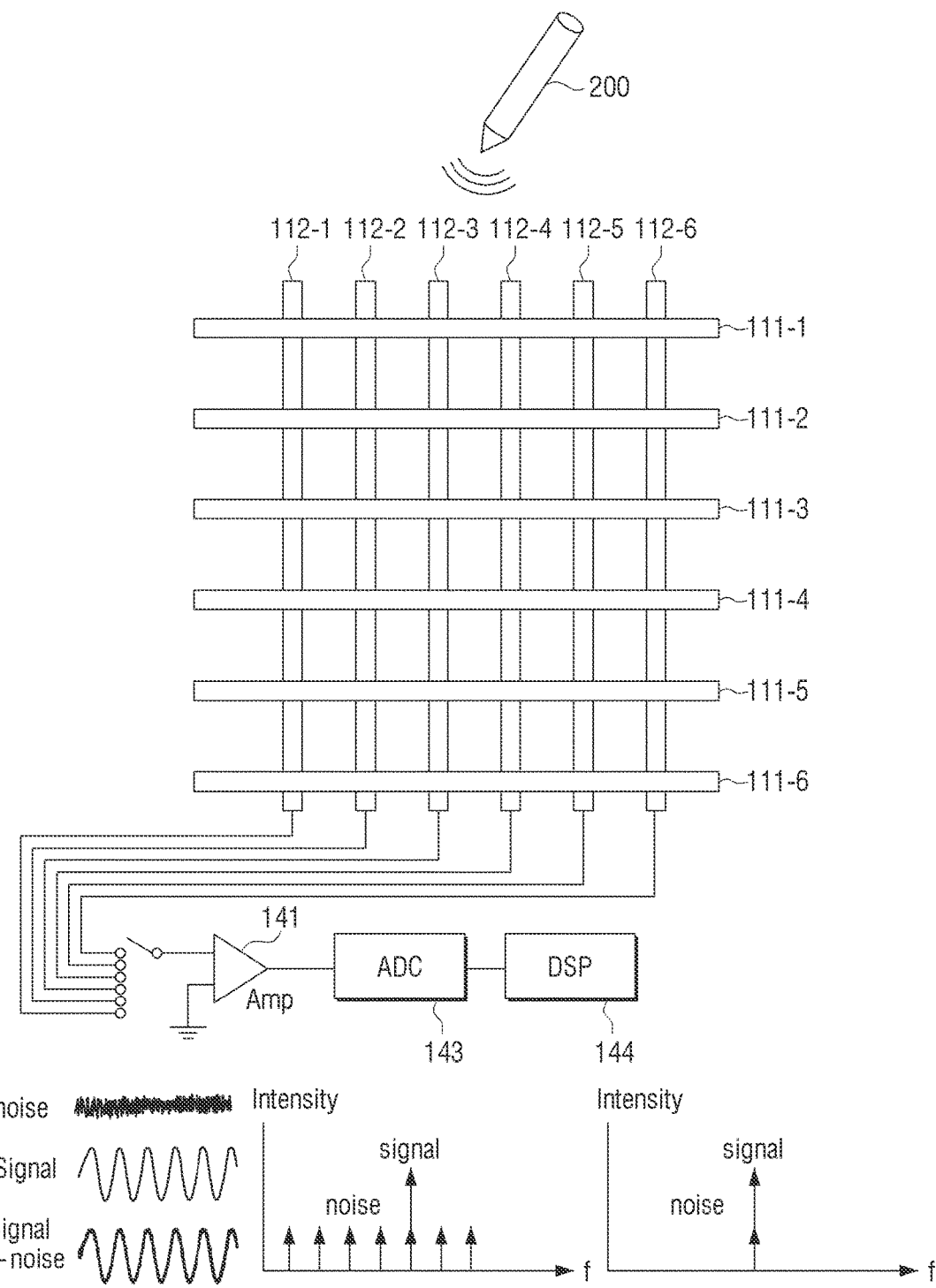
FIG. 26 is a diagram illustrating a configuration of a receiving unit according to a third embodiment of the present disclosure.

FIG. 26 is a diagram illustrating a configuration of a receiving unit according to a third embodiment of the present disclosure. Specifically, the receiving unit 140" according to the third embodiment is an embodiment of the present disclosure in which only a signal corresponding to a preset frequency band is extracted, thereby improving sensitivity of the response signals.

Referring to FIG. 26, the receiving unit 140" may include an amplifying unit 141, an ADC unit 143, and a signal processing unit (or digital signal processor) 144.

The amplifying unit 141 sequentially amplifies the respective response signals transmitted from the respective electrodes and outputs the amplified signals.

The ADC unit 143 may convert the amplified response signals into a digital signal.

The signal processing unit 144 may extract a preset frequency component from a difference between the plurality of response signals converted into the digital signal.

As described above, the signal received from the electrodes includes noise as well as a desired signal. In order to effectively remove noise, according to the present embodiment, only the frequency component corresponding to a frequency region of the response signal may be extracted using the signal processing unit 144.

As such, the receiving unit 140" according to the third embodiment of the present disclosure may remove noise component by extracting only the preset frequency component, thereby making it possible to improve reception sensitivity of the response signals.

Figure 30:
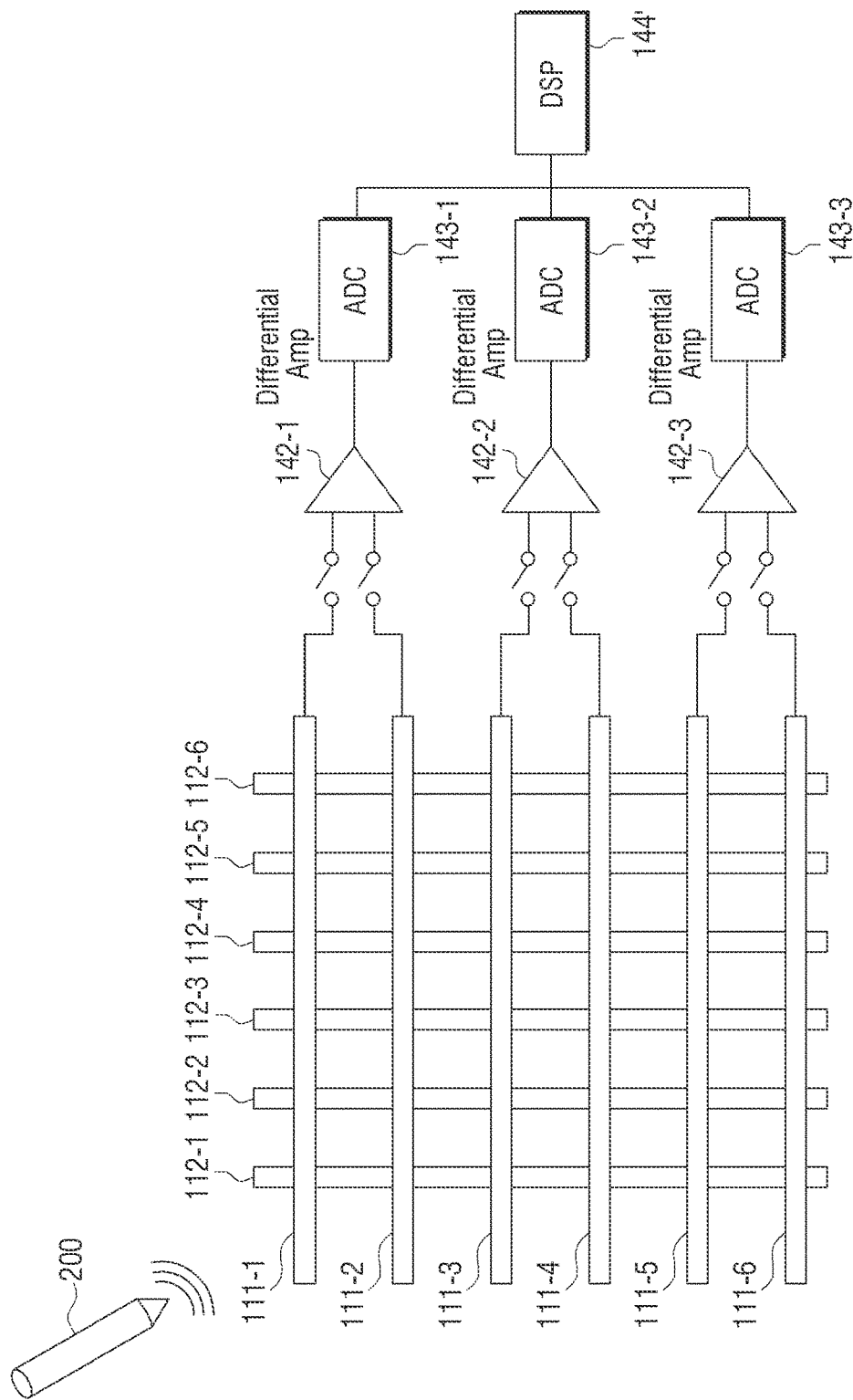
FIG. 30 is a diagram illustrating a configuration of a receiving unit according to a seventh embodiment of the present disclosure.

Meanwhile, in the illustrated example, since the receiving unit 140" includes only one amplifying unit 141, repeat signal processes as many as the number of the plurality of electrodes need to be performed in order to process the response signals of the plurality of electrodes. Thus, at the time of the implementation, a processing time may be reduced by using a plurality of amplifying units as illustrated in FIG. 30.

Meanwhile, although the illustrated example illustrates the case in which only the response signals of the second electrodes in the second electrode group 112 are amplified, the response signals of the first electrodes in the first electrode group may also be amplified.

FIG. 27 is a diagram illustrating a configuration of a receiving unit according to a fourth embodiment of the present disclosure. Specifically, the receiving unit 140''' according to the fourth embodiment is an embodiment of the present disclosure in which the response signals are amplified to improve sensitivity and sensing speed is improved by using a plurality of amplifiers.

Referring to FIG. 27, the receiving unit 140''' may include a plurality of amplifying units 141-1, 141-2, and 141-3.

The respective amplifying units 141-1, 141-2, and 141-3 amplify in parallel the response signals transmitted from the respective electrodes and output the amplified signals. Specifically, the amplifying units 141-1, 141-2, and 141-3 may be implemented by amplifiers, and in a first receiving section, the respective amplifying units 141-1, 141-2, and 141-3 may simultaneously amplify the response signals of the electrodes 111-1, 111-2, and 111-3 and output the amplified signals. In addition, in a second receiving section, the respective amplifying units 141-1, 141-2, and 141-3 may simultaneously amplify the response signals of the electrodes 111-4, 111-5, and 111-6 and output the amplified signals.

As such, the receiving unit 140''' according to the fourth embodiment of the present disclosure parallel processes the response signals in a unit of three channels, thereby improving the processing speed. For example, the processing speed may become three times faster than the case of FIGS. 9A, 9B, 9C, and 9D.

Meanwhile, although the illustrated example illustrates the case in which the respective amplifying units 141-1, 141-2, and 141-3 amplify only the response signals of the first electrodes in the first electrode group, at the time of the implementation, the respective amplifying units 141-1, 141-2, and 141-3 may also amplify the response signals of the second electrodes in the second electrode group.

Meanwhile, although the illustrated example illustrates the case in which the amplifying units are configured by only three amplifiers, at the time of the implementation, the amplifying units may also be configured by two amplifiers or four or more amplifiers (e.g., six amplifiers).

FIG. 28 is a diagram illustrating a configuration of a receiving unit according to a fifth embodiment of the present disclosure. Specifically, the receiving unit 140'''' according to the fifth embodiment is an embodiment of the present disclosure in which the response signals are differentially amplified to remove noise, thereby improving sensitivity, and sensing speed is improved by using a plurality of differential amplifiers.

Referring to FIG. 28, the receiving unit 140'''' may include a plurality of differential amplifying units 142-1, 142-2, and 142-3.

The respective differential amplifying units 142-1, 142-2, and 142-3 differentially amplify in parallel two response signals transmitted from two electrodes and output the amplified signals. Specifically, the respective differential amplifying units 142-1, 142-2, and 142-3 may be implemented by the differential amplifier, so as to differentially amplify the two response signals of the electrodes 111-1, 111-3, and 111-5 and the electrodes 111-2, 111-4, and 111-6, respectively, and output the amplified signals.

As such, the receiving unit 140'''' according to the fifth embodiment of the present disclosure parallel processes the response signals in a unit of three channels, thereby improving the processing speed. For example, the processing speed may become three times faster than the case of FIG. 23.

Meanwhile, although the illustrated example illustrates the case in which the respective differential amplifying units 142-1, 142-2, and 142-3 differentially amplify only the response signals of the first electrodes in the first electrode group, at the time of the implementation, the respective differential amplifying units 142-1, 142-2, and 142-3 may also differentially amplify the response signals of the second electrodes in the second electrode group. In addition, at the time of the implementation, the respective differential amplifying units 142-1, 142-2, and 142-3 may also differentially amplify the electrodes in the first electrode group and the electrodes in the second electrode group.

Meanwhile, although the illustrated example illustrates the case in which the differential amplifying units are configured by only three amplifying units, the differential amplifying units may also be configured by two differential amplifying units or four or more differential amplifying units (e.g., six differential amplifying units).

Figure 29:
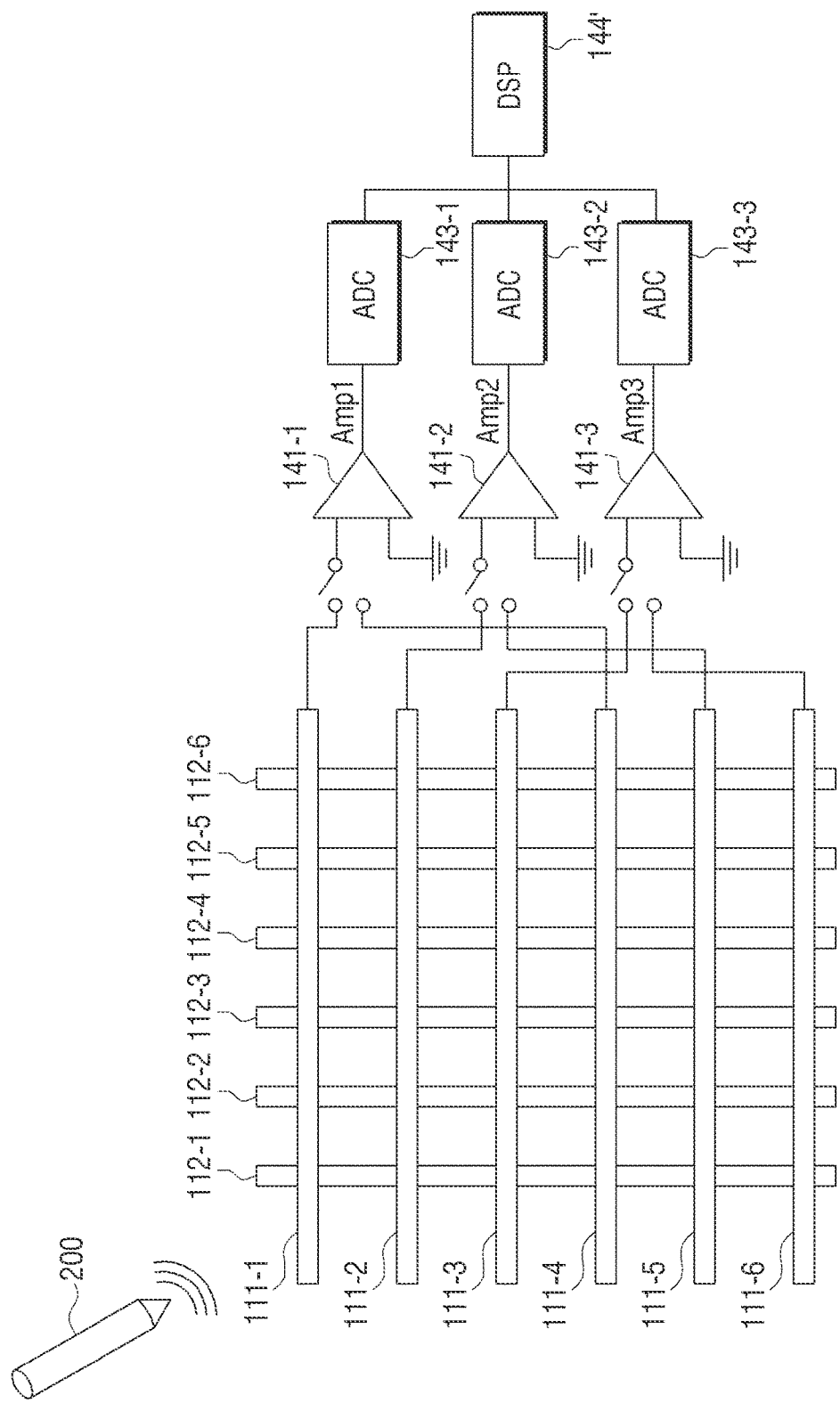
FIG. 29 is a diagram illustrating a configuration of a receiving unit according to a sixth embodiment of the present disclosure.

FIG. 29 is a diagram illustrating a configuration of a receiving unit according to a sixth embodiment of the present disclosure. Specifically, the receiving unit 140''''' according to the sixth embodiment is an embodiment of the present disclosure in which sensitivity of the response signals is improved by extracting only the signals corresponding to the frequency band of the response signals and sensing speed is improved by using a plurality of amplifiers.

Referring to FIG. 29, the receiving unit 140''''' may include a plurality of amplifying units 141-1, 141-2, and 141-3, a plurality of ADC units 143-1, 143-2, and 143-3, and a signal processing unit 144'.

The respective amplifying units 141-1, 141-2, and 141-3 amplify in parallel the response signals transmitted from the respective electrodes and output the amplified signals. Specifically, in a first receiving section, the respective amplifying units 141-1, 141-2, and 141-3 may amplify in parallel the response signals of the electrodes 111-1, 111-2, and 111-3 and output the amplified signals. In addition, in a second receiving section, the respective amplifying units 141-1, 141-2, and 141-3 may amplify in parallel the response signals of the electrodes 111-4, 111-5, and 111-6 and output the amplified signals.

In addition, the respective ADC units 143-1, 143-2, and 143-3 may convert each of the response signals amplified by the respective amplifying units 141-1, 141-2, and 141-3 into a digital signal.

In addition, the signal processing unit 144' may receive the response signals converted into the digital signal from the plurality of ADC units 143-1, 143-2, and 143-3, and may extract a preset frequency component from each of the plurality of response signals.

As such, the receiving unit 140''''' according to the sixth embodiment of the present disclosure parallel processes the response signals in a unit of three channels, thereby improving the processing speed. For example, the processing speed may become three times faster than the case of FIG. 22.

Meanwhile, although the illustrated example illustrates the case in which the respective amplifying units 141-1, 141-2, and 141-3 amplify only the response signals of the first electrodes in the first electrode group, at the time of the implementation, the respective amplifying units 141-1, 141-2, and 141-3 may also amplify the response signals of the second electrodes in the second electrode group.

Meanwhile, in describing FIGS. 26 and 29, although the case in which the signals amplified by the amplifiers are used has been described, at the time of the implementation, the differential amplifiers may also be used instead of the amplifiers of FIGS. 26 and 29. This will be described below with reference to FIG. 30.

FIG. 30 is a diagram illustrating a configuration of a receiving unit according to a seventh embodiment of the present disclosure. The receiving unit 140'''''' according to the seventh embodiment is an embodiment of the present disclosure in which the response signals are differentially amplified to remove noise, sensitivity of the response signals is improved by extracting only the signals corresponding to the frequency band of the response signals, and sensing speed is improved by using a plurality of differential amplifiers.

Referring to FIG. 30, the receiving unit 140'''''' may include a plurality of differential amplifying units 142-1, 142-2, and 142-3, a plurality of ADC units 143-1, 143-2, and 143-3, and a signal processing unit 144'.

The respective differential amplifying units 142-1, 142-2, and 142-3 differentially amplify in parallel two response signals transmitted from two electrodes and output the amplified signals. Specifically, the respective differential amplifying units 142-1, 142-2, and 142-3 may differentially amplify in parallel the two response signals of the electrodes 111-1, 111-3, and 111-5 and the electrodes 111-2, 111-4, and 111-6, respectively, and output the amplified signals.

In addition, the respective ADC units 143-1, 143-2, and 143-3 may convert in parallel each of the response signals amplified by the respective differential amplifying units 142-1, 142-2, and 142-3 into a digital signal.

In addition, the signal processing unit 144' may receive the response signals converted into the digital signal from the plurality of ADC units 143-1, 143-2, and 143-3, and may extract a preset frequency component from each of the plurality of response signals.

As such, the receiving unit 140'''' according to the seventh embodiment of the present disclosure parallel processes the response signals in a unit of three channels, thereby improving the processing speed. In addition, the receiving unit 140'''' according to the seventh embodiment of the present disclosure removes noise in two operations of the differential amplification and the extraction of a specific frequency component, thereby making it possible to improve sensitivity of the response signals.

Meanwhile, although the illustrated example illustrates the case in which the respective differential amplifying units 142-1, 142-2, and 142-3 amplify only the response signals of the first electrodes in the first electrode group, at the time of the implementation, the respective differential amplifying units 142-1, 142-2, and 142-3 may also amplify the response signals of the second electrodes in the second electrode group.

Figure 31:
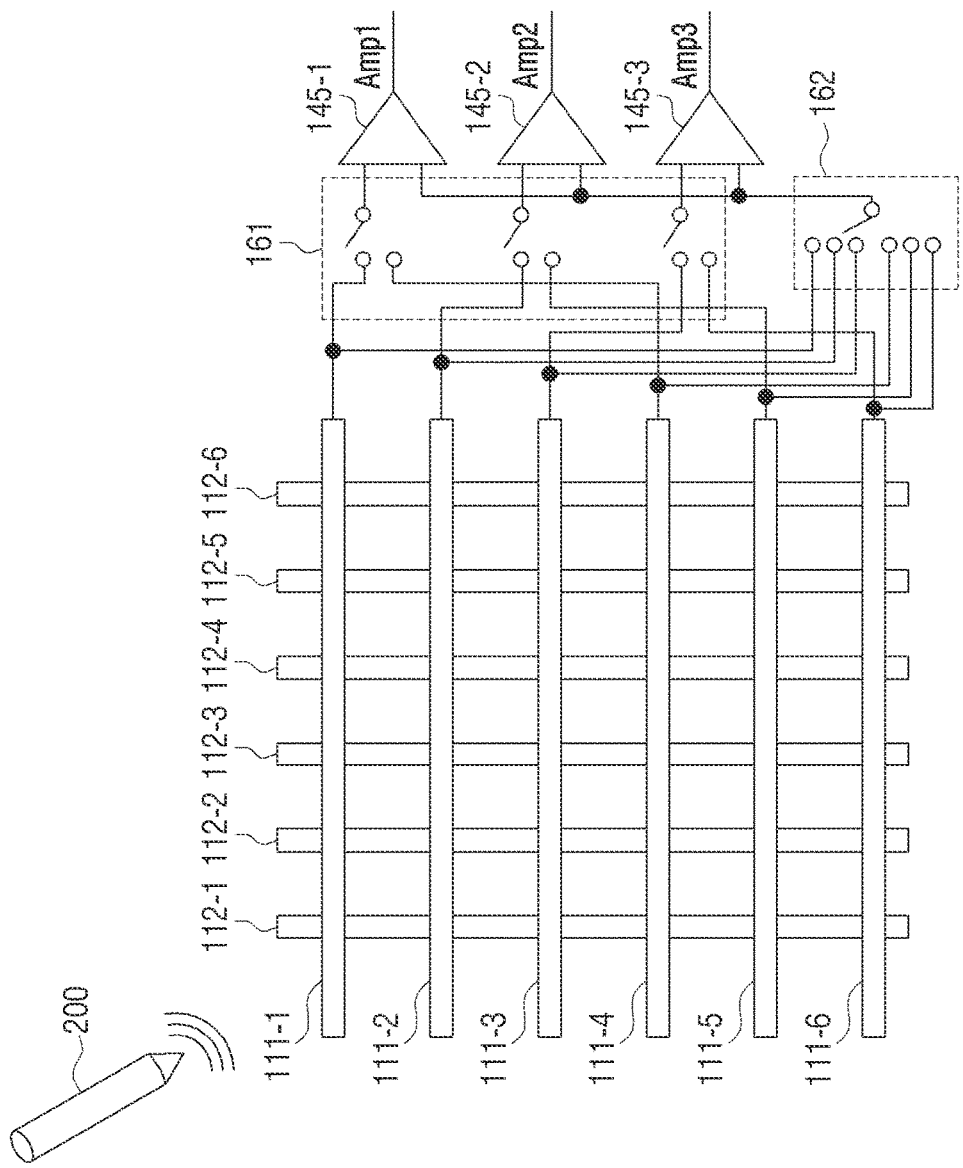
FIG. 31 is a diagram illustrating a configuration of a receiving unit according to an eighth embodiment of the present disclosure.

FIG. 31 is a diagram illustrating a configuration of a receiving unit according to an eighth embodiment of the present disclosure. The receiving unit 140''''' according to the eighth embodiment is an embodiment of the present disclosure in which the response signals are differentially amplified to remove noise and sensing speed is improved by using a plurality of differential amplifiers.

Referring to FIG. 31, the receiving unit 140''''' may include a plurality of differential amplifying units 145-1, 145-2, and 145-3.

The respective differential amplifying units 145-1, 145-2, and 145-3 differentially amplify in parallel two reception signals transmitted from two electrodes and output the amplified signals. Specifically, one end of each of the differential amplifying units 145-1, 145-2, and 145-3 may receive the response signal of any one of preset two electrodes through a first connection unit 161, and the other end thereof may commonly receive the reception signal of any one of the plurality of electrodes through the second connecting unit 162.

For example, in the case in which the response signals of the first electrodes 111-1, 111-2, and 111-3 are received, the first connecting unit 161 may connect each of the first electrodes 111-1, 111-2, and 111-3 to one end of the differential amplifying units 145-1, 145-2, and 145-3, and may connect any one of the electrodes 111-4, 111-5, and 111-6 which are not connected to the differential amplifying units to the other end of the differential amplifying units.

As such, the receiving unit 140''''' according to the eighth embodiment of the present disclosure parallel processes the response signals in a unit of three channels, thereby improving the processing speed. In addition, since the differential amplification is performed using the reception signals of other electrodes which do not use the response signals, noise in the response signals may be efficiently removed, thereby making it possible to improve sensitivity of the response signals. Specifically, in the case in which a difference between a signal received from the receiving electrode and a signal received from a reference electrode is amplified, only a signal component except for a noise component which is commonly introduced into the receiving electrode and the reference electrode is amplified, thereby making it possible to improve a dynamic range of the system.

Meanwhile, although the illustrated example illustrates the case in which the respective differential amplifying units 145-1, 145-2, and 145-3 amplify only the response signals of the first electrodes in the first electrode group, at the time of the implementation, the respective differential amplifying units 145-1, 145-2, and 145-3 may also amplify the response signals of the second electrodes in the second electrode group. In addition, although the illustrated example illustrates the example in which only the three differential amplifying units are used, at the time of the implementation, two differential amplifying units may be used, or four or more differential amplifying units may also be used.

Meanwhile, in describing FIG. 31, although the differential amplifiers are used to remove noise, at the time of the implementation, subtractor circuits different from the amplifiers may also be used. This will be described below with reference to FIGS. 32 to 36.

Figure 32:
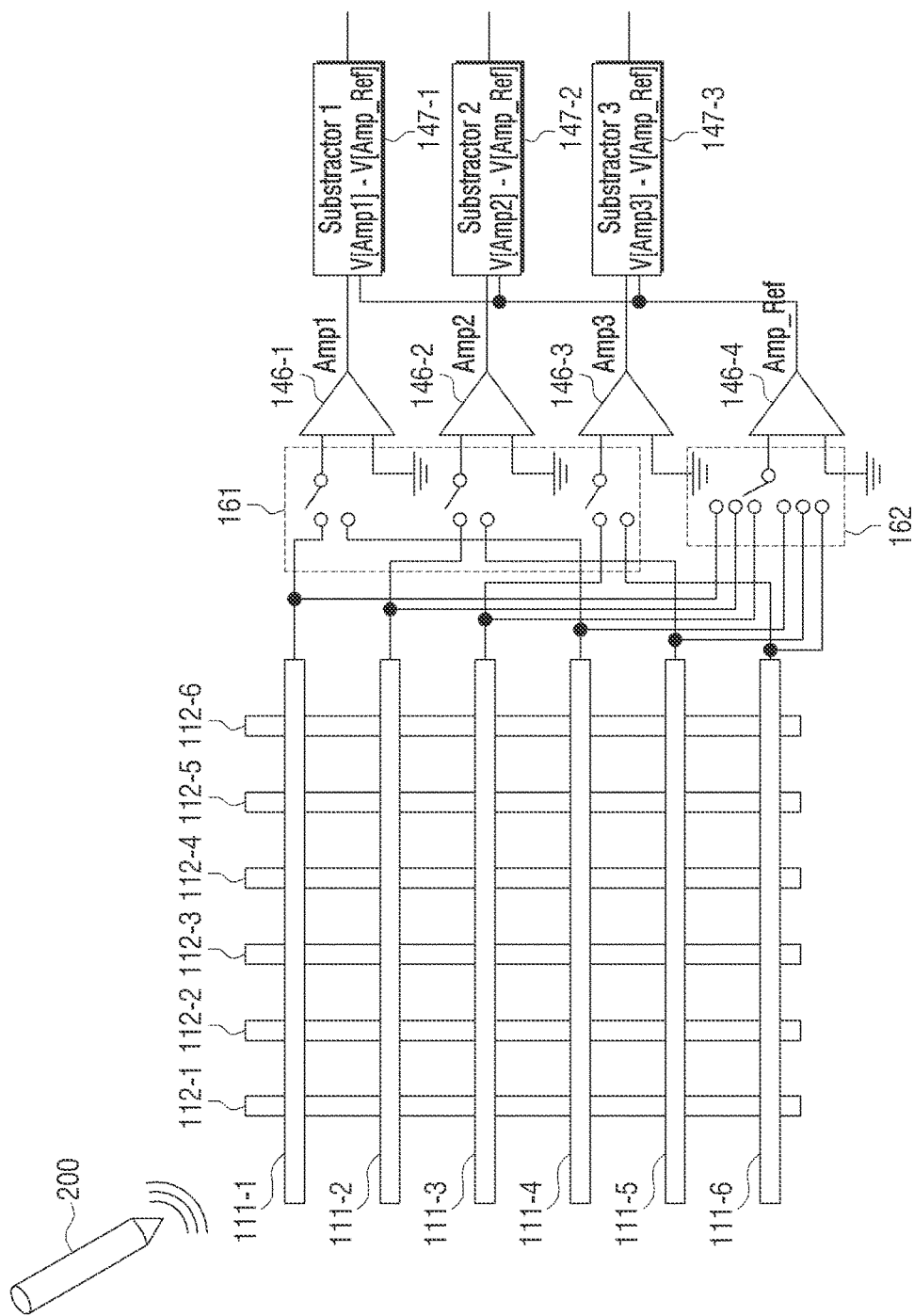
FIG. 32 is a diagram illustrating a configuration of a receiving unit according to a ninth embodiment of the present disclosure.

FIG. 32 is a diagram illustrating a configuration of a receiving unit according to a ninth embodiment of the present disclosure. Specifically, the receiving unit 140'''''' according to the ninth embodiment is an embodiment of the present disclosure in which sensitivity of the response signals is improved by using dedicated amplifier and subtractors for removing noise and sensing speed is improved by using a plurality of amplifiers.

Referring to FIG. 32, the receiving unit 140'''''' may include a plurality of amplifying units 146-1, 146-2, 146-3, 146-4 and a plurality of subtractors 147-1, 147-2, and 147-3.

The respective amplifying units 146-1, 146-2, and 146-3 amplify in parallel the response signals transmitted from the respective electrodes and output the amplified signals. Specifically, in a first receiving section, the respective amplifying units 146-1, 146-2, and 146-3 may amplify in parallel the response signals of the electrodes 111-1, 111-2, and 111-3 and output the amplified signals. In addition, in a second receiving section, the respective amplifying units 146-1, 146-2, and 146-3 may amplify in parallel the response signals of the electrodes 111-4, 111-5, and 111-6 and output the amplified signals.

Meanwhile, the amplifying unit 146-4 amplifies a reception signal of any one of the plurality of electrodes 111-1, 111-2, 111-3, 111-4, 111-5, and 111-6 through the second connecting unit 162 and outputs the amplified signal. For example, the amplifying unit 146-4 may amplify the reception signal of any one of the electrodes 111-4, 111-5, and 111-6 which are not connected to the respective amplifying units 146-1, 146-2, and 146-3 in the first receiving section, and may amplify the reception signal of any one of the electrodes 111-1, 111-2, and 111-3 which are not connected to the respective amplifying units 146-1, 146-2, and 146-3 in the second receiving section.

Here, the amplifying units 146-1, 146-2, 146-3, and 146-4 may use a trans-impedance amplifier that converts a current input into a voltage output.

In addition, the respective subtractors 147-1, 147-2, and 147-3 may output a difference between the response signals amplified by the respective amplifying units 146-1, 146-2, and 146-3 and the reception signal amplified by the amplifying unit 146-4.

As such, the receiving unit 140'''''' according to the ninth embodiment of the present disclosure parallel processes the response signals in a unit of three channels, thereby improving the processing speed. In addition, since the differential amplification is performed using the reception signals of other electrodes which do not use the response signals, noise in the response signals may be efficiently removed, thereby making it possible to improve sensitivity of the response signals.

Meanwhile, although the illustrated example illustrates the case in which the respective amplifying units 146-1, 146-2, and 146-3 amplify the response signals of the first electrodes in the first electrode group, at the time of the implementation, the respective amplifying units 146-1, 146-2, and 146-3 may also amplify the response signals of the second electrodes in the second electrode group. In addition, although the illustrated example illustrates the example in which only four amplifying units are used, at the time of the implementation, three amplifying units may be used, or four or more amplifying units (e.g., seven amplifying units for amplifying the response signals of the respective electrodes and one amplifier for performing a subtraction calculation) may also be used.

Figure 33:
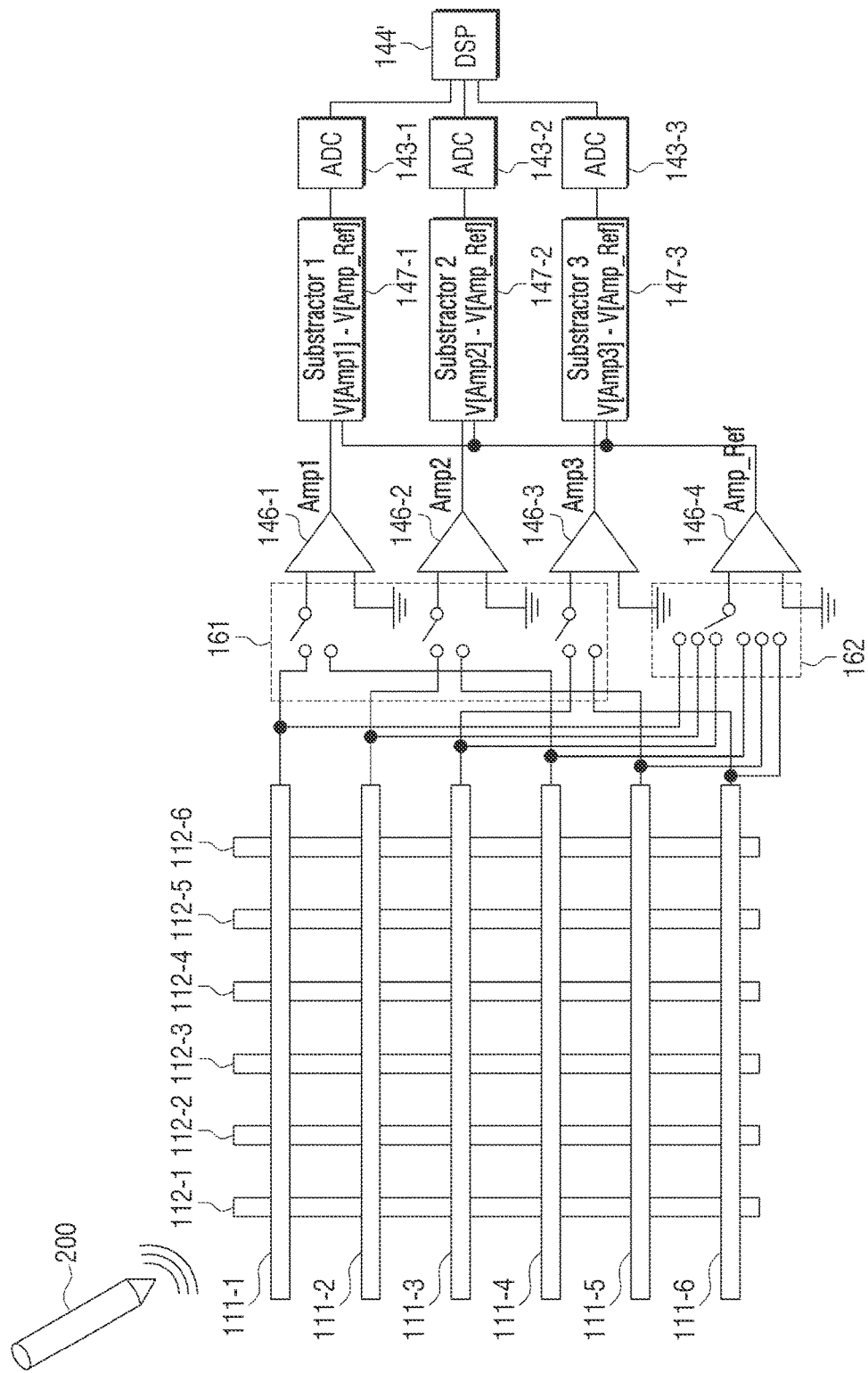
FIG. 33 is a diagram illustrating a configuration of a receiving unit according to a tenth embodiment of the present disclosure.

FIG. 33 is a diagram illustrating a configuration of a receiving unit according to a tenth embodiment of the present disclosure. Specifically, the receiving unit 140'''''''' according to the tenth embodiment is an embodiment of the present disclosure in which sensitivity of the response signals is improved by using dedicated amplifiers and subtractors for removing noise and extracting only the signals corresponding to the frequency band of the response signals, and sensing speed is improved using a plurality of amplifiers.

Referring to FIG. 33, the receiving unit 140'''''''' may include a plurality of amplifying units 146-1, 146-2, 146-3, and 146-4, a plurality of subtractors 147-1, 147-2, and 147-3, a plurality of ADC units 143-1, 143-2, and 143-3, and a signal processing unit 144'.

The respective amplifying units 146-1, 146-2, and 146-3 amplify in parallel the response signals transmitted from the respective electrodes and output the amplified signals. Specifically, in a first receiving section, the respective amplifying units 146-1, 146-2, and 146-3 may amplify in parallel the response signals of the electrodes 111-1, 111-2, and 111-3 and output the amplified signals. In addition, in a second receiving section, the respective amplifying units 146-1, 146-2, and 146-3 may amplify in parallel the response signals of the electrodes 111-4, 111-5, and 111-6 and output the amplified signals.

Meanwhile, the amplifying unit 146-4 amplifies a reception signal of any one of the plurality of electrodes 111-1, 111-2, 111-3, 111-4, 111-5, and 111-6 through the second connecting unit 162 and outputs the amplified signal. For example, the amplifying unit 146-4 may amplify the reception signal of any one of the electrodes 111-4, 111-5, and 111-6 which are not connected to the respective amplifying units 146-1, 146-2, and 146-3 in the first receiving section, and may amplify the reception signal of any one of the electrodes 111-1, 111-2, and 111-3 which are not connected to the respective amplifying units 146-1, 146-2, and 146-3 in the second receiving section.

In addition, the respective subtractors 147-1, 147-2, and 147-3 may output a difference between the response signals amplified by the respective amplifying units 146-1, 146-2, and 146-3 and the reception signal amplified by the amplifying unit 146-4.

In addition, the respective ADC units 143-1, 143-2, and 143-3 may convert each of the signals output from the respective subtractors 147-1, 147-2, and 147-3 into a digital signal.

In addition, the signal processing unit 144' may receive the response signals converted into the digital signal from the plurality of ADC units 143-1, 143-2, and 143-3, and may extract a preset frequency component from each of the plurality of response signals.

As such, the receiving unit 140'''''''' according to the tenth embodiment of the present disclosure parallel processes the response signals in a unit of three channels, thereby improving the processing speed. In addition, the receiving unit 140'''''''' according to the tenth embodiment of the present disclosure removes noise in two operations of the differential amplification and the extraction of a specific frequency component using response signals of other electrode which do not use the response signals, thereby making it possible to improve sensitivity of the response signals.

Meanwhile, although the illustrated example illustrates the case in which the respective amplifying units 146-1, 146-2, and 146-3 amplify the response signals of the first electrodes in the first electrode group, at the time of the implementation, the respective amplifying units 146-1, 146-2, and 146-3 may also amplify the response signals of the second electrodes in the second electrode group. In addition, although the illustrated example illustrates the example in which only four amplifying units are used, at the time of the implementation, three amplifying units may be used, or four or more amplifying units (e.g., seven amplifying units for amplifying the response signals of the respective electrodes and one amplifier for performing a subtraction calculation) may also be used.

Figure 34:
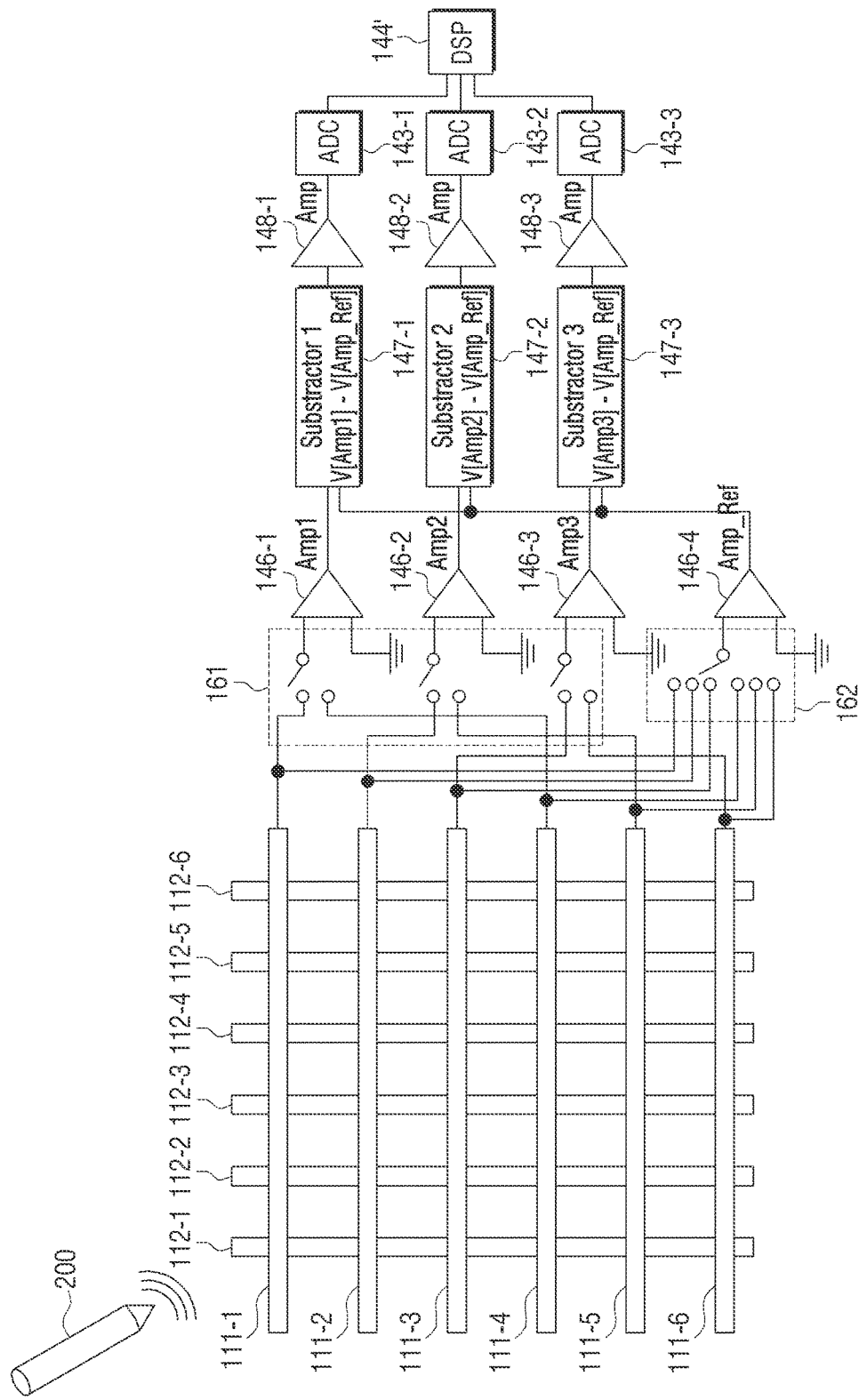
FIG. 34 is a diagram illustrating a configuration of a receiving unit according to an eleventh embodiment of the present disclosure.

FIG. 34 is a diagram illustrating a configuration of a receiving unit according to an eleventh embodiment of the present disclosure. Specifically, the receiving unit 140''''''''' according to the eleventh embodiment is an embodiment of the present disclosure in which sensitivity of the response signals is improved by using dedicated amplifiers and subtractors for removing noise and extracting only the signals corresponding to the frequency band of the response signals, and sensing speed is improved using a plurality of amplifiers.

Referring to FIG. 33, the receiving unit 140''''''''' may include a plurality of differential amplifying units 146-1, 146-2, 146-3, and 146-4, a plurality of subtractors 147-1, 147-2, and 147-3, a plurality of second amplifying units 148-1, 148-2, and 148-3, a plurality of ADC units 143-1, 143-2, and 143-3, and a signal processing unit 144'.

The respective amplifying units 146-1, 146-2, and 146-3 amplify in parallel the response signals transmitted from the respective electrodes and output the amplified signals. Specifically, in a first receiving section, the respective amplifying units 146-1, 146-2, and 146-3 may amplify in parallel the response signals of the electrodes 111-1, 111-2, and 111-3 and output the amplified signals. In addition, in a second receiving section, the respective amplifying units 146-1, 146-2, and 146-3 may amplify in parallel the response signals of the electrodes 111-4, 111-5, and 111-6 and output the amplified signals.

Meanwhile, the amplifying unit 146-4 amplifies a reception signal of any one of the plurality of electrodes 111-1, 111-2, 111-3, 111-4, 111-5, and 111-6 through the second connecting unit 162 and outputs the amplified signal. For example, the amplifying unit 146-4 may amplify the reception signal of any one of the electrodes 111-4, 111-5, and 111-6 which are not connected to the respective amplifying units 146-1, 146-2, and 146-3 in the first receiving section, and may amplify the reception signal of any one of the electrodes 111-1, 111-2, and 111-3 which are not connected to the respective amplifying units 146-1, 146-2, and 146-3 in the second receiving section.

In addition, the respective subtractors 147-1, 147-2, and 147-3 may output a difference between the response signals amplified by the respective amplifying units 146-1, 146-2, and 146-3 and the reception signal amplified by the amplifying unit 146-4.

The respective second amplifying units 148-1, 148-2, and 148-3 may amplify in parallel the respective signals output from the respective subtractors 147-1, 147-2, and 147-3 and output the amplified signals.

In addition, the respective ADC units 143-1, 143-2, and 143-3 may convert each of the signals output from the respective second amplifying units 148-1, 148-2, and 148-3 into a digital signal.

In addition, the signal processing unit 144' may receive the response signals converted into the digital signal from the plurality of ADC units 143-1, 143-2, and 143-3, and may extract a preset frequency component from each of the plurality of response signals.

As such, the receiving unit 140'''''''' according to the eleventh embodiment of the present disclosure parallel processes the response signals in a unit of three channels, thereby improving the processing speed. In addition, the receiving unit 140'''''''' according to the eleventh embodiment of the present disclosure removes noise in two operations of the differential amplification and the extraction of a specific frequency component using response signals of other electrodes which do not use the response signals, thereby making it possible to improve sensitivity of the response signals. In addition, the signal is amplified in the two operations, thereby making it possible to further improve sensitivity of the response signals.

Meanwhile, although the illustrated example illustrates the case in which the respective amplifying units 146-1, 146-2, and 146-3 amplify the response signals of the first electrodes in the first electrode group, at the time of the implementation, the respective amplifying units 146-1, 146-2, and 146-3 may also amplify the response signals of the second electrodes in the second electrode group.

Figure 35:
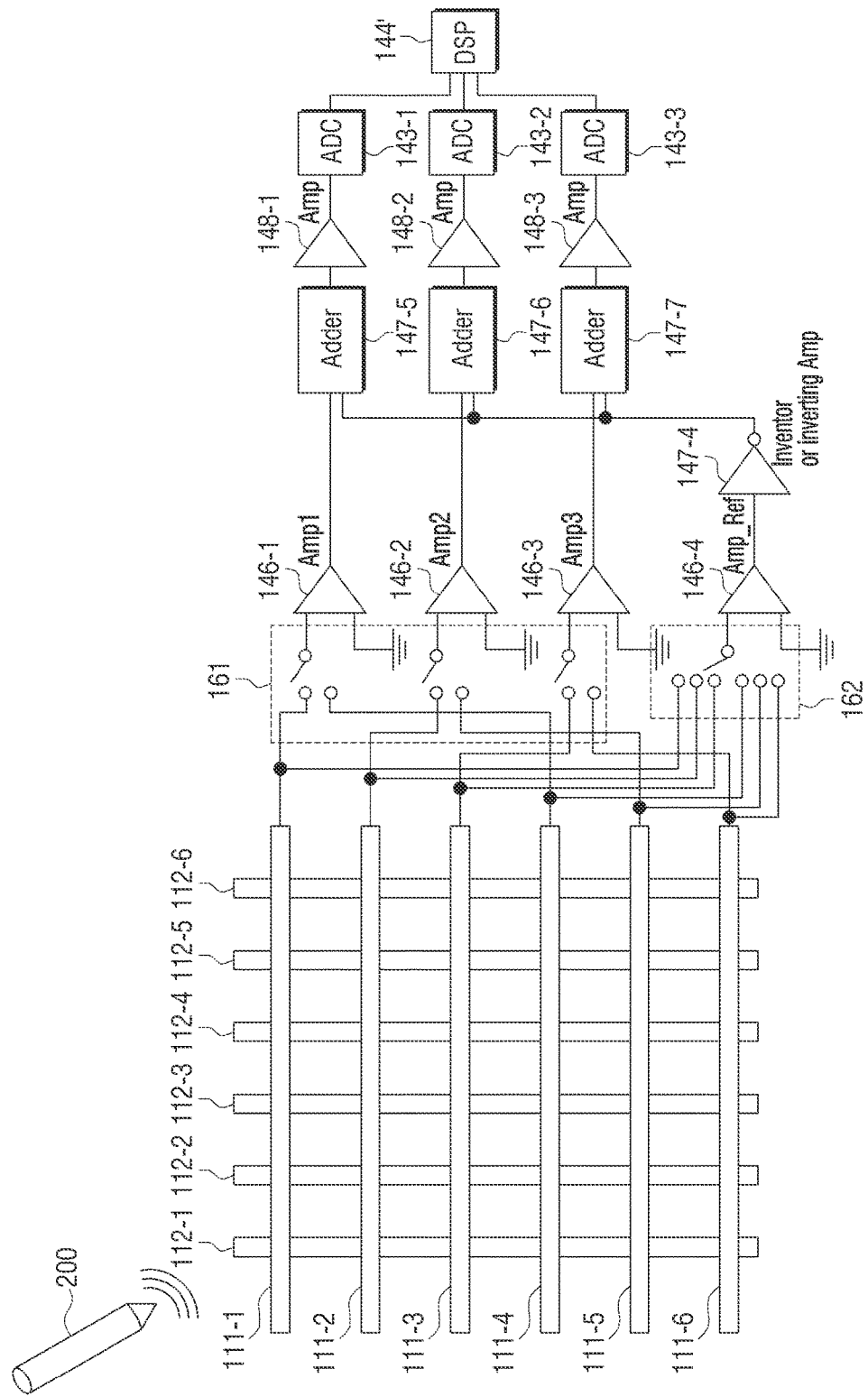
FIG. 35 is a diagram illustrating a configuration of a receiving unit according to a twelfth embodiment of the present disclosure.

FIG. 35 is a diagram illustrating a configuration of a receiving unit according to a twelfth embodiment of the present disclosure. Specifically, the receiving unit 140'''''''' according to the twelfth embodiment of the present disclosure is an embodiment of the present disclosure in which sensitivity of the response signals is improved by using dedicated amplifiers and subtractors for removing noise and extracting only the signals corresponding to the frequency band of the response signals, and sensing speed is improved using a plurality of amplifiers.

Referring to FIG. 35, the receiving unit 140'''''''' may include a plurality of amplifying units 146-1, 146-2, 146-3, and 146-4, an inverter 147-4, a plurality of adders 147-5, 147-6, and 147-7, a plurality of second amplifying units 148-1, 148-2, and 148-3, a plurality of ADC units 143-1, 143-2, and 143-3, and a signal processing unit 144'.

The respective amplifying units 146-1, 146-2, and 146-3 amplify in parallel the response signals transmitted from the respective electrodes and output the amplified signals. Specifically, in a first receiving section, the respective amplifying units 146-1, 146-2, and 146-3 may amplify in parallel the response signals of the electrodes 111-1, 111-2, and 111-3 and output the amplified signals. In addition, in a second receiving section, the respective amplifying units 146-1, 146-2, and 146-3 may amplify in parallel the response signals of the electrodes 111-4, 111-5, and 111-6 and output the amplified signals.

Meanwhile, the amplifying unit 146-4 amplifies a reception signal of any one of the plurality of electrodes 111-1, 111-2, 111-3, 111-4, 111-5, and 111-6 through the second connecting unit 162 and outputs the amplified signal. For example, the amplifying unit 146-4 may amplify the reception signal of any one of the electrodes 111-4, 111-5, and 111-6 which are not connected to the respective amplifying units 146-1, 146-2, and 146-3 in the first receiving section, and may amplify the reception signal of any one of the electrodes 111-1, 111-2, and 111-3 which are not connected to the respective amplifying units 146-1, 146-2, and 146-3 in the second receiving section.

The inverter 147-4 may invert an output of the amplifying unit 146-4.

In addition, the adders 147-5, 147-6, and 147-7 may add an output of the inverter 147-4 to the reception signals amplified by the respective amplifying units 146-1, 146-2, and 146-3 and may output the added signals.

The respective second amplifying units 148-1, 148-2, and 148-3 may amplify in parallel the respective signals output from the respective adders 147-5, 147-6, and 147-7 and output the amplified signals.

In addition, the respective ADC units 143-1, 143-2, and 143-3 may convert each of the signals output from the respective second amplifying units 148-1, 148-2, and 148-3 into a digital signal.

In addition, the signal processing unit 144' may receive the response signals converted into the digital signal from the plurality of ADC units 143-1, 143-2, and 143-3, and may extract a preset frequency component from each of the plurality of response signals.

As such, the receiving unit 140'''''''' according to the twelfth embodiment of the present disclosure parallel processes the response signals in a unit of three channels, thereby improving the processing speed. In addition, the receiving unit 140'''''''' according to the twelfth embodiment of the present disclosure removes noise in two operations of the differential amplification and the extraction of a specific frequency component using reception signals of other electrodes which do not use the response signals, thereby making it possible to improve sensitivity of the response signals. In addition, the signal is amplified in the two operations, thereby making it possible to further improve sensitivity of the response signals.

Meanwhile, although the illustrated example illustrates the case in which the respective amplifying units 146-1, 146-2, and 146-3 amplify the response signals of the first electrodes in the first electrode group, at the time of the implementation, the respective amplifying units 146-1, 146-2, and 146-3 may also amplify the response signals of the second electrodes in the second electrode group.

Figure 36:
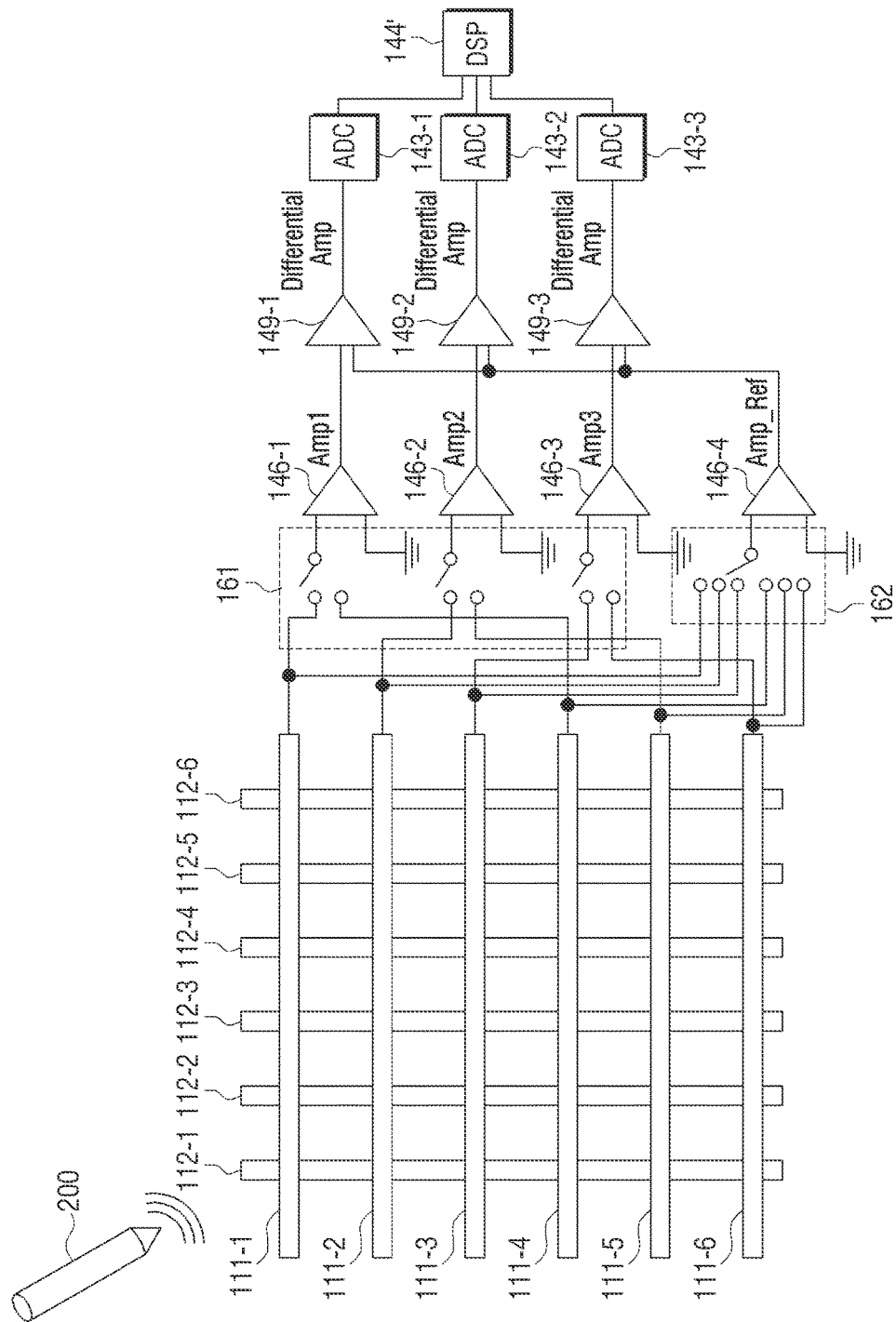
FIG. 36 is a diagram illustrating a configuration of a receiving unit according to a thirteenth embodiment of the present disclosure.

FIG. 36 is a diagram illustrating a configuration of a receiving unit according to a thirteenth embodiment of the present disclosure. Specifically, the receiving unit 140'''''''''' according to the thirteenth embodiment of the present disclosure is an embodiment of the present disclosure in which a differential amplification is performed to amplify the response signals and remove noise, sensitivity of the response signals is improved by extracting only the signals corresponding to the frequency band of the response signals, and sensing speed is improved using a plurality of amplifiers.

Referring to FIG. 36, the receiving unit 140'''''''''' may include a plurality of amplifying units 146-1, 146-2, 146-3, and 146-4, a plurality of differential amplifying units 149-1, 149-2, and 149-3, a plurality of ADC units 143-1, 143-2, and 143-3, and a signal processing unit 144'.

The respective amplifying units 146-1, 146-2, and 146-3 amplify in parallel the response signals transmitted from the respective electrodes and output the amplified signals. Specifically, in a first receiving section, the respective amplifying units 146-1, 146-2, and 146-3 may amplify in parallel the response signals of the electrodes 111-1, 111-2, and 111-3 and output the amplified signals. In addition, in a second receiving section, the respective amplifying units 146-1, 146-2, and 146-3 may amplify in parallel the response signals of the electrodes 111-4, 111-5, and 111-6 and output the amplified signals.

Meanwhile, the amplifying unit 146-4 amplifies a reception signal of any one of the plurality of electrodes 111-1, 111-2, 111-3, 111-4, 111-5, and 111-6 through the second connecting unit 162 and outputs the amplified signal. For example, the amplifying unit 146-4 may amplify the reception signal of any one of the electrodes 111-4, 111-5, and 111-6 which are not connected to the respective amplifying units 146-1, 146-2, and 146-3 in the first receiving section, and may amplify the reception signal of any one of the electrodes 111-1, 111-2, and 111-3 which are not connected to the respective amplifying units 146-1, 146-2, and 146-3 in the second receiving section.

The respective differential amplifying units 149-1, 149-2, and 149-3 may differentially amplify in parallel the respective signals output from the respective amplifying units 146-1, 146-2, and 146-3 and the signal output from the amplifying unit 146-4 and output the amplified signals. Specifically, one ends of the respective differential amplifying units 149-1, 149-2, and 149-3 may be connected to output terminals of the respective amplifying units 146-1, 146-2, and 146-3, and the other ends thereof may be connected to an output terminal of the amplifying unit 146-4.

In addition, the respective ADC units 143-1, 143-2, and 143-3 may convert each of the signals output from the respective differential amplifying units 149-1, 149-2, and 149-3 into a digital signal.

In addition, the signal processing unit 144' may receive the response signals converted into the digital signal from the plurality of ADC units 143-1, 143-2, and 143-3, and may extract a preset frequency component from each of the plurality of response signals.

As such, the receiving unit 140'''''''' according to the thirteenth embodiment of the present disclosure parallel processes the response signals in a unit of three channels, thereby improving the processing speed. In addition, the receiving unit 140'''''''' according to the thirteenth embodiment of the present disclosure removes noise in two operations of the differential amplification and the extraction of a specific frequency component using reception signals of other electrodes which do not use the response signals, thereby making it possible to improve sensitivity of the response signals. In addition, the signal is amplified in the two operations, thereby making it possible to further improve sensitivity of the response signals.

Figure 37A:
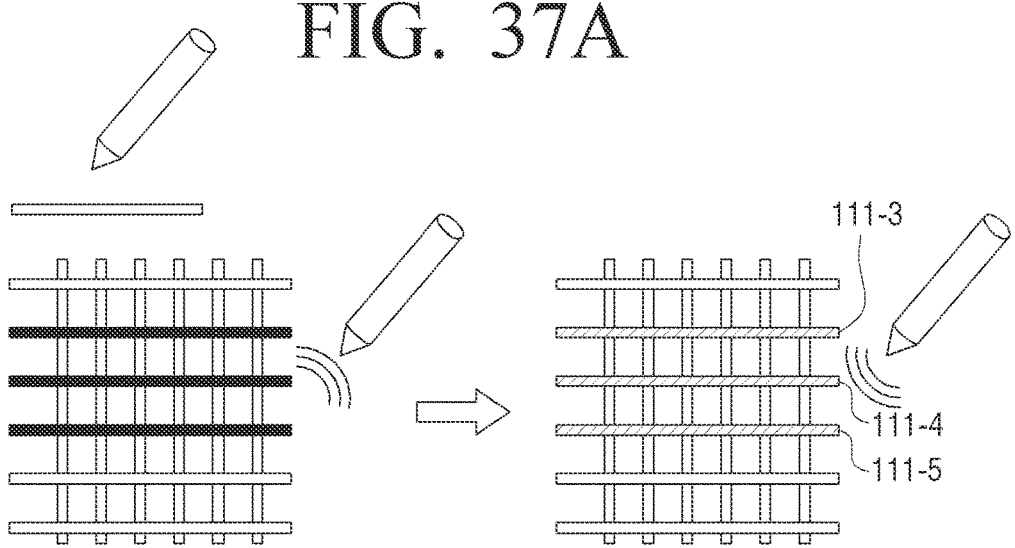
FIGS. 37A, 37B, and 37C are diagrams illustrating operations of the receiving unit according to the fourth to thirteenth embodiments of the present disclosure.
Figure 37B:
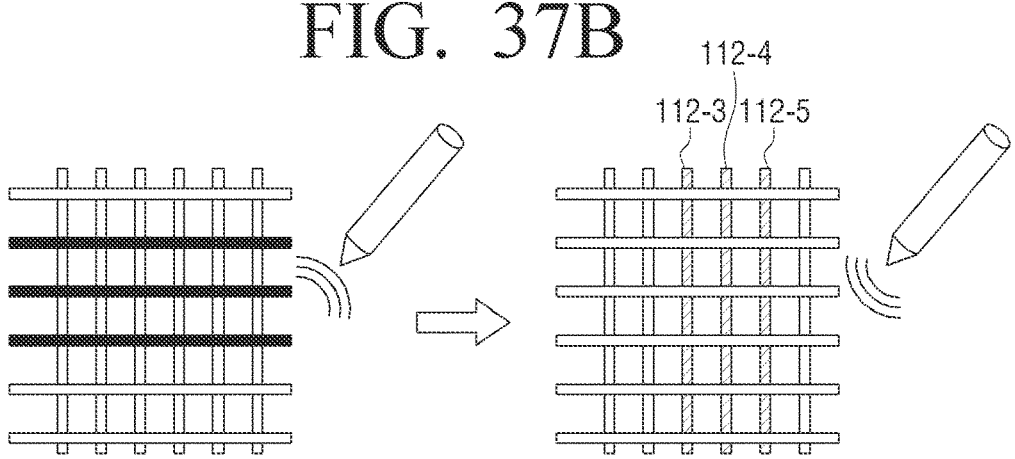
Figure 37C:
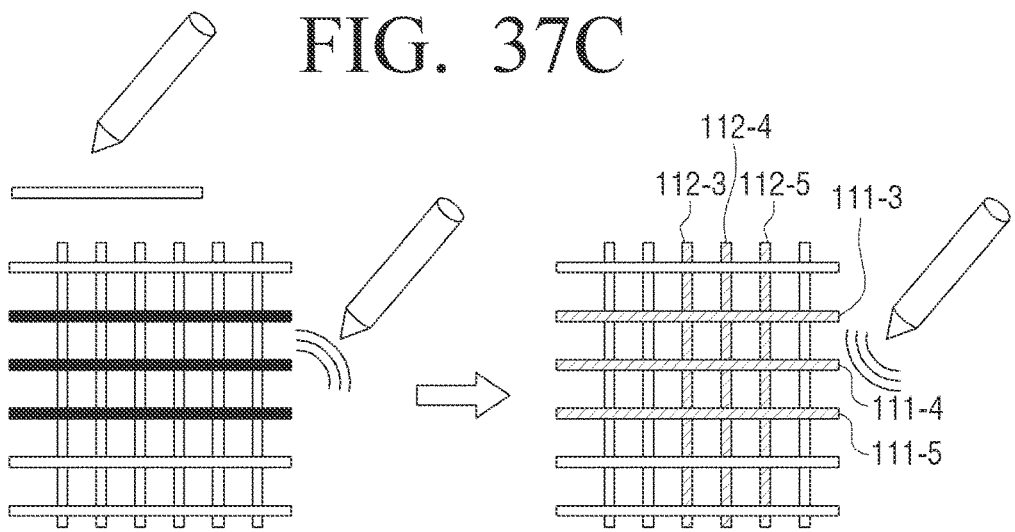

FIGS. 37A, 37B, and 37C are diagrams illustrating operations of the receiving unit according to the fourth to thirteenth embodiments of the present disclosure.

Referring to FIG. 37A, the receiving unit 140 may receive the response signals of the first electrodes in a unit of three channels as illustrated in FIG. 37A. Specifically, first, the same driving signal may be simultaneously applied to three first electrodes, and the response signals of the three first electrodes (e.g., 111-2, 111-3, and 111-4) after the application of the driving signal may be simultaneously received. In addition, after the reception of the response signals in the unit of the three channels, the application of the same driving signal may be again performed, and the response signals of three other electrodes may be simultaneously received.

Referring to FIG. 37B, the receiving unit 140 may receive the response signals of the second electrodes in the unit of the three channels as illustrated. Specifically, first, the same driving signal may be simultaneously applied to the three first electrodes, and the response signals of the three second electrodes (e.g., 112-2, 112-3, and 112-4) after the application of the driving signal may be simultaneously received.

Referring to FIG. 37C, the receiving unit 140 may receive in parallel six response signals transmitted from six electrodes. Specifically, first, the same driving signal may be simultaneously applied to the three first electrodes, and the response signals of the three first electrodes (e.g., 111-2, 111-3, and 111-4) and the three second electrodes (e.g., 112-2, 112-3, and 112-4) after the application of the driving signal may be simultaneously received.

As such, the receiving unit 140 according to the present embodiment processes the response signals in a unit of a plurality of channels, thereby making it possible to improve the response processing speed. Meanwhile, the number of channels which are received at one time may be varied depending on a distance between the stylus pen and a surface on the touch panel. For example, in the case in which the stylus pen touches the surface, the number of channels which are simultaneously received may be decreased, and the number of electrodes to be measured may also be decreased. On the contrary, in the case in which the stylus pen is spaced apart from the surface, the number of channels which are simultaneously received may be increased, and the number of electrodes to be measured may also be increased. At the time of the implementation, the number of channels to be simultaneously measured and the total number of electrodes to be measured may be determined in a form which is inversely proportional to each other.

Meanwhile, hereinabove, although the case in which one receiving unit receives both the response signal from the stylus pen 200 and the response signal from the touch object such as the hand has been described, at the time of the implementation, the response signals may also be received by different configurations depending on a kind of the touch object. An example thereof will be described below with reference to FIG. 38.

Figure 38:
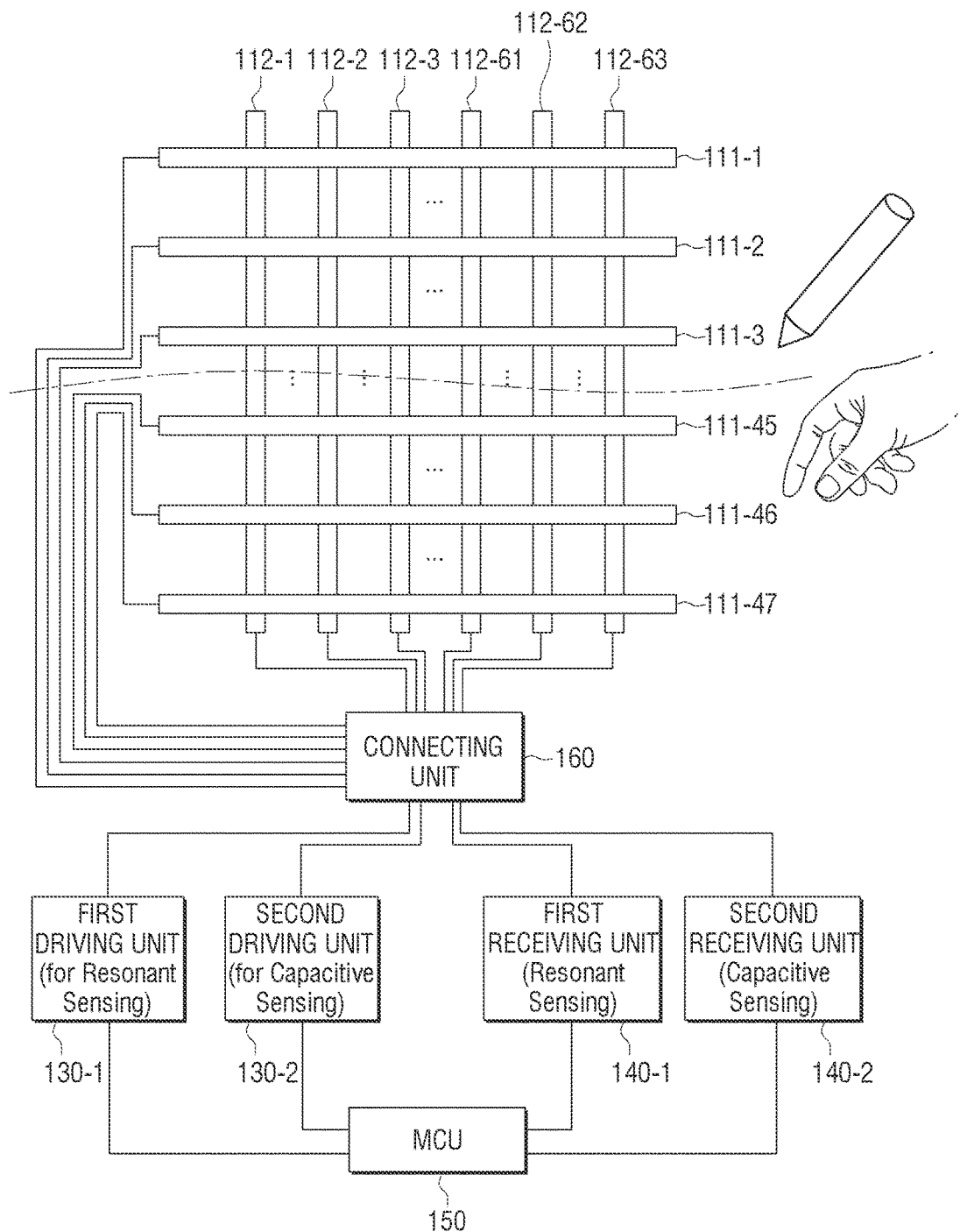
FIG. 38 is a diagram illustrating an operation of a receiving unit according to a fourteenth embodiment of the present disclosure.

FIG. 38 is a diagram illustrating a configuration of a receiving unit according to a fourteenth embodiment of the present disclosure.

Referring to FIG. 38, a touch panel 100' may be configured to include a channel electrode unit 110', a first driving unit 130-1, a second driving unit 130-2, a first receiving unit 140-1, a second receiving unit 140-2, an MCU 150, and a connecting unit 160.

The channel electrode unit 110' may have a plurality of electrodes corresponding to a size of the touch panel. For example, in the case in which the touch panel has a size of 12.1 inches, the channel electrode unit 110' may include 47 first electrodes 111-1, 111-2, 111-3, . . . , 111-45, 111-46, and 111-47 which are disposed in a horizontal direction, and 63 second electrodes 112-1, 112-2, 112-3, . . . , 112-61, 112-62, and 112-63 which are disposed in a vertical direction. Meanwhile, in the case in which the size of the touch panel is 5.7 inches, the channel electrode unit may be configured to include 18 first electrodes and 32 second electrodes. In addition, in the case in which the size of the touch panel is 10.1 inches, the channel electrode unit may also be configured to include 39 first electrodes and 52 second electrodes. Meanwhile, hereinabove, although only the sizes of the three touch panels are mentioned, the touch panel may be implemented in a form having a different size and the channel electrode unit may also be configured by the number of electrodes different from the number of electrodes described above.

The first driving unit 130-1, which is the driving unit operated when the stylus pen is sensed, simultaneously applies the driving signal to two or more electrodes of the plurality of electrodes. Since the operation of the first driving unit 130-1 described above has been described in detail with reference to FIGS. 2 to 5, a description thereof will be omitted.

The second driving unit 130-2, which is the driving unit operated when the touch object such as the hand is sensed, applies the driving signal to the plurality of first electrodes. Specifically, the second driving unit 130-2 may apply the driving signal in a unit of one electrode or may apply the driving signal in a unit of a plurality of electrodes. Since the operation of the second driving unit 130-2 described above has been described in detail with reference to FIG. 6, an overlapped description will be omitted. Here, the touch object may include, for example, the hand (or more specifically, the finger).

The first receiving unit 140-1 receives the response signals from each of the plurality of electrodes in a section in which the driving signal is not applied, when the stylus pen is sensed. The first receiving unit 140-1 may be configured in any one form of the receiving units according to the various embodiments of the present disclosure illustrated in FIGS. 22 to 36. For example, the first receiving unit 140-1 may be configured by six amplifiers which may simultaneously amplify six response signals, and an added amplifier to be targeted to perform a differential output with outputs of the corresponding six amplifiers, that is, seven amplifiers.

The second receiving unit 140-2 receives the response signals from the plurality of second electrodes in a section in which the driving signal is applied, when the touch object is sensed. Specifically, while the second driving unit 130-2 applies the driving signal to any one of the first electrodes, the second receiving unit 140-2 may sequentially receive the response signals of the plurality of second electrodes. In this case, the second receiving unit 140-2 may also receive the response signals in a unit of the plurality of channels. Meanwhile, hereinabove, although the case in which the driving signal is applied to the first electrodes and the response signals are received from the second electrodes has been described, at the time of the implementation, the driving signal may also be applied to the second electrodes and the response signals may also be received from the first electrodes.

The MCU 150 may control the first driving unit 130-1, the second driving unit 130-2, the first receiving unit 140-1, the second receiving unit 140-2, and the connecting unit 160 so as to sense the touched object and receive the driving signal and the response signals according to the driving scheme corresponding to the sensed object. For example, in the case in which the touched object is the stylus pen, the MCU 150 may control the first driving unit 130-1 and the connecting unit 160 so that the first driving unit 130-1 generates the driving signal and provides the driving signal to the electrodes, and may control the first receiving unit 140-2 and the connecting unit 160 so that the response signals are received in a section in which the driving signal is not transmitted. In addition, in the case in which the touched object is the hand, the MCU 150 may control the second driving unit 130-2 and the connecting unit 160 so that the second driving unit 130-2 generates the driving signal, and may control the second receiving unit 140-2 and the connecting unit 160 so that the response signals are received in a section in which the driving signal is transmitted, at the same time.

In addition, the MCU 150 may determine the location of the stylus pen or the location of the hand based on the received response signals.

The connecting unit 160 may selectively connect the plurality of electrodes to the first driving unit 130-1 or the second driving unit 130-2, or may selectively connect the plurality of electrodes to the first receiving unit 140-1 or the second receiving unit 140-2. Since a detailed operation of the connecting unit 160 has been described in detail with reference to FIG. 20, an overlapped description will be omitted.

Meanwhile, hereinabove, although only the form in which the touch panel is configured by the two driving units and the two receiving units has been described, at the time of the implementation, the touch panel may be implemented by one driving unit and the two receiving units, and may also be implemented by the two driving units and one receiving unit. That is, the first driving unit 130-1 and the second driving unit 130-2 described above may be implemented in one configuration as illustrated in FIG. 3, and the first receiving unit 140-1 and the second receiving unit 140-2 described above may also be implemented in one configuration.

Meanwhile, the signal received by the touch panel 100 is configured of the response signals received from the stylus pen 200 and noise introduced through the display, the hand of the user, or the like. In order to accurately measure the location of the stylus pen 200, the response signals of the stylus pen to be measured need to have signal to noise ratio (SNR) larger than noise introduced due to other reasons.

In order to have high SNR, there are a method for increasing magnitude of the response signals and a method for preventing the introduction of noise. Hereinafter, the method for increasing SNR will be described in view of two methods described above.

First, a driving sequence according to the present disclosure includes a Tx section resonating the stylus pen 200, and an Rx section measuring the response signal received from the stylus pen 200. In the Tx section, the method for increasing the response signal of the stylus pen may be more effective than the method for preventing the introduction of noise. Thus, according to an embodiment of the present disclosure, the driving signal is applied to the plurality of electrodes, not one electrode, at a timing of applying the driving signal. In addition, according to a further embodiment of the present disclosure, the driving signal is simultaneously applied to the electrodes on which it is expected that the stylus pen is to be located, and other electrodes may be grounded or floated. Since this operation has been described above, an overlapped description will be omitted.

In addition, in order to prevent the driving signal from being transmitted to the ground of the stylus pen through the hand of the user, the driving signal having the phase difference of 180° with the driving signal applied to the electrodes on which it is expected that the stylus pen is to be located may be applied to some electrodes.

However, the method for applying the driving signal having the phase difference of 180° to the electrodes other than a plurality of pen tip driving electrodes may be a good method for improving the magnitude of the response signal of the stylus pen, but since several electrodes other than the pen tip driving electrodes need to be driven, power consumption is increased. Thus, in order to reduce power consumption, there is a need to limit the number of electrodes to which the signal having the phase difference of 180° is applied. As one method for implementing that described above, a method in which the location of the hand of the user is detected when the hand of the user touches the touch panel and a signal having a phase opposite to the signal applied to a portion at which the pen tip touches is applied to only a portion at which the hand of the user touches, or the like may be used. In the case in which the above-mentioned method is used, the number of electrodes to which the signal having the phase difference of 180° is applied may be minimized.

Meanwhile, since the magnitude of the response signal of the stylus pen 200 is mostly determined in the Tx section, the method for preventing the introduction of noise may be effective in the Rx section, unlike the Tx section. In the case in which the hand of the user closely approaches the electrodes of the touch panel, a significant amount of noise is introduced from the hand. Thus, the receiving unit 140 simultaneously receives noise introduced from the hand as well as the response signal received from the stylus pen 200. As a result, in the case in which the user writes while touching the touch panel with the hand, SNR is significantly decreased as compared to the case in which the user writes while handing off the touch panel. In order to address this problem, the electrodes other than the plurality of electrodes receiving the response signal of the stylus pen 200 may be connected to a ground of the receiving terminal. The example described above will be described below with reference to FIGS. 39A and 39B.

Figure 39A:
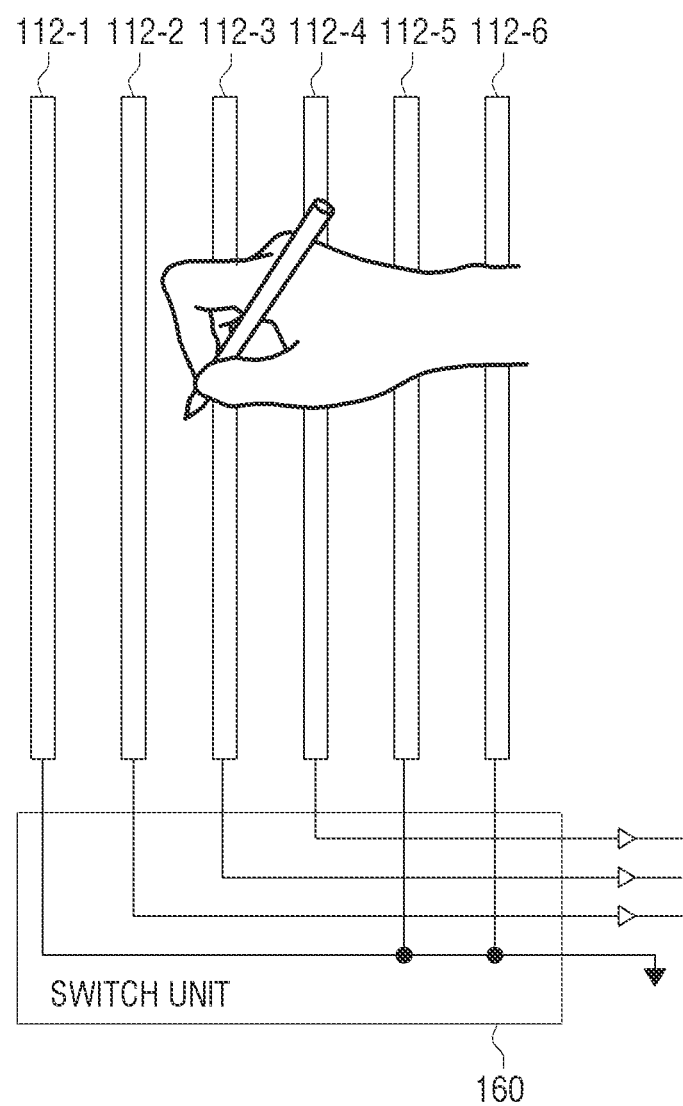
FIGS. 39A and 39B are diagrams illustrating an operation of a connecting unit of a case of receiving the response signal according to various embodiments of the present disclosure.
Figure 39B:
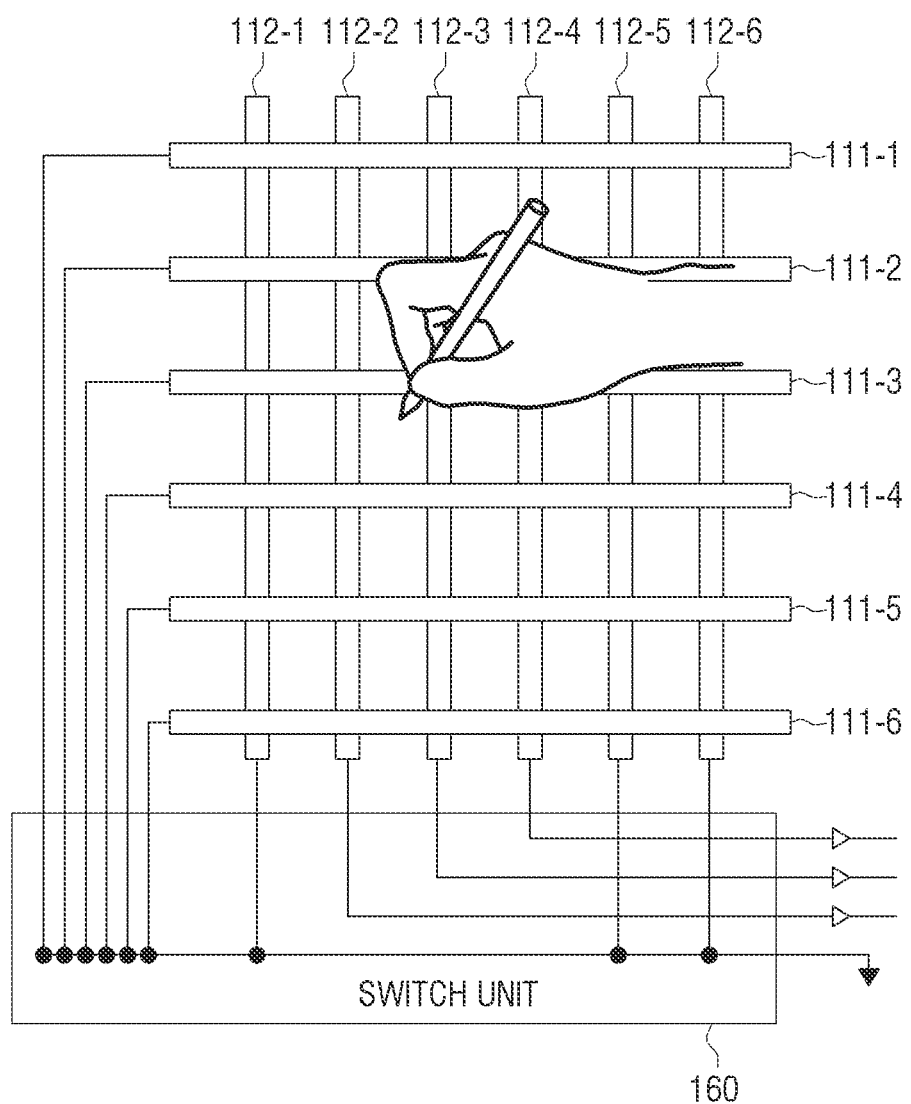

FIGS. 39A and 39B are diagrams illustrating an operation of the connecting unit of the case of receiving the response signal according to various embodiments of the present disclosure.

Referring to FIG. 39A, in the case in which the stylus pen 200 is disposed between the plurality of electrodes 112-2 and 112-3, it is necessary to measure the response signals of the second electrodes 112-2, 112-3, and 112-4 in order to determine the location of the corresponding stylus pen 200. Thus, the controlling unit 120 may control the connecting unit 160 so that the plurality of electrodes to receive the response signals and the receiving unit 140 are connected to each other based on the previously sensed location of the stylus pen 200. In this case, the controlling unit 120 may control the connecting unit 160 so that other electrodes 112-1, 112-5, and 112-6 are grounded.

As such, since other electrodes 112-1, 112-5, and 112-6 are grounded, a significant portion of noise introduced from the hand is discharged through the ground of the receiving terminal, such that only a small amount of noise is introduced into the plurality of electrodes 112-2, 112-3, and 112-4 receiving the response signal of the stylus pen and is input to the receiving unit 140. As a result, noise component in an input signal input to the receiving unit 140 is reduced, thereby making it possible to improve SNR.

Meanwhile, hereinabove, although the case in which the operation as described above is performed for only the second electrodes has been described, at the time of the implementation, the ground process for the electrodes which do not receive the response signal may be equally performed for the electrodes which are disposed in a matrix form as illustrated in FIG. 39B.

Referring to FIG. 39B, in the case in which the stylus pen 200 is disposed between the plurality of electrodes 112-2 and 112-3, it is necessary to measure the response signals of the second electrodes 112-2, 112-3, and 112-4 in order to determine the location of the corresponding stylus pen 200. Meanwhile, in the case in which the receiving unit 140 may receive the response signals in a unit of three channels, the controlling unit 120 may control the connecting unit 160 so that the plurality of electrodes 112-2, 112-3, and 112-4 to receive the response signals and the receiving unit 140 are connected to each other based on the previously sensed location of the stylus pen 200. In this case, the controlling unit 120 may control the connecting unit 160 so that other electrodes 111-1, 111-2, 111-3, 111-4, 111-5, 111-6, 112-1, 112-5, and 112-6 are grounded.

Thereafter, the controlling unit 120 may control the connecting unit 160 so that the plurality of electrodes 111-2, 111-3, and 111-4 and the receiving unit 140 are connected to each other, and may control the connecting unit 160 so that other electrodes 111-1, 111-5, 111-6, 112-1, 112-2, 112-3, 111-4, 112-5, and 112-6 are grounded.

Meanwhile, hereinabove, although the case in which the response signal of the second electrodes and the response signals of the first electrodes are separately received has been described, at the time of the implementation, the response signals of at least one first electrode of the plurality of first electrodes and at least one second electrode of the plurality of second electrodes may be simultaneously received, and in this case, the first electrodes and the second electrodes which are not connected to the receiving unit may be grounded.

Figure 40:
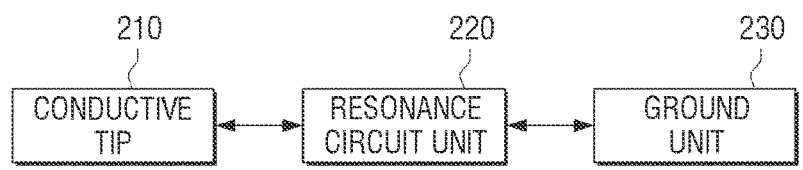
FIG. 40 is a diagram illustrating a detailed configuration of the stylus pen of FIG. 1.

FIG. 40 is a diagram illustrating a detailed configuration of the stylus pen of FIG. 1.

Referring to FIG. 40, the stylus pen 200 may be configured to include a conductive tip 210, a resonance circuit unit 220, and a ground unit 230. The stylus pen 200 may be implemented, for example, in a pen shape.

The conductive tip 210 forms capacitance with at least one of the plurality of electrodes in the touch panel 100. The conductive tip 210 may be formed, for example, of a metallic tip. In addition, the conductive tip 210 may be present in a non-conductive material or a portion of the conductive tip 210 may be exposed to the outside. In addition, in order to soften writing sense at the time of using the stylus pen 200, the stylus pen 200 may further include an insulating unit preventing the conductive tip 210 from being directly touched to the outside.

The resonance circuit unit 220 includes a parallel connection circuit including an inductor and a capacitor connected to the conductive tip.

In addition, the resonance circuit unit 220 may receive energy for the resonance through a capacitive coupling between at least one electrode in the touch panel 100 and the conductive tip. Specifically, the resonance circuit unit 220 may resonate with the driving signal input from the touch panel 100. In addition, the resonance circuit unit 220 may output the resonance signal by the resonance even after the input of the driving signal is interrupted. For example, the resonance circuit unit 220 may output a sine wave signal having a resonance frequency of the resonance circuit unit.

In addition, the resonance circuit unit 220 may vary the resonance frequency by varying capacitance of the capacitor or inductance of the inductor depending on touch pressure of the conductive tip. An operation described above will be described below with reference to FIG. 42.

In addition, the resonance circuit unit 220 may vary the resonance frequency by varying the capacitance of the capacitor or the inductance of the inductor depending on a manipulation of the user. An operation described above will be described below with reference to FIG. 43.

Figure 41:
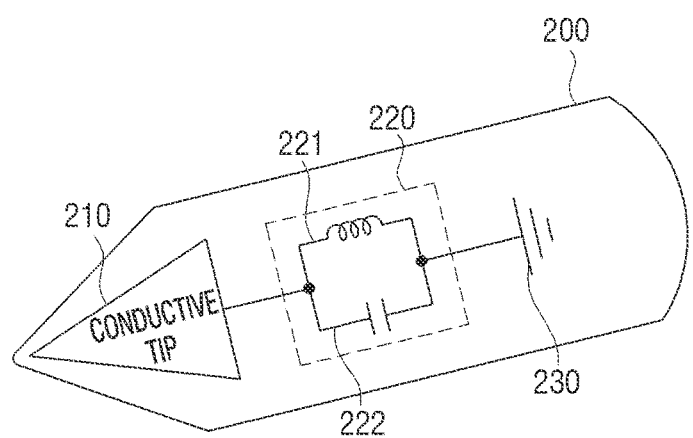
FIG. 41 is a circuit diagram of the stylus pen of FIG. 1.

FIG. 41 is a circuit diagram of the stylus pen of FIG. 1.

Referring to FIG. 41, the resonance circuit unit 220 is configured to include an inductor 221 and a capacitor 222, and one end of the resonance circuit unit 220 may be connected to the conductive tip 210 and the other end thereof may be grounded to a ground unit 230 (e.g., case) of the stylus pen.

The inductor 211 and the capacitor 222 are connected in parallel to each other, so as to be operated as a resonance circuit. The resonance circuit may have high impedance characteristics at a specific resonance frequency.

Figure 42:
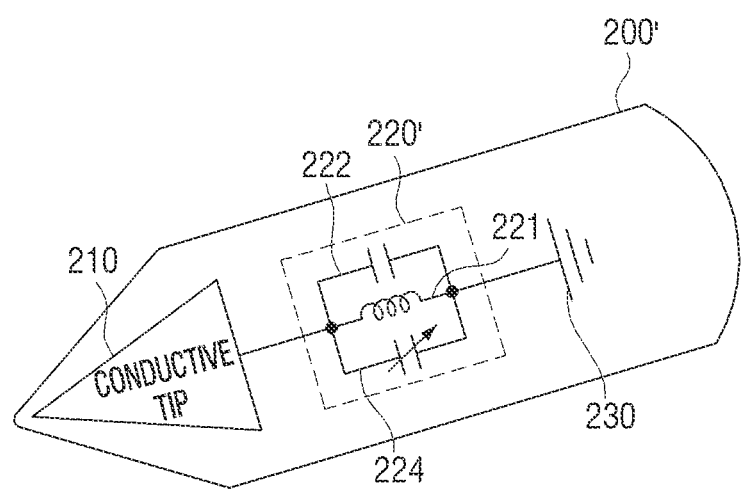
FIG. 42 is a circuit diagram of a stylus pen according to an embodiment of the present disclosure.

FIG. 42 is a circuit diagram of a stylus pen according to an embodiment of the present disclosure.

Referring to FIG. 42, the resonance circuit unit 220' may be configured to include the inductor 221, the capacitor 222, and a variable capacitor 224.

The inductor 211 and the capacitor 222 are connected in parallel to each other, so as to be operated as a resonance circuit.

The variable capacitor 224 is connected in parallel to the resonance circuit, wherein capacitance may be varied depending on touch pressure of the conductive tip. Thus, in the case in which the touch pressure of the conductive tip is changed, the capacitance of the variable capacitor is varied, thereby making it possible to vary the resonance frequency.

As such, in the stylus pen 200' according to a second embodiment of the present disclosure as described above, since the resonance frequency is varied depending on the touch pressure with the touch panel 100, the touch panel 100 may sense the touch pressure of the stylus pen 200' depending on the variation of the resonance frequency as well as a location of the stylus pen 200' based on the response signal.

Meanwhile, hereinabove, although the case in which the resonance frequency is varied using the variable capacitor has been described, at the time of the implementation, a resonance circuit unit 220' performing the same function may also be implemented by using a variable inductor of which inductance may be varied depending on the touch pressure of the conductive tip.

Figure 43:
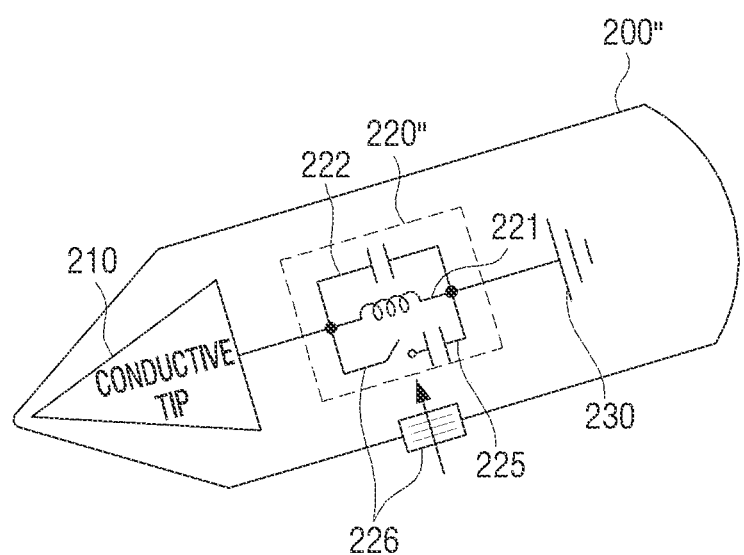
FIG. 43 is a circuit diagram of a stylus pen according to an embodiment of the present disclosure.

FIG. 43 is a circuit diagram of a stylus pen according to an embodiment of the present disclosure.

Referring to FIG. 43, a resonance circuit unit 220" may be configured to include the inductor 221, the capacitor 222, a second capacitor 225, and a switch 226.

The inductor 211 and the capacitor 222 are connected in parallel to each other, so as to be operated as a resonance circuit.

The second capacitor 225 has preset capacitance.

The switch 226 may receive on/off instructions of the user, and may selectively connect the second capacitor 225 in parallel to the capacitor 222 according to the on/off instructions of the user. Thus, when the user turns-on the switch, the second capacitor 225 is connected in parallel to the resonance circuit, thereby making it possible to vary the resonance frequency.

As such, in the stylus pen 200" according to a third embodiment of the present disclosure, since the resonance frequency is varied depending on a switching operation of the user, an operation mode of the stylus pen may also be sensed.

Meanwhile, hereinabove, although the case in which the resonance frequency is varied using the second capacitor and the switch has been described, at the time of the implementation, a resonance circuit unit 220" performing the same function may also be implemented by using a second inductor and the switch or other circuit configurations.

Meanwhile, the resonance frequency varied depending on FIG. 43 is preferably not a range of the resonance frequency varied depending on FIG. 42. Specifically, at the time of the implementation, the variable capacitor of FIG. 42 and the switch and the second capacitor of FIG. 43 may be implemented together with each other. In this case, the resonance frequency of the resonance circuit 220" varied by an operation of the switch 225 may be different from the range of the resonance frequency varied depending on a change in capacitance of the variable capacitor of FIG. 42 so that the touch panel 100 may determine whether the change of the resonance frequency is caused by the change of the touch pressure or the operation of the switch.

Figure 44:
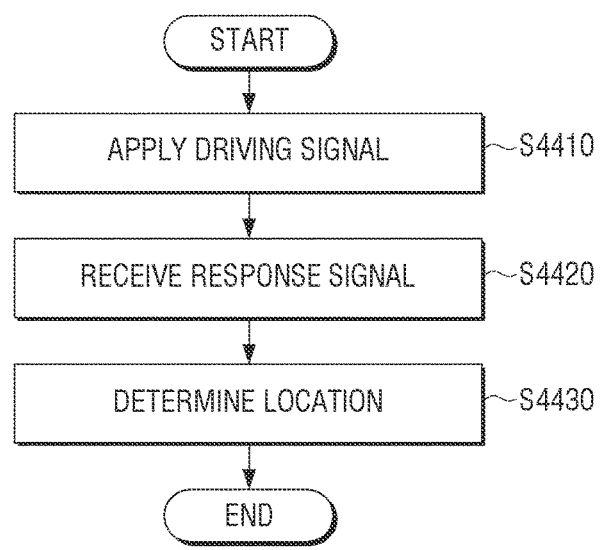
FIG. 44 is a flow chart illustrating a method for controlling a touch panel according to an embodiment of the present disclosure.

FIG. 44 is a flow chart illustrating a method for controlling a touch panel according to an embodiment of the present disclosure.

Referring to FIG. 44, the same driving signal is applied to the plurality of electrodes in the channel electrode unit in a unit of a plurality of electrodes at operation 54410. Thus, the driving signal may be transmitted to the resonance circuit of the stylus pen 200 approaching the touch panel 100 through the capacitive coupling. In this case, the same driving signal may be simultaneously applied to the electrodes in the unit of the plurality of electrodes.

In addition, the response signal generated from the resonance circuit of the stylus pen is received from each of the plurality of electrodes at operation 54420. Specifically, the response signal may be received from each of the plurality of electrodes in a section in which the driving signal is not applied. In this case, various signal processes are performed for the received response signals, thereby making it possible to improve reception sensitivity. In addition, this reception operation and the above-mentioned application operation may be alternately performed.

In addition, the location of the stylus pen is determined based on the plurality of received response signals at operation 54430. Specifically, the location of the stylus pen 200 may be determined based on a ratio between the response signals received from each of the plurality of electrodes. For example, in the case in which the plurality of electrodes are configured in a matrix form, the location of the stylus pen 200 may be determined based on a ratio between the response signals received from the first electrodes disposed in a first direction and a ratio between the response signals received from the second electrodes disposed in a second direction.

As described above, since the method for controlling the touch panel according to the present embodiment provides the driving signal to the stylus pen 200 through the capacitive coupling, the stylus pen 200 may be operated even though it is not self-power. In addition, since the method for controlling touch panel according to the present embodiment collectively provides the driving signal to the plurality of electrodes, larger energy may be provided. As a result, reception sensitivity and measurement speed may be improved. In addition, since the method for controlling touch panel according to the present embodiment performs various signal processes for the received response signals, reception sensitivity for the response signals may be improved. The method for controlling the touch panel as illustrated in FIG. 44 may be executed on the touch panel having the configuration as illustrated in FIG. 2 and may also be executed on a touch panel having other configurations.

In addition, the controlling method as described above may be implemented in an executable program by the controlling unit 120 of FIG. 2, in which the program may be stored in a non-transitory computer readable medium to be provided.

The non-transitory computer readable medium does not mean a medium storing data for a short period such as a register, a cache, a memory, or the like, but means a machine-readable medium semi-permanently storing the data. Specifically, various applications or programs described above may be stored and provided in the non-transitory computer readable medium such as a compact disc (CD), a digital versatile disc (DVD), a hard disk, a Blu-ray disk, a universal serial bus (USB), a memory card, a read-only memory (ROM), or the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch panel comprising:
a channel electrode unit configured to include a plurality of electrodes, the plurality of electrodes including a plurality of first electrodes disposed in a first direction and a plurality of second electrodes disposed in a second direction intersecting with the first direction; and
a processor configured to:
apply a driving signal to at least two electrodes of the plurality of electrodes in the channel electrode unit,
transmit the driving signal to a resonance circuit of a stylus pen approaching the touch panel through a capacitive coupling, and
receive response signals generated from the resonance circuit of the stylus pen from each of the plurality of electrodes to determine a location of the stylus pen including the resonance circuit,
wherein the processor is further configured to:
determine a location of the stylus pen,
apply a first driving signal to a first plurality of electrodes corresponding to the location of the stylus pen, and
apply a second driving signal, which is an inversion of the first driving signal, to a second plurality of electrodes disposed adjacent to the first plurality of electrodes.

2. The touch panel of claim 1,
wherein the channel electrode unit is further configured to detect capacitances between the plurality of first electrodes and the plurality of second electrodes during an approach of a touch object, and
wherein the processor is further configured to calculate variation of the capacitances between respective electrodes at a plurality of electrodes intersecting points formed between the plurality of first electrodes and the plurality of second electrodes, and to determine a location of the touch object based on the calculated variation of capacitances.

3. The touch panel of claim 2, further comprising:
a first driving unit configured to simultaneously apply the driving signal to at least two electrodes of the electrodes, when the stylus pen is sensed;
a second driving unit configured to apply the driving signal to the plurality of first electrodes when the touch object is sensed;
a first receiving unit configured to receive the response signals from each of the electrodes in a section in which the driving signal is not applied when the stylus pen is sensed, and
a second receiving unit configured to receive the response signals from the plurality of second electrodes in a section in which the driving signal is applied when the touch object is sensed.

4. The touch panel of claim 1, wherein the processor is further configured to determine a location of the stylus pen including the resonance circuit based on a ratio between the response signals received from the first plurality of electrodes and a ratio between the response signals received from the second plurality of electrodes.

5. The touch panel of claim 4, wherein the processor is further configured to apply a same driving signal to all of the plurality of first electrodes.

6. The touch panel of claim 4,
wherein the plurality of first electrodes are classified into a plurality of sub-groups in a unit of a plurality of electrodes which are continuously disposed, and
wherein the processor is further configured to simultaneously apply a same driving signal to all of the first electrodes in one sub-group.

7. The touch panel of claim 4, wherein the processor is further configured to simultaneously apply the driving signal to an electrode receiving a largest response signal among the plurality of first electrodes and an electrode within a preset distance from the electrode receiving the largest response signal.

8. The touch panel of claim 1, wherein the processor is further configured to simultaneously apply the driving signal to at least one first electrode of the plurality of first electrodes and at least one second electrode of the plurality of second electrodes.

9. The touch panel of claim 1, further comprising:
a driving unit configured to apply the driving signal to at least two first electrodes of the plurality of first electrodes; and
a receiving unit configured to receive the response signals of each of the plurality of first electrodes and the plurality of second electrodes in a section in which the driving signal is not applied,
wherein the processor is further configured to determine the location of the stylus pen including the resonance circuit based on the response signals received from the receiving unit.

10. The touch panel of claim 9, wherein the receiving unit is further configured to sequentially receive the response signals of each of the plurality of first electrodes and the plurality of second electrodes.

11. The touch panel of claim 9, wherein the processor is further configured to control the driving unit and the receiving unit so that the application of a same driving signal to the plurality of first electrodes and the reception of the response signals for each of the plurality of first electrodes and the plurality of second electrodes are alternately performed.

12. The touch panel of claim 9, wherein the receiving unit includes:
an amplifying unit configured to amplify the received response signals and output the amplified response signals;
an analog-to-digital converting (ADC) unit configured to convert the amplified response signals into a digital signal; and
a signal processing unit configured to extract a preset frequency component from the response signals converted into the digital signal.

13. The touch panel of claim 9, wherein the receiving unit is further configured to receive in parallel the response signals of each of the plurality of first electrodes and the plurality of second electrodes in a unit of a plurality of channels.

14. The touch panel of claim 13, wherein the receiving unit is further configured to simultaneously receive the response signals from at least one first electrode of the plurality of first electrodes and at least one second electrode of the plurality of second electrodes.

15. The touch panel of claim 13, wherein the receiving unit includes:
   a parallel amplifying unit configured to amplify each of the response signals received from the plurality of first electrodes and the plurality of second electrodes;
   an analog-to-digital converting (ADC) unit configured to convert each of the plurality of amplified response signals into a digital signal; and
   a signal processing unit configured to extract a preset frequency component from a difference between the plurality of response signals converted into the digital signal.

16. The touch panel of claim 13, wherein the receiving unit includes a differential amplifying unit configured to differentially amplify a difference between response signals of two electrodes of the plurality of first electrodes and the plurality of second electrodes, and to output the differentially amplified response signal.

17. The touch panel of claim 13, wherein the receiving unit includes:
   a differential amplifying unit configured to differentially amplify a difference between response signals of two electrodes of the plurality of first electrodes and the plurality of second electrodes and output the differentially amplified response signal;
   an analog-to-digital converting (ADC) unit configured to convert the differentially amplified response signal into a digital signal; and
   a signal processing unit configured to extract a preset frequency component from the response signal converted into the digital signal.

18. The touch panel of claim 9, wherein the processor is further configured to control the channel electrode unit so that at least one of the plurality of first electrodes and the plurality of second electrodes is grounded in a section in which the response signals are received.

19. The touch panel of claim 1, wherein the processor is further configured to control the channel electrode unit so that at least one electrode other than the electrodes to which the driving signal is applied is grounded in a section in which the driving signal is applied.

20. The touch panel of claim 1, wherein the processor is further configured to simultaneously apply driving signals having different phases to at least one of the plurality of first electrodes and at least one of the plurality of second electrodes.

21. The touch panel of claim 20, wherein the processor is further configured to determine a phase difference between a first driving signal applied to the first electrodes and a second driving signal applied to the second electrodes, depending on locations of the first electrodes and the second electrodes to which the first driving signal and second driving signal are applied.

* * * * *